United States Patent
Au et al.

(10) Patent No.: US 10,833,912 B2
(45) Date of Patent: Nov. 10, 2020

(54) METHODS, DEVICES, SERVERS, APPARATUS, AND SYSTEMS FOR WIRELESS INTERNET OF THINGS APPLICATIONS

(71) Applicant: ORIGIN WIRELESS, INC., Greenbelt, MD (US)

(72) Inventors: Oscar Chi-Lim Au, San Jose, CA (US); Masato Marumo, Tokyo (JP); Beibei Wang, Clarksville, MD (US); Hung-Quoc Duc Lai, Parkville, MD (US); K. J. Ray Liu, Potomac, MD (US); Chen Chen, Burlingame, CA (US); Qinyi Xu, College Park, MD (US); Yi Han, Ellicott City, MD (US); Zhung-Han Wu, College Park, MD (US); Feng Zhang, Greenbelt, MD (US); Zoltan Safar, Ellicott City, MD (US); Jeng-Feng Lee, Cambridge, MA (US); Thomas Nelson Buttermore, Jr., St. John, VI (US)

(73) Assignee: ORIGIN WIRELESS, INC., Greenbelt, MD (US)

( * ) Notice: Subject to any disclaimer, the term of this patent is extended or adjusted under 35 U.S.C. 154(b) by 34 days.

(21) Appl. No.: 16/125,748

(22) Filed: Sep. 9, 2018

(65) Prior Publication Data
US 2019/0020530 A1     Jan. 17, 2019

Related U.S. Application Data

(63) Continuation-in-part of application No. 15/326,112, filed as application No. PCT/US2015/041037 on Jul.
(Continued)

(51) Int. Cl.
*H04L 27/36* (2006.01)
*H04W 72/04* (2009.01)
(Continued)

(52) U.S. Cl.
CPC ......... *H04L 27/362* (2013.01); *H04L 5/0057* (2013.01); *H04W 72/0413* (2013.01); *H04B 1/38* (2013.01)

(58) Field of Classification Search
CPC ..... H04L 27/362; H04L 5/003; H04L 5/0053; H04L 5/0057; H04W 72/0413;
(Continued)

(56) References Cited

U.S. PATENT DOCUMENTS

| 8,761,285 B2 * | 6/2014 | Addepalli | H04L 27/345 375/261 |
| 10,009,148 B1 * | 6/2018 | Chen | H04W 24/02 |

(Continued)

FOREIGN PATENT DOCUMENTS

| WO | WO-2007031088 A1 * | 3/2007 | H04L 9/065 |
| WO | WO-2011029072 A2 * | 3/2011 | H04L 25/0212 |

(Continued)

OTHER PUBLICATIONS

Albert, D., L. Liu, M. L. Moran, "Time Reversal processing for source location in an urban environment (L)", J. Acoust. Soc. Am., vol. 118, No. 2, pp. 616-619, Aug. 2005.*
(Continued)

*Primary Examiner* — Afsar M Qureshi

(57) ABSTRACT

The present teaching relates to wireless Internet of Things. In one example, a time reversal client is disclosed. The time reversal client comprises a processor, a memory communicatively coupled with the processor, and a set of instructions, when executed by the processor based on the memory, that cause the time reversal client to perform the following steps:
(Continued)

communicatively coupling with a time reversal server through a network, obtaining a set of channel state information (CSI), wherein the set of CSI is captured when at least one probing signal is sent from the wireless transmitter to the wireless receiver through a wireless multipath channel associated with a space, and causing the set of CSI to be sent to the time reversal server through the network.

20 Claims, 42 Drawing Sheets

Related U.S. Application Data 17, 2015, and a continuation-in-part of application No. 14/605,611, filed on Jan. 26, 2015, now Pat. No. 10,168,414, application No. 16/125,748, which is a continuation-in-part of application No. 15/584,052, filed on May 2, 2017, now Pat. No. 10,447,094, application No. 16/125,748, which is a continuation-in-part of application No. 15/434,813, filed on Feb. 16, 2017, now Pat. No. 10,129,862, which is a continuation-in-part of application No. PCT/US2017/021963, filed on Mar. 10, 2017, application No. 16/125,748, which is a continuation-in-part of application No. PCT/US2017/021957, filed on Mar. 10, 2017, application No. 16/125,748, which is a continuation-in-part of application No. PCT/US2017/027131, filed on Apr. 12, 2017, application No. 16/125,748, which is a continuation-in-part of application No. 15/384,217, filed on Dec. 19, 2016, now Pat. No. 10,440,705, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2016, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, said application No. 15/384,217 is a continuation-in-part of application No. 14/615,984, filed on Feb. 6, 2015, now Pat. No. 9,686,054, said application No. 15/384,217 is a continuation-in-part of application No. 15/004,314, filed on Jan. 22, 2016, now Pat. No. 10,014,982, said application No. 15/384,217 is a continuation-in-part of application No. 15/061,059, filed on Mar. 4, 2016, now Pat. No. 10,609,711, said application No. PCT/US2015/041037 is a continuation-in-part of application No. 14/605,611, filed on Jan. 26, 2015, now Pat. No. 10,168,414, said application No. 15/384,217 is a continuation-in-part of application No. 15/268,477, filed on Sep. 16, 2016, now Pat. No. 9,887,864, and a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, now Pat. No. 10,327,213, said application No. 15/384,217 is a continuation-in-part of application No. PCT/US2016/066015, filed on Dec. 19, 2016, application No. 16/125,748, which is a continuation-in-part of application No. PCT/US2017/015909, filed on Jan. 31, 2017, and a continuation-in-part of application No. PCT/US2016/066015, filed on Dec. 9, 2016, application No. 16/125,748, which is a continuation-in-part of application No. 15/861,422, filed on Jan. 3, 2018, which is a continuation-in-part of application No. 14/912,324, filed as application No. PCT/US2014/051148 on Aug. 14, 2014, now Pat. No. 9,900,794, said application No. 15/861,422 is a continuation-in-part of application No. 15/004,335, filed on Jan. 22, 2016, now Pat. No. 10,009,148, said application No. 15/861,422 is a continuation-in-part of application No. 15/326,112, filed as application No. PCT/US2015/041037 on Jul. 17, 2015, which is a continuation-in-part of application No. 14/605,611, filed on Jan. 26, 2015, now Pat. No. 10,168,414, said application No. 15/861,422 is a continuation-in-part of application No. 15/584,052, filed on May 2, 2017, now Pat. No. 10,447,094, said application No. 15/861,422 is a continuation-in-part of application No. 15/434,813, filed on Feb. 16, 2017, now Pat. No. 10,129,862, said application No. 15/861,422 is a continuation-in-part of application No. PCT/US2017/021964, filed on Mar. 10, 2017, said application No. 15/861,422 is a continuation-in-part of application No. PCT/US2017/021957, filed on Mar. 10, 2017, said application No. 15/861,422 is a continuation-in-part of application No. PCT/US2017/027131, filed on Apr. 12, 2017, said application No. 15/861,422 is a continuation-in-part of application No. 15/384,217, filed on Dec. 19, 2016, now Pat. No. 10,440,705, which is a continuation-in-part of application No. 13/706,342, filed on Dec. 5, 2012, now Pat. No. 9,883,511, and a continuation-in-part of application No. 13/969,271, filed on Aug. 16, 2013, now Pat. No. 9,882,675, and a continuation-in-part of application No. 13/969,320, filed on Aug. 16, 2013, now Pat. No. 9,559,874, and a continuation-in-part of application No. 15/041,677, filed on Feb. 11, 2016, now Pat. No. 9,794,156, and a continuation-in-part of application No. 15/200,430, filed on Jul. 1, 2016, now Pat. No. 9,736,002, which is a continuation of application No. 14/262,153, filed on Apr. 25, 2014, now Pat. No. 9,407,306, said application No. 15/384,217 is a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 14/605,611, filed on Jan. 26, 2015, now Pat. No. 10,168,414, said application No.

15/384,217 is a continuation-in-part of application No. 14/615,984, filed on Feb. 6, 2015, now Pat. No. 9,686,054, said application No. 15/384,217 is a continuation-in-part of application No. 15/004,314, filed on Jan. 22, 2016, now Pat. No. 10,014,982, said application No. 15/384,217 is a continuation-in-part of application No. 15/061,059, filed on Mar. 4, 2016, now Pat. No. 10,609,711, said application No. 15/384,217 is a continuation-in-part of application No. PCT/US2015/041037, filed on Jul. 17, 2015, and a continuation-in-part of application No. 14/605,611, filed on Jan. 26, 2015, now Pat. No. 10,168,414, said application No. 15/384,217 is a continuation-in-part of application No. 15/268,477, filed on Sep. 16, 2016, now Pat. No. 9,887,864, and a continuation-in-part of application No. 15/200,429, filed on Jul. 1, 2016, now Pat. No. 9,781,700, which is a continuation of application No. 14/943,648, filed on Nov. 17, 2015, now Pat. No. 9,402,245, which is a continuation of application No. 14/202,651, filed on Mar. 10, 2014, now Pat. No. 9,226,304, said application No. 15/384,217 is a continuation-in-part of application No. 15/284,496, filed on Oct. 3, 2016, now Pat. No. 10,327,213, said application No. 15/384,217 is a continuation-in-part of application No. PCT/US2016/066015, filed on Dec. 9, 2016, said application No. 15/861,422 is a continuation-in-part of application No. PCT/US2017/015909, filed on Jan. 31, 2017, and a continuation-in-part of application No. PCT/US2016/066015, filed on Dec. 9, 2016, application No. 16/125,748, which is a continuation-in-part of application No. 15/861,422, filed on Jan. 3, 2018, which is a continuation-in-part of application No. 15/873,806, filed on Jan. 17, 2018, now Pat. No. 10,270,642, which is a continuation-in-part of application No. 16/101,444, filed on Aug. 11, 2018, now Pat. No. 10,291,460.

(60) Provisional application No. 62/148,019, filed on Apr. 15, 2015, provisional application No. 62/025,795, filed on Jul. 17, 2014, provisional application No. 62/069,090, filed on Oct. 27, 2014, provisional application No. 62/331,278, filed on May 3, 2016, provisional application No. 62/295,970, filed on Feb. 16, 2016, provisional application No. 62/320,965, filed on Apr. 11, 2016, provisional application No. 62/307,081, filed on Mar. 11, 2016, provisional application No. 62/316,850, filed on Apr. 1, 2016, provisional application No. 62/307,172, filed on Mar. 11, 2016, provisional application No. 62/334,110, filed on May 10, 2016, provisional application No. 62/322,575, filed on Apr. 14, 2016, provisional application No. 62/409,796, filed on Oct. 18, 2016, provisional application No. 62/557,117, filed on Sep. 11, 2017, provisional application No. 62/593,826, filed on Dec. 1, 2017, provisional application No. 62/106,395, filed on Jan. 22, 2015, provisional application No. 62/128,574, filed on Mar. 5, 2015, provisional application No. 62/219,315, filed on Sep. 16, 2015, provisional application No. 62/235,958, filed on Oct. 1, 2015, provisional application No. 62/265,155, filed on Dec. 9, 2015, provisional application No. 62/411,504, filed on Oct. 21, 2016, provisional application No. 62/383,235, filed on Sep. 2, 2016, provisional application No. 62/384,060, filed on Sep. 6, 2016, provisional application No. 62/678,207, filed on May 30, 2018, provisional application No. 62/511,309, filed on May 25, 2017, provisional application No. 62/219,315, filed on Sep. 16, 2015.

(51) Int. Cl.
*H04L 5/00* (2006.01)
*H04B 1/38* (2015.01)

(58) Field of Classification Search
CPC .......... H04W 72/042; H04W 72/0406; H04W 72/04; H04B 1/38; H04B 1/3805; H04B 1/3827; H04B 1/3833; H04B 1/385; H04B 1/3855; H04B 1/3866; H04B 1/3877
See application file for complete search history.

(56) References Cited

U.S. PATENT DOCUMENTS

| 2004/0006265 A1* | 1/2004 | Alhussiny | A61B 5/0402 600/386 |
| 2013/0039168 A1* | 2/2013 | Forenza | H04B 7/022 370/221 |
| 2013/0315111 A1* | 11/2013 | Ashikhmin | H04W 16/14 370/280 |

FOREIGN PATENT DOCUMENTS

| WO | 2016/011433 A2 | 1/2016 | |
| WO | WO-2016011433 A2 * | 1/2016 | ........... G01S 5/0252 |

OTHER PUBLICATIONS

Chen, Y. et al., "Time-reversal wideband communications," IEEE Signal Processing Letters, vol. 20(12):1219-1222 (Dec. 2013).*
Han, F., Y.H. Yang, B. Wang, Y. Wu, K.J.R. Liu, "Time-reversal division multiple access over multi-path channels," IEEE Transactions on Communications, vol. 60(7):1953-1965 (Jul. 2012).*
Kyritsi, P. and G. Papanicolau, "One-bit Time Reversal for WLAN Applications", IEEE 16.sup.th Intern. Symp. on Personal, Indoor and Mobile Radio Comm., pp. 532-536, 2005.*
International Search Report of PCT/US2017/015909 dated Apr. 18, 2017 [PCT/ISA/210].
Written Opinion of PCT/US2017/015909 dated Apr. 18, 2017 [PCT/ISA/237].

* cited by examiner

| Technology | Existing Hardware? | Min # anchors | Low Cost? | Res. (m) LOS | Res. (m) NLOS | Commercial Examples |
|---|---|---|---|---|---|---|
| RSSI | ✓ | 3 | | 1-3 | 5-10 | Active RFID, iBeacon, SPIRIT Navigation, Modulated LEDs |
| TOA TDOA | ✗ | 3 | ✗ | 0.2-0.4 | 1-5 | UWB, Decawave, Time Domain, Zebra, Nanotron |
| AOA | ✓ | | | | 1-5 | None |
| Time Reversal | ✓ | 1 | ✓ | 0.02 | 0.02 | Origin Wireless |

FIG. 25

METHODS, DEVICES, SERVERS, APPARATUS, AND SYSTEMS FOR WIRELESS INTERNET OF THINGS APPLICATIONS

CROSS-REFERENCE TO RELATED APPLICATIONS

The present application hereby claims priority to, and incorporates by reference the entirety of the disclosures of, each of the following applications:
(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSETMS", filed on Jul. 17, 2015, published as WO 2016/011433A2 on Jan. 21, 2016,
    a. which claims priority to U.S. Provisional patent application 62/148,019, entitled "WIRELESS POSITIONING SYSTEMS", filed on Apr. 15, 2015,
    b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
      1. which claims priority to U.S. Provisional patent application 62/025,795, entitled "TIME-REVERSAL POSITIONING SYSTEMS", filed on Jul. 17, 2014, and
      2. which claims priority to U.S. Provisional patent application 62/069,090, entitled "TIME-REVERSAL POSITIONING SYSTEMS", filed on Oct. 27, 2014,
(b) U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
  (1) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
(c) U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017,
  (1) which claims priority to U.S. Provisional patent application 62/295,970, entitled "THE IMPACT OF SPATIAL FOCUSING EFFECTS ON MEDIUM ACCESS CONTROL DESIGN FOR 5G", filed on Feb. 16, 2016,
  (2) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,
(d) PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
  (1) which claims priority to U.S. Provisional patent application 62/307,081, entitled "TR-BREATH: TIME-REVERSAL BREATHING RATE ESTIMATION AND DETECTION", filed on Mar. 11, 2016,
  (2) which claims priority to U.S. Provisional patent application 62/316,850, entitled "TR-BREATH: TIME-REVERSAL BREATHING RATE ESTIMATION AND DETECTION", filed on Apr. 1, 2016,
(e) PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
  (1) which claims priority to U.S. Provisional patent application 62/307,172, entitled "RADIO SHOT: THROUGH-THE-WALL HUMAN IDENTIFICATION", filed on Mar. 11, 2016,
  (2) which claims priority to U.S. Provisional patent application 62/334,110, entitled "TIME-REVERSAL TRACKING WITHOUT MAPPING", filed on May 10, 2016,
(f) PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
  (1) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,
  (2) which claims priority to U.S. Provisional patent application 62/334,110, entitled "TIME-REVERSAL TRACKING WITHOUT MAPPING", filed on May 10, 2016, and
  (3) which claims priority to U.S. Provisional patent application 62/409,796, entitled "METHODS, DEVICES, SERVERS, AND SYSTEMS OF TIME REVERSAL BASED TRACKING", filed on Oct. 18, 2016,
(g) U.S. Provisional patent application 62/557,117, entitled "METHODS, DEVICES, SERVERS, APPARATUS, AND SYSTEMS FOR WIRELESS INTERNET OF THINGS APPLICATIONS", filed on Sep. 11, 2017,
(h) U.S. Provisional patent application 62/593,826, entitled "METHOD, APPARATUS, AND SYSTEM FOR OBJECT TRACKING AND NAVIGATION", filed on Dec. 1, 2017,
(i) U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
  (1) which is a Continuation-in-Part of U.S. patent application Ser. No. 13/706,342, entitled "WAVEFORM DESIGN FOR TIME-REVERSAL SYSTEMS," filed on Dec. 5, 2012, issued as U.S. Pat. No. 9,883,511 on Jan. 30, 2018,
  (2) which is a Continuation-in-Part of U.S. patent application Ser. No. 13/969,271, entitled "TIME-REVERSAL WIRELESS SYSTEMS HAVING ASYMMETRIC ARCHITECTURE", filed on Aug. 16, 2013, published as US2015/0049745A1 on Feb. 19, 2015, issued as U.S. Pat. No. 9,882,675 on Jan. 30, 2018,
  (3) which is a Continuation-in-Part of U.S. patent application Ser. No. 13/969,320, entitled "MULTIUSER TIME-REVERSAL DIVISION MULTIPLE ACCESS UPLINK SYSTEM WITH PARALLEL INTERFERENCE CANCELLATION", filed on Aug. 16, 2013, issued as U.S. Pat. No. 9,559,874 on Jan. 31, 2017,
  (4) which is a Continuation-in-Part of U.S. patent application Ser. No. 15/041,677, entitled "HANDSHAKING PROTOCOL FOR TIME-REVERSAL SYSTEM", filed on Feb. 11, 2016, published as US2016/

0164669A1 on Jun. 9, 2016, issued as U.S. Pat. No. 9,794,156 on Oct. 17, 2017, (5) which is a Continuation-in-Part of U.S. patent application Ser. No. 15/200,430, entitled "QUADRATURE AMPLITUDE MODULATION FOR TIME-REVERSAL SYSTEMS", filed on Jul. 1, 2016, published as US2016/0315797A1 on Oct. 27, 2016, issued as U.S. Pat. No. 9,736,002 on Aug. 15, 2017,
   a. which is a Continuation of U.S. patent application Ser. No. 14/262,153, entitled "QUADRATURE AMPLITUDE MODULATION FOR TIME-REVERSAL SYSTEMS", filed on Apr. 25, 2014, issued as U.S. Pat. No. 9,407,306 on Aug. 2, 2016, (6) which is a Continuation-in-Part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
   a. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
      1. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015, (7) which is a Continuation-in-Part of U.S. patent application Ser. No. 14/605,611, entitled "WIRELESS POSITIONING SYSTEM", filed on Jan. 26, 2015, published as US2016/0018508A1 on Jan. 21, 2016,
   a. which claims priority to U.S. Provisional patent application 62/069,090, entitled "TIME-REVERSAL POSITIONING SYSTEMS", filed on Oct. 27, 2014,
   b. which claims priority to U.S. Provisional patent application 62/025,795, entitled "TIME-REVERSAL POSITIONING SYSTEMS", filed on Jul. 17, 2014, (8) which is a Continuation-in-Part of U.S. patent application Ser. No. 14/615,984, entitled "JOINT WAVEFORM DESIGN AND INTERFERENCE PRE-CANCELLATION FOR TIME-REVERSAL SYSTEMS", filed on Feb. 6, 2015, issued as U.S. Pat. No. 9,686,054 on Jun. 20, 2017,
   a. which claims priority to U.S. Provisional patent application 62/025,795, entitled "TIME-REVERSAL POSITIONING SYSTEMS", filed on Jul. 17, 2014, (9) which is a Continuation-in-Part of U.S. patent application Ser. No. 15/004,314, entitled "TIME-REVERSAL TECHNOLOGIES FOR HYBRID WIRELESS NETWORKS", filed on Jan. 22, 2016, issued as U.S. Pat. No. 10,014,982 on Jul. 3, 2018,
   a. which claims priority to U.S. Provisional patent application 62/106,395, entitled "TIME-REVERSAL TECHNOLOGIES FOR HYBRID WIRELESS NETWORKS", filed on Jan. 22, 2015,

(10) which is a Continuation-in-Part of U.S. patent application Ser. No. 15/061,059, entitled "TIME-REVERSAL SCALABILITY FOR HIGH NETWORK DENSIFICATION", filed on Mar. 4, 2016,
   a. which claims priority to U.S. Provisional patent application 62/128,574, entitled "TIME-REVERSAL SCALABILITY FOR HIGH NETWORK DENSIFICATION", filed on Mar. 5, 2015,

(11) which is a Continuation-in-Part of PCT patent application PCT/US2015/041037, entitled "WIRELESS POSITIONING SYSTEMS", filed on Jul. 17, 2015, published as WO2016/011433A2 on Jan. 21, 2016,
   a. which claims priority to U.S. Provisional patent application 62/148,019, entitled "WIRELESS POSITIONING SYSTEMS", filed on Apr. 15, 2015,
   b. which is a continuation-in-part of U.S. patent application Ser. No. 14/605,611, entitled "WIRELESS POSITIONING SYSTEMS", filed on Jan. 26, 2015, published as US2016/0018508A1 on Jan. 21, 2016,
      1. which claims priority to U.S. Provisional patent application 62/025,795 entitled "TIME-REVERSAL POSITIONING SYSTEMS", filed on Jul. 17, 2014, and
      2. which claims priority to U.S. Provisional patent application 62/069,090 entitled "TIME-REVERSAL POSITIONING SYSTEMS", filed on Oct. 27, 2014,

(12) which is a Continuation-in-Part of U.S. patent application Ser. No. 15/268,477, entitled "METHODS, DEVICES AND SYSTEMS OF HETEROGENEOUS TIME-REVERSAL PARADIGM ENABLING DIRECT CONNECTIVITY IN INTERNET OF THINGS", filed on Sep. 16, 2016, issued as U.S. Pat. No. 9,887,864 on Feb. 6, 2018,
   a. which claims priority to U.S. Provisional patent application 62/219,315, entitled "ENABLING DIRECT CONNECTIVITY IN INTERNET OF THINGS: A HETEROGENEOUS TIME-REVERSAL PARADIGM", filed on Sep. 16, 2015,
   b. which is a Continuation-in-part of U.S. patent application Ser. No. 15/200,429, entitled "TIME-REVERSAL WIRELESS PARADIGM FOR INTERNET OF THINGS", filed on Jul. 1, 2016, issued as U.S. Pat. No. 9,781,700 on Oct. 3, 2017,
      1. which is a Continuation of U.S. patent application Ser. No. 14/943,648, entitled "TIME-REVERSAL WIRELESS PARADIGM FOR INTERNET OF THINGS", filed on Nov. 17, 2015, issued as U.S. Pat. No. 9,402,245 on Jul. 26, 2016,
         i. which is a Continuation of U.S. patent application Ser. No. 14/202,651, entitled "TIME-REVERSAL WIRELESS PARADIGM FOR INTERNET OF THINGS", filed on Mar. 10, 2014, issued as U.S. Pat. No. 9,226,304 on Dec. 29, 2015,

(13) which is a Continuation-in-Part of U.S. patent application Ser. No. 15/284,496, entitled "TIME-REVERSAL COMMUNICATION SYSTEMS", filed on Oct. 3, 2016,
   a. which claims priority to U.S. Provisional patent application 62/235,958, entitled "SYMBOL TIMING FOR TIME-REVERSAL SYSTEMS WITH SIGNATURE DESIGN", filed on Oct. 1, 2015,

(14) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018,
   a. which claims priority to U.S. Provisional patent application 62/265,155, entitled "INDOOR EVENTS DETECTION SYSTEM", filed on Dec. 9, 2015, b. which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016, c. which claims priority to U.S. Provisional patent application 62/383,235, entitled "TIME REVERSAL MONITORING SYSTEM", filed on Sep. 2, 2016, d. which claims priority to U.S. Provisional patent application 62/307,081, entitled "TR-BREATH: TIME-REVERSAL BREATHING RATE ESTIMATION AND DETECTION", filed on Mar. 11, 2016, e. which claims priority to U.S. Provisional patent application 62/316,850, entitled "TR-BREATH: TIME-REVERSAL BREATHING RATE ESTIMATION AND DETECTION", filed on Apr. 1, 2016,

(15) which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,

(16) which claims priority to U.S. Provisional patent application 62/295,970, entitled "THE IMPACT OF SPATIAL FOCUSING EFFECTS ON THE MEDIUM ACCESS CONTROL DESIGN FOR 5G", filed on Feb. 16, 2016,

(17) which claims priority to U.S. Provisional patent application 62/320,965, entitled "OPTIMAL RATE ADAPTATION FOR THROUGHPUT MAXIMIZATION IN TIME REVERSAL DIVISION MULTIPLE ACCESS", filed on Apr. 11, 2016,

(18) which claims priority to U.S. Provisional patent application 62/307,081, entitled "TR-BREATH: TIME-REVERSAL BREATHING RATE ESTIMATION AND DETECTION", filed on Mar. 11, 2016,

(19) which claims priority to U.S. Provisional patent application 62/316,850, entitled "TR-BREATH: TIME-REVERSAL BREATHING RATE ESTIMATION AND DETECTION", filed on Apr. 1, 2016,

(20) which claims priority to U.S. Provisional patent application 62/307,172, entitled "RADIO SHOT: THROUGH-THE-WALL HUMAN IDENTIFICATION", filed on Mar. 11, 2016,

(21) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016,

(22) which claims priority to U.S. Provisional patent application 62/334,110, entitled "TIME-REVERSAL TRACKING WITHOUT MAPPING", filed on May 10, 2016,

(23) which claims priority to U.S. Provisional patent application 62/409,796, entitled "METHODS, DEVICES, SERVERS, AND SYSTEMS OF TIME REVERSAL BASED TRACKING", filed on Oct. 18, 2016,

(24) which claims priority to U.S. Provisional patent application 62/383,235, entitled "TIME REVERSAL MONITORING SYSTEM", filed on Sep. 2, 2016,

(25) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016,

(26) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016, (j) PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017, (1) which claims priority to U.S. Provisional patent application 62/384,060, entitled "METHODS, DEVICES, SERVERS, SYSTEMS OF TIME REVERSAL MACHINE PLATFORM FOR BROADBAND WIRELESS APPLICATIONS", filed on Sep. 6, 2016, (2) which claims priority to U.S. Provisional patent application 62/331,278, entitled "USING VERTUAL ANTENNAS FOR POWER WAVEFORMING IN WIRELESS POWER TRANSMISSION SYSTEMS", filed on May 3, 2016, (3) which claims priority to U.S. Provisional patent application 62/307,081, entitled "TR-BREATH: TIME-REVERSAL BREATHING RATE ESTIMATION AND DETECTION", filed on Mar. 11, 2016, (4) which claims priority to U.S. Provisional patent application 62/316,850, entitled "TR-BREATH: TIME-REVERSAL BREATHING RATE ESTIMATION AND DETECTION", filed on Apr. 1, 2016, (5) which claims priority to U.S. Provisional patent application 62/322,575, entitled "TIME-REVERSAL RESONATING EFFECT AND ITS APPLICATION IN WALKING SPEED ESTIMATION", filed on Apr. 14, 2016, (6) which claims priority to U.S. Provisional patent application 62/334,110, entitled "TIME-REVERSAL TRACKING WITHOUT MAPPING", filed on May 10, 2016, (7) which claims priority to U.S. Provisional patent application 62/409,796, entitled "METHODS, DEVICES, SERVERS, AND SYSTEMS OF TIME REVERSAL BASED TRACKING", filed on Oct. 18, 2016, (8) which claims priority to U.S. Provisional patent application 62/383,235, entitled "TIME REVERSAL MONITORING SYSTEM", filed on Sep. 2, 2016, (9) which claims priority to U.S. Provisional patent application 62/411,504, entitled "METHOD, APPARATUS, AND SYSTEM FOR WIRELESS INTERNET OF THINGS APPLICATIONS", filed on Oct. 21, 2016,

(10) which claims priority to U.S. Provisional patent application 62/307,172, entitled "RADIO SHOT: THROUGH-THE-WALL HUMAN IDENTIFICATION", filed on Mar. 11, 2016,

(11) which is a Continuation-in-Part of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017, whose US national stage entry is Ser. No. 16/060,710, filed on Jun. 8, 2018, (k) U.S. Provisional patent application 62/678,207, entitled "METHOD, APPARATUS, AND SYSTEM FOR OBJECT TRACKING AND MOTION MONITORING", filed on May 30, 2018, (l) U.S. patent application Ser. No. 15/861,422, entitled "METHOD, APPARATUS, SERVER, AND SYSTEMS OF TIME-REVERSAL TECHNOLOGY", filed on Jan. 3, 2018.

(m) U.S. patent application Ser. No. 15/873,806, entitled "METHOD, APPARATUS, AND SYSTEM FOR OBJECT TRACKING AND NAVIGATION", filed on Jan. 17, 2018.
(n) U.S. patent application Ser. No. 16/101,444, entitled "METHOD, APPARATUS, AND SYSTEM FOR WIRELESS MOTION MONITORING", filed on Aug. 11, 2018.

TECHNICAL FIELD

The present teaching generally relates to wireless Internet of Things. More specifically, the present teaching relates to computation, storage, application, and processing of channel state information based on time reversal techniques.

BACKGROUND

Smart objects can be connected to the Internet and communicate with each other, either using wired or wireless connections, to form an "Internet of Things." The smart objects can include, for example, phones, personal desktop or laptop computers, tablet computers, refrigerators, and many other items. By enabling objects to communicate with one another, the objects may be able to determine what users like, want, and/or need, and act accordingly, potentially improving the quality of people's lives. The term "Internet of Things" was firstly proposed by Kevin Ashton in his presentation at Procter & Gamble in 1999. During the presentation, Ashton envisioned the potential of Internet of Things by stating "The Internet of Things has the potential to change the world, just as the Internet did. Maybe even more so." In 2005, the Internet of Things was introduced by the International Telecommunication Union (ITU) through the ITU Internet report.

Current wireless technologies include two groups: 1) wireless technologies for low-data-rate and low-power applications such as remote control, and 2) wireless technologies for high data rate applications such as video streaming. The technologies suitable for low data rate applications may not be able to meet the requirements of the high data rate applications. For example, a wireless communication technology suitable for low power, low data rate applications is ZigBee. Mainly based on IEEE 802.15.4, ZigBee can operate in the 868 MHz, 915 MHz and 2.4 GHz bands with respective data rates of 20 kb/s, 40 kb/s and 250 kb/s. A similar technology is Z-Wave, whose main purpose is to enable short message transmission from a control node to multiple nodes. The maximum speed of Z-Wave is 200 kb/s working at 2.4 GHz band. An advantage of ZigBee and Z-Wave is the low price. Both of these technologies are designed for low-power applications in battery-operated devices. Moreover, ZigBee includes a sleep mode mechanism to reduce power consumption. The complexity of hardware is low: 32-128 kbytes of memory is enough to implement the system including the higher layers. The disadvantage of ZigBee and Z-Wave is their low data rate. Moreover, the 2.4 GHz frequency band is crowded with interfering devices, e.g., microwave ovens, Wi-Fi equipment, and cordless phones. The sub-GHz electromagnetic (EM) waves propagate very far, so very high node density may not be achievable due to the high interference levels generated by other similar devices.

Technologies for high data rate applications include Bluetooth and Wi-Fi. Bluetooth, based on IEEE 802.15.1, is a wireless technology for exchanging data over short distances. Compared with ZigBee and Z-Wave, the data rate can be increased to Megabit per second (Mbps). Wi-Fi, based on IEEE 802.11, allows an electronic device to exchange data or connect to the Internet wirelessly. The speed of Wi-Fi can be up to several Gigabit per second (Gbps) according to IEEE 802.11ac with the help of multiple-in-multiple-out (MIMO) technology and high order modulation. The advantage of these two technologies is the high data rate. However, they require higher power consumption, higher complexity of hardware (MIMO in Wi-Fi), and thus higher price. Because both the transmitter and the receiver use the same architecture, i.e., symmetric architecture is used, the power consumption of terminal devices is high. In addition, a large number of Wi-Fi access points (APs) deployed close to each other operating in the same or adjacent channels may interfere with each other. Another wireless technology is the 3G/4G mobile communications. However, the indoor coverage of 3G/4G signals may be poor.

A big challenge of indoor communication and indoor Internet of Things applications is the presence of many multi-paths with similar path lengths. While multipath fading may be known to cause problems in communication and may often be suppressed by rake receivers or equalizers, time reversal machine (TRM) technology recognizes hidden values of multi-paths and seeks to capture and exploit the inherent structures of the multi-paths to achieve high communication capacity, low power consumption, good battery life, collision-free multiple access, low cost terminal devices, heterogeneous terminal devices, indoor positioning and tracking, life detection, scalability, privacy and security, etc. A high sampling frequency may be used to capture the useful details of the multi-paths. Some examples that may be achieved by the TRM system include: Indoor positioning/tracking: The TRM system exploits the details of the multi-paths so that each TRM device can determine the current location of the individual receiver; Life detection: The TRM system exploits the changes of the details of the multi-paths and allows TRM devices to detect movements of living things in the environment, e.g., breathing of humans in the environment; and Event monitoring/Security system: The TRM system exploits the changes of the details of the multi-paths and allows TRM devices to detect movement/state change of objects in the environment, e.g., movement of window/door/furniture in a venue.

The broadband wireless channels used by the time reversal communication may be a set of wireless channels (e.g., Wi-Fi channels with 20 or 40 MHz bandwidth, Zigbee, BlueTooth, Z-Wave), mobile communication channels (e.g., 3G/4G/5G/6G, WiMax), etc. Multiple antennas may be used in the transmitter and receiver. Multiple narrow-band channels may be combined to achieve a large effective bandwidth.

SUMMARY

The present teaching generally relates to wireless Internet of Things. More specifically, the present teaching relates to computation, storage, application, and processing of channel state information based on time reversal techniques.

In one example, a time reversal client is disclosed. The time reversal client comprises a processor, a memory communicatively coupled with the processor, and a set of instructions, when executed by the processor based on the memory, that cause the time reversal client to perform the following steps: communicatively coupling with a time reversal server through a network, obtaining a set of channel state information (CSI), wherein the set of CSI is captured when at least one probing signal is sent from the wireless transmitter to the wireless receiver through a wireless multipath channel associated with a space, and causing the set of CSI to be sent to the time reversal server through the network.

In another example, a method implemented on a time reversal client that comprises a processor, a memory, and a set of instructions is disclosed. The method comprises: communicatively coupling the time reversal client with a time reversal server through a network using the processor and the memory through the set of instructions executed by the processor using the memory, wherein the time reversal client comprises at least one of: a wireless transmitter and a wireless receiver; obtaining a set of CSI, wherein the set of CSI is captured when at least one probing signal is sent from the wireless transmitter to the wireless receiver through a wireless multipath channel associated with a space; and causing the set of CSI to be sent to the time reversal server through the network.

In a different example, a time reversal server is disclosed. The time reversal server comprises a processor, a memory communicatively coupled with the processor, and a set of instructions, when executed by the processor based on the memory, that cause the time reversal client to perform the following steps: communicatively coupling with a time reversal client through a network, wherein the time reversal client to comprise at least one of a wireless transmitter and a wireless receiver, wherein the time reversal client to obtain a set of CSI, wherein the set of CSI is captured when at least one probing signal is sent from the wireless transmitter to the wireless receiver through a wireless multipath channel associated with a space, and receiving the set of CSI from the time reversal client through the network.

In another example, a time reversal parameter generation module is disclosed. The time reversal parameter generation module comprises a processor, a memory communicatively coupled with the processor, and a set of instructions, when executed by the processor based on the memory, that cause the time reversal parameter generation module to perform the following steps. A request is received for at least one time reversal parameter (TRP) from an authorized time reversal application module. A particular TRP of the at least one TRP is based on at least one of: a set of test channel state information (CSI) and a set of reference CSI. The set of test CSI is captured when at least one first probing signal is sent through a first wireless multipath channel from a first wireless transmitter to a first wireless receiver. The set of reference CSI is captured when at least one second probing signal is sent through a second wireless multipath channel from a second wireless transmitter to a second wireless receiver. At least one of the set of test CSI and the set of reference CSI is obtained. The set of reference CSI is obtained from at least one of: a CSI storage module and the authorized time reversal application module. The CSI storage module is configured to: store the set of reference CSI in a CSI-storage format in a non-volatile storage system comprising at least one of: a cloud storage module, a networked storage, and a connected storage module, and provide the set of reference CSI in a CSI-transmission format to at least one of: the time reversal parameter generation module and the authorized time reversal application module. The particular TRP is determined based on at least one of: the set of test CSI and the set of reference CSI. The particular TRP is provided to the authorized time reversal application module in response to the request.

In a different example, a method implemented on a time reversal parameter generation module that comprises a processor, a memory, and a set of instructions is disclosed. A request is received for at least one time reversal parameter (TRP) from an authorized time reversal application module. A particular TRP of the at least one TRP is based on at least one of: a set of test channel state information (CSI) and a set of reference CSI. The set of test CSI is captured when at least one first probing signal is sent through a first wireless multipath channel from a first wireless transmitter to a first wireless receiver. The set of reference CSI is captured when at least one second probing signal is sent through a second wireless multipath channel from a second wireless transmitter to a second wireless receiver. At least one of the set of test CSI and the set of reference CSI is obtained. The set of reference CSI is obtained from at least one of: a CSI storage module and the authorized time reversal application module. The CSI storage module is configured to: store the set of reference CSI in a CSI-storage format in a non-volatile storage system comprising at least one of: a cloud storage module, a networked storage, and a connected storage module, and provide the set of reference CSI in a CSI-transmission format to at least one of: the time reversal parameter generation module and the authorized time reversal application module. The particular TRP is computed based on at least one of: the set of test CSI and the set of reference CSI. The particular TRP is based on at least one of: a time reversal resonating strength (TRRS), a cross-correlation, an inner product of two vectors, a similarity score and a distance score, of two particular CSI from at least one of: the set of test CSI and the set of reference CSI. The particular TRP is sent to the authorized time reversal application module in response to the request.

In yet another example, a method implemented on a time reversal parameter generation module that comprises a processor, a memory, and a set of instructions is disclosed. At least one of a set of test CSI and a set of reference CSI is obtained, using the processor and the memory of the time reversal parameter generation module. The set of test CSI is captured when at least one first probing signal is sent through a first wireless multipath channel from a first wireless transmitter to a first wireless receiver. The set of reference CSI is captured when at least one second probing signal is sent through a second wireless multipath channel from a second wireless transmitter to a second wireless receiver. At least one time reversal parameter (TRP) is generated based on the at least one of: the set of test CSI and the set of reference CSI. The at least one TRP is provided to another module for further processing.

In another example, a channel state information storage module is disclosed. The channel state information storage module comprises a processor, a memory communicatively coupled with the processor, and a set of instructions, when executed by the processor based on the memory, that cause the channel state information storage module to perform the following steps. A set of reference channel state information (CSI) is obtained. The set of reference CSI is captured when at least one probing signal is sent through a wireless multipath channel between a wireless transmitter and a wireless receiver. The set of reference CSI is stored in a CSI-storage format in a non-volatile storage system comprising at least one of: a cloud storage module, a networked storage module, and a connected storage module. A retrieval request is received for the set of reference CSI. The set of reference CSI is provided in a CSI-transmission format, in response to the request for CSI processing by at least one of: an authorized time reversal parameter generation module for generating at least one time reversal parameter (TRP), an authorized time reversal application module for passing to the authorized time reversal parameter generation module for generating the at least one TRP, and another module.

In another example, a method implemented on a channel state information storage module that comprises a processor, a memory, and a set of instructions is disclosed. A set of reference channel state information (CSI) is obtained using the processor and the memory of the channel state information storage module. The set of reference CSI is captured when at least one probing signal is sent through a wireless multipath channel between a wireless transmitter and a wireless receiver. The set of reference CSI is stored in a CSI-storage format in a non-volatile storage system comprising at least one of: a cloud storage module, a networked storage module, and a connected storage module. A retrieval request is received for the set of reference CSI. The set of reference CSI is provided in a CSI-transmission format, in response to the request for CSI processing by at least one of: an authorized time reversal parameter generation module for generating at least one time reversal parameter (TRP), an authorized time reversal application module for passing to the authorized time reversal parameter generation module for generating the at least one TRP, and another module.

In another example, a channel state information storage module is disclosed. The channel state information storage module comprises a processor, a memory communicatively coupled with the processor, and a set of instructions, when executed by the processor based on the memory, that cause the channel state information storage module to perform the following steps. A set of reference channel state information (CSI) is obtained. The set of reference CSI is captured when at least one probing signal is sent through a wireless multipath channel between a wireless transmitter and a wireless receiver. Each of the set of reference CSI comprises at least one of: a channel impulse response, a channel frequency response, and another channel state data of the wireless multipath channel between the wireless transmitter and the wireless receiver, and a physical layer channel information. Each of the at least one probing signal comprises at least one of: an impulse signal, a pseudo-random sequence, and another probing signal. The set of reference CSI is stored in a CSI-storage format in a non-volatile storage system comprising at least one of: a cloud storage module, a networked storage module, and a connected storage module. A retrieval request is received for the set of reference CSI. The set of reference CSI is provided in a CSI-transmission format, in response to the request for CSI processing by at least one of: an authorized time reversal parameter generation module for generating at least one time reversal parameter (TRP), an authorized time reversal application module for passing to the authorized time reversal parameter generation module for generating the at least one TRP, and another module.

In another example, a time reversal application module is disclosed. The time reversal application module comprises a processor, a memory communicatively coupled with the processor, and a set of instructions, when executed by the processor based on the memory, that cause the time reversal application module to perform the following steps. It is determined that a task is to be performed based on at least one time reversal parameter (TRP). A particular TRP is based on at least one of: a set of test channel state information (CSI) identified by a first identification information, and a set of reference CSI identified by a second identification information. The set of test CSI is captured when at least one first probing signal is sent through a first wireless multipath channel from a first wireless transmitter to a first wireless receiver. The set of reference CSI is captured when at least one second probing signal is sent through a second wireless multipath channel from a second wireless transmitter to a second wireless receiver. At least one request for the at least one TRP is sent to at least one TRP generation module communicatively coupled with the time reversal application module. The at least one TRP is received in a TRP format from the at least one TRP generation module. At least a part of the task is caused to be performed based on the at least one TRP received in the TRP format.

In another example, a method implemented on a time reversal application module that comprises a processor, a memory, and a set of instructions is disclosed. It is determined that a task is to be performed based on at least one time reversal parameter (TRP), using the processor and the memory of the time reversal application module with the set of instructions. A particular TRP is based on at least one of: a set of test channel state information (CSI) identified by a first identification information, and a set of reference CSI identified by a second identification information. The set of test CSI is captured when at least one first probing signal is sent through a first wireless multipath channel from a first wireless transmitter to a first wireless receiver. The set of reference CSI is captured when at least one second probing signal is sent through a second wireless multipath channel from a second wireless transmitter to a second wireless receiver. At least one request for the at least one TRP is sent to at least one TRP generation module communicatively coupled with the time reversal application module. The at least one TRP is received in a TRP format from the at least one TRP generation module. At least a part of the task is caused to be performed based on the at least one TRP received in the TRP format.

In another example, a method implemented on a time reversal application module that comprises a processor, a memory, and a set of instructions is disclosed. It is determined that a task is to be performed based on at least one time reversal parameter (TRP), using the processor and the memory of the time reversal application module with the set of instructions. A particular TRP is based on at least one of: a set of test channel state information (CSI) identified by a first identification information, and a set of reference CSI identified by a second identification information. The set of test CSI is captured when at least one first probing signal is sent through a first wireless multipath channel from a first wireless transmitter to a first wireless receiver. The set of reference CSI is captured when at least one second probing signal is sent through a second wireless multipath channel from a second wireless transmitter to a second wireless receiver. A particular test CSI comprises at least one of: a first channel impulse response, a first channel frequency response, and another first channel state data of the first wireless multipath channel between the first wireless transmitter and the first wireless receiver. A particular reference CSI comprises at least one of: a second channel impulse response, a second channel frequency response, and another second channel state data of the second wireless multipath channel between the second wireless transmitter and the second wireless receiver. The particular TRP is based on at least one of: a time reversal resonating strength (TRRS), a cross-correlation, an inner product, a similarity score and a distance score of the particular test CSI and the particular reference CSI. At least one request for the at least one TRP is sent to at least one TRP generation module communicatively coupled with the time reversal application module. The at least one TRP is received in a TRP format from the at least one TRP generation module. At least a part of the task is caused to be performed based on the at least one TRP received in the TRP format.

Other concepts relate to software for implementing the present teaching on exploring computation, storage, application, and processing of channel state information based on time reversal techniques. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

DESCRIPTION OF DRAWINGS

FIG. 25 illustrates a summary of capabilities of existing state-of-the-art indoor positioning systems;

DETAILED DESCRIPTION

Figure 1:
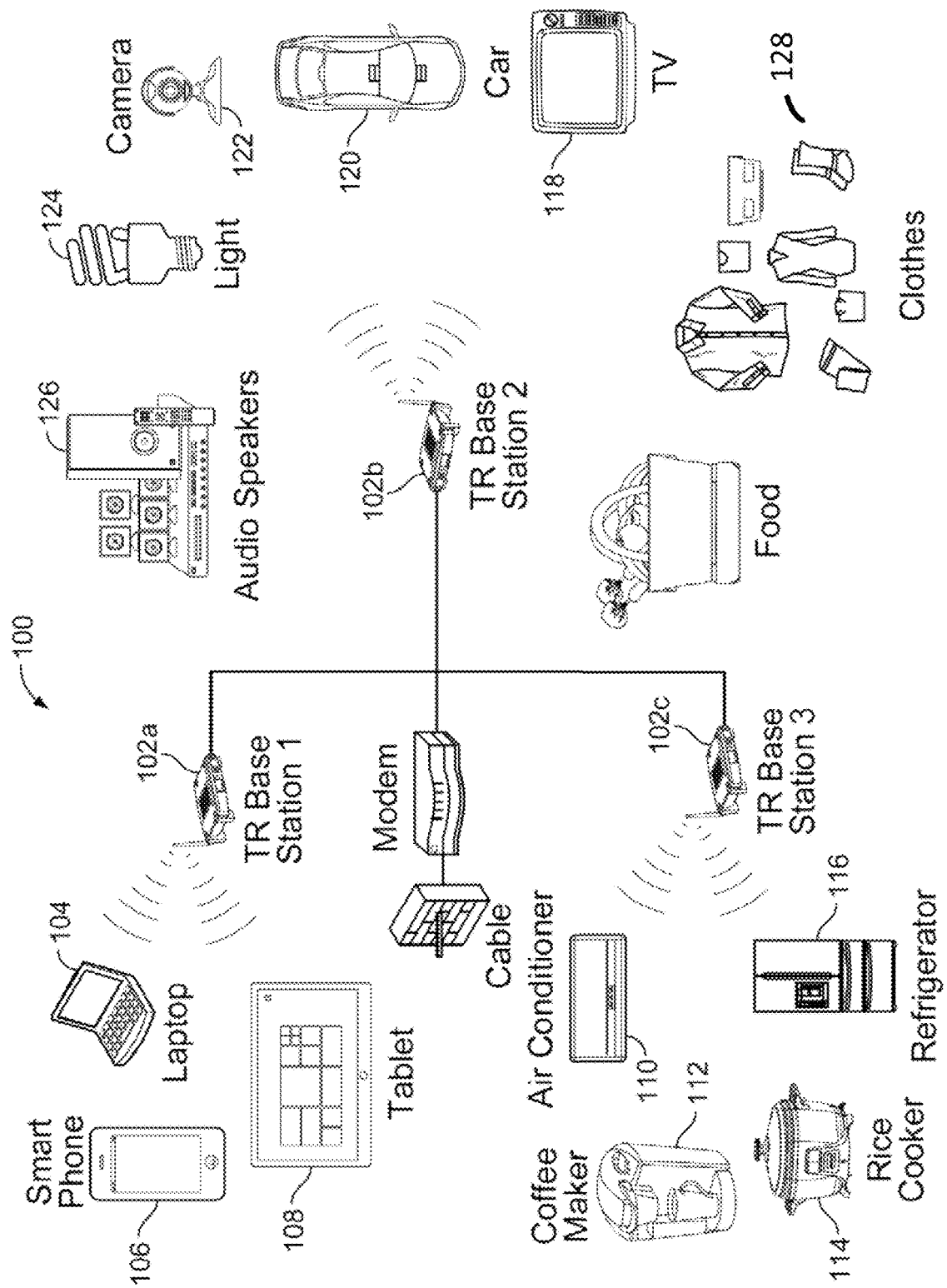
FIG. 1 shows an exemplary diagram of a time-reversal system for the Internet of Things, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, devices, servers, and other implementations directed to computation, storage, application, and processing of channel state information (CSI) based on time reversal techniques. The CSI may come from a wireless multipath channel in a rich scattering environment. Each path of the multipath channel may be treated as a widely distributed virtual antenna such that the multipath channel can provide a high-resolution spatial-temporal resonance, i.e., the focusing effect.

In one embodiment, the system disclosed in the present teaching may comprise a time reversal parameter generation module, a channel state information storage module, and/or a time-reversal application module. Each of the three modules may include a processor, a memory communicatively coupled with the processor, and a set of instructions, when executed by the processor based on the memory, that cause the module to perform some steps.

In one embodiment, the time reversal parameter generation module can obtain a set of test CSI and a set of reference CSI. The set of test CSI may be captured when a first probing signal is sent through a first wireless multipath channel from a first wireless transmitter to a first wireless receiver. The set of reference CSI is captured when a second probing signal is sent through a second wireless multipath channel from a second wireless transmitter to a second wireless receiver. The first probing signal may comprise at least one of: a first impulse signal, a first pseudo-random sequence and another first probing signal. The second probing signal may comprise at least one of: a second impulse signal, a second pseudo-random sequence, and another second probing signal. The first wireless multipath channel and the second wireless multipath channel may be at least one of: a Wi-Fi channel, a Wi-Fi-like channel, an LTE channel, an LTE-like channel, a WiMax channel, a WiMax-like channel, and another wireless multipath channel.

In one example, the first wireless transmitter and the first wireless receiver are included in a time reversal client. The time reversal client may be communicatively coupled with a time reversal server through a network. The time reversal client may cause a set of CSI, e.g. the set of test CSI, and/or an identification data to be sent to the time reversal server through the network. The network may be at least one of: internet, an internet-protocol network, and another multiple access network. The wireless transmitter and the wireless receiver may be associated with the physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W-CDMA, HSDPA, W-CDMA, FOMA, 1×EV-DO, IS-856, TD-SCDMA, GAN, UMA, HSUPA, LTE, 2.5G, 3G, 3.5G, 3.9G, 4G, 5G, 6G, 7G and beyond, another wireless system and another mobile system. The time reversal client may be associated with at least one of: a user and a user client, by an identification server through the time reversal server using an identification data of the time reversal client.

At least one of the first wireless multipath channel and the second wireless multipath channel may be associated with a space. In accordance with various embodiments, based on the set of CSI associated with the wireless transmitter and the wireless receiver in the time reversal client, the time reversal client may perform or help to perform at least one of the following: guarding the space, classifying an event associated with the space, classifying a security event associated with the space to be secured, identifying a periodic activity associated with the space, computing an analytics associated with the space, and computing a breathing analytics associated with a living object in the space.

In one example, a user device or user module may request the time reversal server to perform a task based on a TRP which is based on at least one of: the set of CSI and another set of CSI. The user device may send a user identification data to the time reversal server. The user device may be associated with at least one of: the time reversal client, the wireless transmitter, the wireless receiver, the wireless multipath channel, the space and the set of CSI, by an identification server associated with the time reversal server through the user identification data from the user device and an identification data from the time reversal client.

In one example, the identification server may comprise a processor, a memory communicatively coupled with the processor, and a set of instructions to be executed by the processor using the memory to: receive a first identification data of a time reversal (TR) client through a TR server, wherein the TR client to comprise at least one of: a wireless transmitter and a wireless receiver, wherein the TR client is connected to the TR server through a network, wherein a set of CSI is captured when at least one probing signal is sent from the wireless transmitter to the wireless receiver through a wireless multipath channel associated with a space, receive a second identification data of a user module through the TR server, wherein the user module to request the TR server to perform a task based on a time reversal parameter (TRP) which is based on at least one of: the set of CSI and another set of CSI, and associate the user module with the TR client based on the first identification data and the second identification data. The present teaching also discloses a method of an identification server for performing the above steps, and a TR system comprising the TR server, the TR client, and the identification server.

The TR client may send the first identification data to the TR server through a first network. The user module may send the second identification data to the TR server through a second network. At least one of the first network and the second network is the Internet. At least one of the first identification data and the second identification data, comprise at least one of: an alpha-numeric name, a number, a code, an internet protocol (IP) address, a MAC address, a hardware address, a port number, a globally unique ID (GUID), a universally unique ID (UUID), a user name, a user ID, a postal address, a physical address, a telephone number, a social network ID, an email address, a web address, a list of ID of private network devices, a list of WiFi router names, a software name, a software ID, a software version, an ID of the wireless transmitter, and an ID of the wireless receiver. At least one probing signal comprises at least one of: an impulse signal, a pseudo-random sequence, and another probing signal.

Digital data may be communicated between the wireless transmitter and the wireless receiver using the set of CSI. The digital data may be in a waveform to be designed for at least one of: wireless power transfer, wireless communication, wireless event detection, and wireless channel analysis, associated with the wireless transmitter and the wireless receiver. In an example of power transfer, the waveform may be designed to maximize and/or improve the power transfer efficiency. In an example of wireless communication, the waveform may be designed to improve user QoS, such as improving sum rate, worst-case user rate, BER etc. In an example of event detection, a conjugated waveform may be designed for calculating the TRP, and thus improving the classification performance, as different events are farther away in the TRP space.

In one example, power may be wirelessly transferred between the wireless transmitter and the wireless receiver using the set of CSI to perform wireless charging.

Each of the first wireless transmitter, the first wireless receiver, the second wireless transmitter and the second wireless receiver may have at least one antenna. Each of the set of test CSI may be captured when one of the at least one first probing signal is sent through the first wireless multipath channel from one of at least one antenna of the first wireless transmitter to one of at least one antenna of the first wireless receiver. Each of the set of reference CSI may be captured when one of the at least one second probing signal is sent through the second wireless multipath channel from one of at least one antenna of the second wireless transmitter to one of at least one antenna of the second wireless receiver.

The system may determine a particular time reversal parameter (TRP) based on the set of test CSI and/or the set of reference CSI. The TRP may be utilized in various use cases.

In one example, the TRP may be determined based on a time reversal resonance strength (TRRS) which can characterize a similarity between two CSIs. For example, in a localization use case, a manager of an animal zoo can put a Wi-Fi device, served as a Bot, on an animal in cage, e.g. a monkey, a tiger, or a bird, and utilize the disclosed system to determine a location of the animal in the cage and/or determine whether the animal is outside the cage. To be specific, the disclosed system can use another Wi-Fi device, served as Origin here, to obtain reference CSIs from the Bot for all possible locations the Bot can be in the cage and store these reference CSIs associated with corresponding locations in the cage. Then during the positioning process, the system can detect the test CSI of the Bot at any time, determine a similarity, e.g. based on TRRS, between the test CSI and each of the stored reference CSIs, and select the stored reference CSI that is closest to the test CSI, e.g. when their TRRS is the largest among all TRRS calculated based on the test CSI and the stored reference CSIs. In one case, when the largest TRRS exceeds a pre-determined threshold, the system can estimate that the Bot as well as the animal is located at the location in the cage corresponding to the selected reference CSI at this time. In another case, when the largest TRRS does not exceed the pre-determined threshold, the system can estimate that the Bot as well as the animal is outside the cage at this time. This may give an alert that the animal has escaped from the cage. In general, similar localizations as above can be applied for locating an object in a predetermined range based on the TRP determined based on a degree of similarity between test CSI and reference CSI.

In accordance with various embodiments of the present teaching, the particular TRP may be calculated based on at least one of: a TRRS, a cross-correlation, an inner product of two vectors, a similarity score, a distance score, a phase correction, a timing correction, a timing compensation, and a phase offset compensation, of two particular CSI from at least one of: the set of test CSI and the set of reference CSI. For example, the particular TRP may be calculated based on an inner-product of two vectors corresponding to two particular CSI each of which comes from at least one of: the set of test CSI and the set of reference CSI.

In one embodiment, multiple intermediate TRPs may be combined to provide a final TRP. Each of the multiple intermediate TRPs may be based on two particular CSIs associated with small bandwidth, while the final TRP may be associated with a larger bandwidth.

In one embodiment, the determination of the particular TRP comprises preprocessing two particular CSI each of which comes from at least one of: the set of test CSI and the set of reference CSI, before the computation of the particular TRP based on the two particular preprocessed CSI. In one embodiment, the determination of at least one TRP may comprise: transforming two particular CSI from at least one of: the set of test CSI and the set of reference CSI, and using the two particular transformed CSI in the determination of the at least one TRP.

This determination may be based on at least one of: a transformation, a frequency-domain folding, a frequency-domain phase offset cleaning, a time-domain operation and another operation, to correct at least one of: a carrier frequency offset (CFO), a sampling frequency offset (SFO), a carrier phase offset (CPO), a sampling phase offset (SPO), an initial phase offset (IPO), a symbol timing offset (STO), and another problem, in the two particular CSI before the computation of the particular TRP. The frequency-domain folding of a CSI may comprise creating at least one new CSI feature each by combining a respective pair of frequency-domain components of the CSI with related phases such that the at least one new CSI feature is free from at least one of: CFO, SFO, CPO, SPO, IPO, and STO. The frequency-domain phase offset cleaning of a CSI may comprises: estimating at least one of a frequency-domain linear phase component of the CSI and a frequency-domain initial phase component of the CSI, and subtracting the at least one of: estimated frequency-domain linear phase component and estimated frequency-domain initial phase component, from the frequency-domain components of the CSI such that the frequency-domain components of the CSI are free from at least one of: CFO, SFO, CPO, SPO, IPO, and STO.

The set of reference CSI may be obtained from a CSI storage module and/or an authorized time reversal application module. The CSI storage module may store the set of reference CSI in a CSI-storage format in a non-volatile storage system, e.g. a cloud storage module, a networked storage, or a connected storage module. The set of reference CSI may be stored with a set of second auxiliary data associated with the set of reference CSI. The set of reference CSI may be stored based on antenna information of the wireless transmitter and wireless receiver. The CSI storage module may also receive a retrieval request for the set of reference CSI and provide the set of reference CSI in a CSI-transmission format to a time reversal parameter generation module for generating TRP, to an authorized time reversal application module for performing a task based on TRP, and/or to another module for CSI processing, through at least one interface that is made available to at least one of: an authorized time reversal parameter generation module, an authorized time reversal application module, and another module. The CSI processing may comprise: analyzing the set of reference CSI provided in the CSI-transmission format, determining at least one value based on at least one of: a temporal behavior of the set of reference CSI, a periodic behavior of the set of reference CSI, a cyclo-stationary behavior of the set of reference CSI, a variational behavior of a similarity score between temporally adjacent CSI, a spatial behavior of the set of reference CSI, and a focusing-ball behavior of a similarity score between spatially adjacent CSI.

In one example, an analytics server may comprise a processor, a memory communicatively coupled with the processor, and a set of instructions to be executed by the processor using the memory to: obtain through a time reversal (TR) server a set of channel state information (CSI) stored in a CSI storage module, wherein the CSI storage module obtained the set of CSI from a TR client through the TR server and a network, wherein the TR client to comprise at least one of: a wireless transmitter and a wireless receiver associated with a space, wherein the set of CSI is captured when at least one probing signal is sent from the wireless transmitter to the wireless receiver through a wireless multipath channel associated with the space, analyze the set of CSI, compute a set of analytics based on the set of CSI, and store the set of analytics. The set of CSI may be associated with a user or the space. The time reversal client is associated with at least one of: a user and a user client, by an identification server through the time reversal server using an identification data of the time reversal client. The present teaching also discloses a method of an analytics server for performing the above steps, and a TR system comprising the CSI storage module, and the analytics server.

In one example, a user device may request the time reversal server to perform a task based on a time reversal parameter (TRP) which is based on at least one of: the set of CSI and another set of CSI. The user device may send a user identification data to the time reversal server. The user device is associated with at least one of: the time reversal client, the wireless transmitter, the wireless receiver, the wireless multipath channel, the space and the set of CSI, by an identification server associated with the time reversal server through the user identification data from the user device and an identification data from the time reversal client.

In one example, a big data server may comprise a processor, a memory communicatively coupled with the processor, and a set of instructions to be executed by the processor using the memory to: receive a query associated with a target from a third party server, determine through an association server that at least one of: the target and the query, are associated with at least one of: a set of analytics and a set of channel state information (CSI) associated with the set of analytics, wherein the set of analytics to be computed by an analytics server based on the set of channel state information (CSI) stored in a CSI storage module, wherein the CSI storage module obtained the set of CSI from a TR client through a TR server and a network, wherein the TR client to comprise at least one of: a wireless transmitter and a wireless receiver associated with a space, wherein the set of CSI is captured when at least one probing signal is sent from the wireless transmitter to the wireless receiver through a wireless multipath channel associated with the space, obtain at least one of: the set of analytics and the set of CSI, wherein at least one of: the set of analytics and the set of CSI, is further analyzed by at least one of: the analytics server and the big data server, based on at least one of: the query and the target, prepare an answer to the query based on the analysis, and reply the query with the answer. The present teaching also discloses a method of a big data server for performing the above steps, and a TR system comprising the third party server, and the big data server.

The CSI-transmission format may be different from or the same as the CSI-storage format. The set of reference CSI may be processed and represented using a first method in the CSI-storage format to achieve at least one of: reduced storage size, high security, privacy, ease of access, low computational complexity, fast search, low power, ease of management, low hardware requirement, low software requirement, another big data advantage and another storage advantage. The set of reference CSI may be processed and represented using a second method in the CSI-transmission format to achieve at least one of: reduced transmission bandwidth, streaming, low latency, low delay, low computational complexity, high security, low hardware requirement, low power, ease of management, yet another big data advantage, another network advantage and another transmission advantage. A set of auxiliary information associated with the set of reference CSI may be stored and/or provided together with the set of reference CSI. The auxiliary information may include some other sensor output, e.g. gyro, GPS output, etc.

In one embodiment, a particular CSI among the CSI obtained or stored may comprise at least one temporal component each with respective time information. For example, the at least one temporal component of the particular CSI may be stored in a time-reversed order in the CSI-storage format, and the at least one temporal component of the particular CSI may be provided in a time-reversed order in the CSI-transmission format.

In one embodiment, the set of reference CSI may be partitioned into at least one subset. Each respective one of the at least one subset of reference CSI may be processed and represented in a respective way in at least one of: the CSI-storage format and the CSI-transmission format. Another set of reference CSI may be stored together with the set of reference CSI in the CSI-storage format. Yet another set of reference CSI may be provided together with the set of reference CSI in the CSI-transmission format.

In one embodiment, each reference CSI comprises N components partitioned into M groups, where M is not greater than N. Each of the M groups of CSI components may be processed and represented in a respective way in the CSI-storage format.

There may be at least one interface available to the authorized time reversal application module in at least one of: another device communicatively coupled with the time reversal parameter generation module and another set of instructions to be executed by the processor in the time reversal parameter generation module. The request for at least one TRP may be received through the at least one interface. The at least one TRP can be provided to the authorized time reversal application module through the at least one interface.

In one embodiment, the time reversal parameter generation module may partitioning the set of test CSI into N first subsets of test CSI, wherein N is an integer greater than 1, partitioning the set of reference CSI into N second subsets of reference CSI, determining N partial TRP, wherein each partial TRP is determined based on at least one of: a first subset of test CSI and a second subset of reference CSI, and computing the particular TRP as an aggregate of the N partial TRP.

In general, each of the set of test CSI may comprise at least one of: at least one of: a first channel impulse response, a first channel frequency response, and another first channel state data of the first wireless multipath channel between the first wireless transmitter and the first wireless receiver; each of the set of reference CSI may comprise at least one of: a second channel impulse response, a second channel frequency response, and another second channel state data of the second wireless multipath channel between the second wireless transmitter and the second wireless receiver; each of the at least one probing signal may comprise at least one of: an impulse signal, a pseudo-random sequence, and another probing signal.

In one embodiment, the time reversal application module may determine that a task is to be performed based on at least one TRP of which a particular TRP may be determined based on at least one of: the set of test CSI identified by a first identification information, and the set of reference CSI identified by a second identification information. The time reversal application module may send at least one request for the at least one TRP to at least one TRP generation module communicatively coupled with the time reversal application module, and receive the at least one TRP in a TRP format from the at least one TRP generation module. Based on the at least one TRP received in the TRP format, the time reversal application module may cause at least a part of the task to be performed.

The time reversal application module and/or the TRP generation module may use at least one of the first identification information of the set of test CSI and the second identification information of the set of reference CSI to access at least one of: the set of test CSI and the set of reference CSI.

The time reversal application module may analyze at least one of: the set of test CSI, the set of reference CSI and the at least one TRP in the time domain and/or the frequency domain. In one example, the time reversal application module may compute at least one periodic behavior analytic based on a periodic pattern of a parameter associated with at least one of: the set of test CSI, the set of reference CSI and the at least one TRP. In another example, the time reversal application module may compute at least one spatial analytic based on at least one of: a spatial behavior of the at least one TRP, map information, a previous location, and another spatial information. In another example, the time reversal application module may compute at least one navigational analytic based on at least one of: a previous location, a spatial behavior of the at least one TRP relative to the previous location, a navigation correction, a map information, and another spatial information. In another example, the time reversal application module may perform at least one of event detection, object motion detection, and human activity detection based on a comparison of the set of test CSI with the set of reference CSI through the at least one TRP. In another example, the time reversal application module may perform at least one human activity analysis based on an analysis of at least one of: the set of test CSI, the set of reference CSI, and the at least one TRP.

In addition, the time reversal application module may perform at least one of: tracking of mechanic cyclo-periodic action, event detection regarding a space to be monitored, and security event detection regarding a space to be guarded, based on a comparison of the set of test CSI with the set of reference CSI through the at least one TRP. The time reversal application module may perform at least one of: fall-down detection, periodic motion monitoring, breathing monitoring, and human counting based on breathing monitoring, based on a temporal analysis of the set of test CSI with the set of reference CSI through the at least one TRP. The time reversal application module may perform at least one of: wireless power transfer, waveform selection, and human identification based on at least one of: the set of test CSI, the set of reference CSI, and the at least one TRP.

The time reversal application module may provide a set of data associated with the task to another module for further processing and/or storage. The set of data may be provided in a particular format.

In one embodiment, the particular TRP is further based on at least one of: another set of test CSI and another set of reference CSI. The another set of test CSI is captured when a third probing signal is sent through a third wireless multipath channel from a third wireless transmitter to a third wireless receiver. The another set of reference CSI is captured when a fourth probing signal is sent through a fourth wireless multipath channel from a fourth wireless transmitter to a fourth wireless receiver.

In various embodiments, the first wireless transmitter may be the third wireless transmitter, the first wireless receiver may be the third wireless receiver, the second wireless transmitter may be the fourth wireless transmitter, and the second wireless receiver may be the fourth wireless receiver.

In one embodiment, the first identification information of the set of test CSI comprises at least one identification associated with at least one of: the first wireless transmitter, the first wireless receiver, a first time stamp associated with the set of test CSI, a first time range associated with the set of test CSI, a first household associated with the set of test CSI, a first venue associated with the set of test CSI, a first physical address associated with the set of test CSI, a first internet protocol (IP) address associated with the set of test CSI, a first MAC address associated with the set of test CSI, a first hardware address associated with the set of test CSI, a first communication address associated with the set of test CSI, a first storage address associated with the set of test CSI, a first memory address associated with the set of test CSI, a first storage module associated with the set of test CSI, a first network address associated with the set of test CSI, a first pointer to a look-up table entry associated with the set of test CSI, a first uniform resource locator (URL) associated with the set of test CSI, a first globally unique identifier (GUID) associated with the set of test CSI, a first device fingerprint associated with the set of test CSI, a first household fingerprint associated with the set of test CSI, a first object identifier (OID) associated with the set of test CSI, a first security identifier (SID) associated with the set of test CSI, a first access information associated with the set of test CSI, a first access control pass-code associated with the set of test CSI, a first set of at least one human-readable name associated with the set of test CSI, and a first user associated with the set of test CSI.

In one embodiment, the second identification information of the set of reference CSI comprises at least one identification associated with at least one of: the second wireless transmitter, the second wireless receiver, a second time stamp associated with the set of reference CSI, a second time range associated with the set of reference CSI, a second household associated with the set of reference CSI, a second venue associated with the set of reference CSI, a second physical address associated with the set of reference CSI, a second internet protocol (IP) address associated with the set of reference CSI, a second MAC address associated with the set of reference CSI, a second hardware address associated with the set of reference CSI, a second communication address associated with the set of reference CSI, a second storage address associated with the set of reference CSI, a second memory address associated with the set of reference CSI, a second storage module associated with the set of reference CSI, a second network address associated with the set of reference CSI, a second pointer to a look-up table entry associated with the set of reference CSI, a second uniform resource locator (URL) associated with the set of reference CSI, a second globally unique identifier (GUID) associated with the set of reference CSI, a second device fingerprint associated with the set of reference CSI, a second household fingerprint associated with the set of reference CSI, a second object identifier (OID) associated with the set of reference CSI, a second security identifier (SID) associated with the set of reference CSI, a second access information associated with the set of reference CSI, a second access control pass-code associated with the set of reference CSI, a second set of at least one human-readable name associated with the set of reference CSI, and a second user associated with the set of reference CSI.

In one embodiment, the set of test CSI is partitioned into N subsets based on at least one of: at least one first sampling period, at least one first frequency band, at least one first carrier frequency, at least one first transmitting antenna of the first wireless transmitter, at least one first receiving antenna of the first wireless receiver, at least one first transmitting phase of the first wireless transmitter, at least one first receiving phase of the first wireless receiver, at least one first transmitting antenna orientation of the first wireless transmitter, at least one first receiving antenna orientation of the first wireless receiver, at least one first transmitting antenna position of the first wireless transmitter, and at least one first receiving antenna position of the first wireless receiver. The set of reference CSI may be partitioned into N subsets based on at least one of: at least one second sampling period, at least one second frequency band, at least one second carrier frequency, at least one second transmitting antenna of the second wireless transmitter, at least one second receiving antenna of the second wireless receiver, at least one second transmitting phase of the second wireless transmitter, at least one second receiving phase of the second wireless receiver, at least one second transmitting antenna orientation of the second wireless transmitter, at least one second receiving antenna orientation of the second wireless receiver, at least one second transmitting antenna position of the second wireless transmitter, and at least one second receiving antenna position of the second wireless receiver. N may be greater than 1. One particular TRP may be determined by: computing N partial TR values based on at least one of: the N subsets of test CSI and the N subsets of reference CSI, and computing the particular TRP as a weighted function of the N partial TR values. The weighted function is at least one of: a weighted arithmetic mean, a weighted mode, a weighted median, a weighted geometric mean, a weighted harmonic mean, a weighted generalized mean, a weighted root mean square, another weighted function and a robust weighted function.

Figure 40:
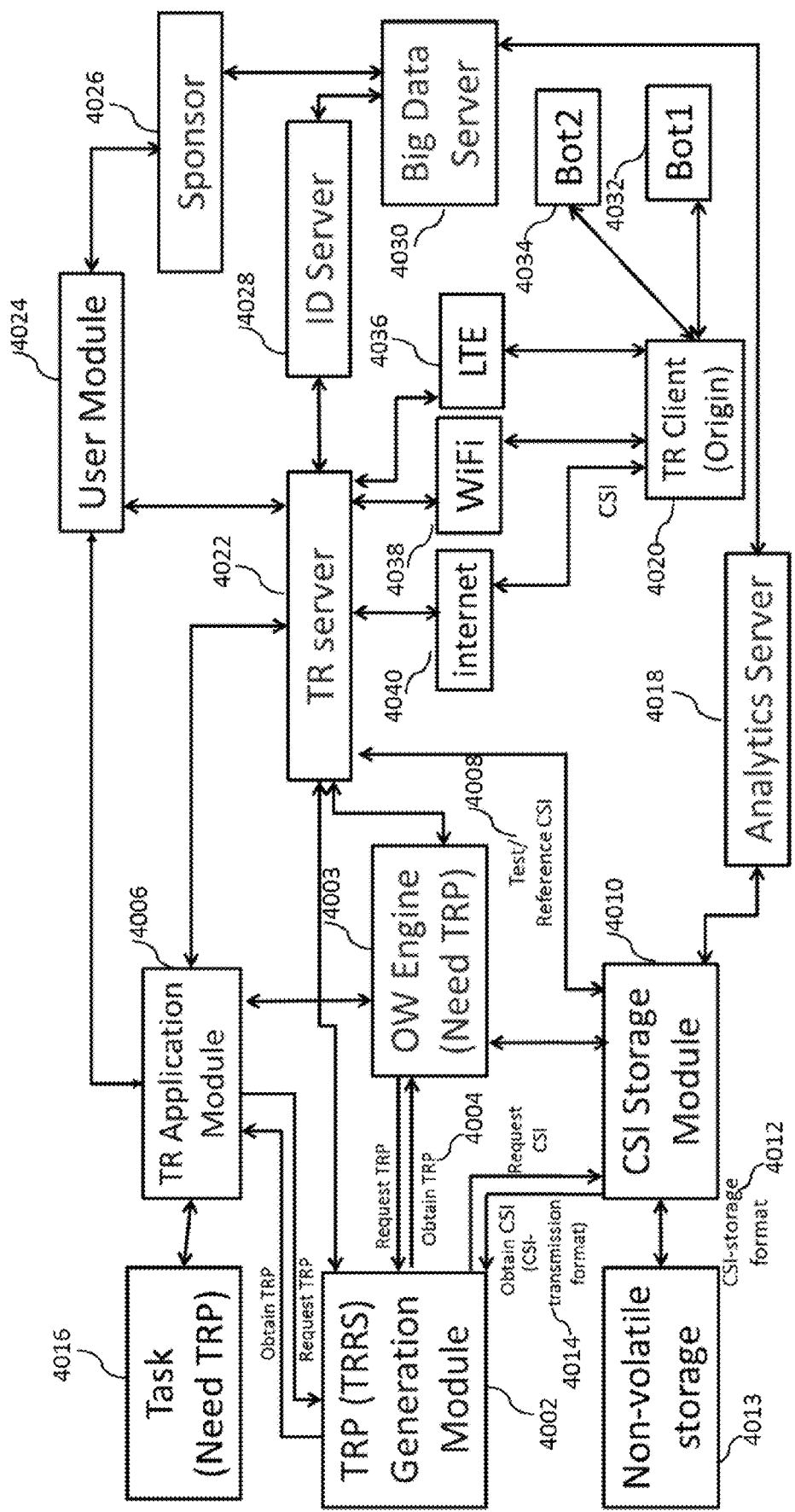
FIG. 40 illustrates exemplary relationships among various modules or components disclosed in the present teaching, according to an embodiment of the present teaching.

FIG. 40 illustrates exemplary relationships among various modules or components disclosed in the present teaching, according to an embodiment of the present teaching. Blocks with the same name in FIG. 40 and in other figures and other places in the present teaching may refer to a same block or component.

As shown in FIG. 40, the OW engine 4003 may call the TRP generation module 4002 to compute time reversal parameter (TRP), e.g. TRRS, and perform various algorithms/methods for various applications, such as security/guard engine, breathing/health/emotion/well being/vital signs monitoring engine, positioning/tracking engine, data communication engine, action/event detection engine, wireless charging/power transfer engine, wireless biometric engine, authentication engine, etc. The OW engine 4003 may be a software, an app and/or a driver. The OW engine 4003 may be a hardware (e.g. containing a chip, an ASIC, an FPGA, a DSP, a microcontroller, a CPU, and/or a GPU, etc.) with matching software/app/driver. The OW engine 4003 may be the TR server 4022. The OW engine 4003 may also be the TR application module 4006. The OW engine 4003 may also be the TR client 4020. The OW engine 4003 may be updated by connecting to the TR server 4022 and downloading updated driver/software from the TR server 4022.

To compute TRP, the TRP generation module 4002 may need one or more CSI which may be reference CSI stored in the CSI storage module 4010 and/or test CSI freshly captured by the TR client 4020, which may serve as an origin working in conjunction with at least one bot (e.g. Bot1 4032 and/or Bot2 4034) here. (In other cases, the TR Client 4020 may be a bot and at least one of Bot1 4032 and Bot2 4034 may be an origin.) The TRP generation module 4002 may request and fetch CSI directly from CSI storage module 4010 and/or TR Client 4020, or obtain the CSI through the OW Engine 4003. The TRP generation module 4002 may be a software, an app and/or a driver. It may also be a hardware (e.g. containing a chip, an ASIC, an FPGA, a DSP, a microcontroller, a CPU, and/or a GPU, etc) with matching software/app/driver. The TRP generation module 4002 may be part of the OW engine 4003.

The TR application module 4006 in this example can call the OW Engine 4003 (either directly or via the TR server 4022) to perform part or all of a task 4016. The TR application module 4006 may be a driver, an app and/or a software. The TR application module 4006 may be a hardware (e.g. containing a chip, an ASIC, an FPGA, a DSP, a microcontroller, a CPU, and/or a GPU, etc), with matching software/app/driver to interact with the user module 4024, the TR server 4022, the OW Engine 4003 and the TRP generation module 4002. The TR application module 4006 may be the user module 4024. The TR application module 4006 may provide the user interface. The TR application module 4006 may be the TR server 4022. The TR application module 4006 may be the TR client 4020. The TR application module 4006 may also be a server interacting with the user module 4024, and the TR server 4022.

The user module 4024 may be a software, an app, a smart phone, a computer, a computing device, a wired device, a wireless device, and/or a smart device that may have a driver, an APP and/or a software (e.g. TR application module 4006) installed. It may also be a hardware that can run software or call a web service related to the TR application module 4006. Associated with the user module 4024, there may be one or more user, with associated user information and/or user profile (e.g. name, address, phone number, email address, phone book, contact list, family info, household information (info), work info, school info, preference, history, habit, etc) which may be part of the ID info associated with the user module 4024. Associated with the user module 4024, there may be associated information related to its network, its IP address, its MAC address, its physical address, its hardware address, other device address/name (in the same network, or in the vicinity), SIM ID, series number, phone number, etc, which may also be part of the ID info associated with the user module 4024. The user module 4024 may send the ID info to the TR server 4022. Either the user module 4024 and/or TR application module 4006 may be sandboxed.

The ID server 4028 may be configured for associating (1) the CSI data and/or associated analytics from the analytics server 4018, (2) auxiliary information, (3) a user of the user module 4024 with associated user information and/or user profile, (4) the TR client 4020, (5) the Bot1 4032 and/or the Bot2 4034, (5) the space between the TR client 4020 and Bot1 4032 (or Bot2 4034), and/or (6) another user associated with the space. The ID server 4028 may maintain/record/store the association (e.g. using an association table, some data structure and/or some database). The input to the ID server 4028 may include CSI, time stamp, identification (ID) information (info) of TR client 4020, ID info of Bot1 4032, ID info of Bot2 4034, ID info of the user of the user module 4024, ID info of the space, event history, IP address, physical address, MAC address, hardware address, other device address/name, SIM ID, series number, information associated with the network (including the internet 4040, the WiFi 4038 and LTE 4036) associated with the TR client 4020, information associated with another network associated with the user module 4024 and/or the application module 4006, information associated with the sponsor 4026, auxiliary information, etc. The ID server 4028 may be in the cloud or in some data center. It may be located close to the TR server 4022. The ID server 4028 may be a software, an app and/or a driver. It may be a hardware (e.g. containing a chip, an ASIC, an FPGA, a DSP, a microcontroller, a CPU, and/or a GPU, etc.) with matching software/app/driver. The ID server 4028 may be the TR server 4022. The ID server 4028 may be the TR client 4020.

The TR client 4020 may be a wireless device with connection to the TR server 4022 (e.g. through internet 4040, WiFi 4038 and/or LTE 4036). The WiFi 4038 may include bluetooth, other Bluetooth-like system, WiFi, other WiFi-like system, and other wireless system. The LTE 4036 may include all cellular networks such as 2G, 2.5G, 3G, 3.5G, 3.75G, 4G, 5G, WiMax, etc and other cellular systems. There can be other type of devices associated with the TR client 4020, such as gyroscope, sensor, camera, microphone, etc, which may be communicatively coupled with the TR client 4020.

The TR client 4020 is associated with one or more bot (e.g. Bot1 4032 and/or Bot2 4034), which together are associated with a space. The space may be a house, an office, a warehouse, a man-made structure, a natural landscape, a garage, an indoor environment, a concert hall, an airport terminal, a shopping mall, a building, a sports facility, an enclosed space, a cave, a duct, a vent, a piping system, a cavity, a valley, a parking lot, a wood, a forest, a rock/land formation, an outdoor environment/area with barriers such as trees, walls, structures to generate multipaths. Associated with the space, there may be one or more users, with associated user information and/or user profile (e.g. name, address, phone number, email address, phone book, contact list, family info, household info, work info, school info, preference, history, habit, etc). Associated with TR client 4020, there may be associated information related to its network (e.g. the internet 4040, WiFi 4038 and LTE 4036), its IP address, its MAC address, its physical address, its hardware address, other device address/name (in the same network, or in the vicinity), SIM ID, series number, phone number, etc. The TR client 4020 may be sandboxed. The TR client 4020 may send an identification information to the TR server 4022. Between the TR client 4020 and Bot1 4032 and Bot2 4034, the role of being time reversal origin and bot may be inter-changed and/or co-exist. The TR client 4020 may be origin with Bot1 4032 and Bot2 4034 as bot. The TR client 4020 may also function as bot while at least one of Bot1 4032 and Bot2 4034 function as origin, perhaps even simultaneously (i.e. the TR client 4020 functions both as origin and as bot simultaneously).

The analytics server 4018 may deal with (e.g. define, update definition, compute, analyze, mine, fuse, manage, communicate, store) analytics related to the entire and/or part of the history of time-reversal parameters, e.g. time reversal resonating strength, and any analytics that can be derived from the CSIs such as similarity score, distance measure of two CSIs using statistical approach, machine learning, or deep learning, and that can be used for analyzing user behavior. The analytics may be related to/based on the task 4016, the TR application module 4006, the user module 4024, a user associated with the user module 4024, the TR client 4020, the Bot1 4032, the Bot2 4034, the associated wireless multipath channel, the associated space, the associated networks (including internet 4040, WiFi 4038, LTE 4036), auxiliary information, another associated user (e.g. a user associated with the space, or the TR client 4020, Bot1 4032, Bot2 4034) and/or the sponsor 4026. Some analytics may combine TRP with auxiliary information (e.g. time stamp, location parameters, motion parameters, directional parameters, positional parameters, geographical information, weather information, sensors, user information, household information, neighborhood information, network information, device information, etc.) and analyze/predict the individual/combined behavior, trends, co-occurrence, and correlation. While there may be many TR clients (and users associated with the TR clients), the analytics server 4018 may analyze them individually and/or jointly. The analytics server 4018 may be in the cloud or in some data center. It may be located close to the CSI storage module 4010, the non-volative storage 4013, and/or the TR server 4022. The analytics server 4018 may be a software, an app and/or a driver. It may be a hardware (e.g. containing a chip, an ASIC, an FPGA, a DSP, a microcontroller, a CPU, and/or a GPU, etc.) with matching software/app/driver. The analytics server 4018 may be the CSI storage module 4010. The analytics server 4018 may be the TR server 4022. The analytics server 4018 may be the TR client 4020.

The big data server 4030 may interact with the sponsor 4026, receiving enquiries from the sponsor 4026 and providing answers based on the analytics computed by the analytics server 4018. The enquiries may be related to the user module 4024 and one (or more) first user associated with the user module 4024. The enquiries may also be related to the space associated with the TR client 4020, Bot1 4032 and Bot2 4034. The enquiries may also be related to one or more second users associated with the space. The one or more first user associated with the user module 4024 may be associated with the one or more second user associated with the space through the ID server 4028.

The sponsor 4026 may be a potential buyer of data from the big data server 4030, the analytics server 4018, and/or the CSI storage module 4010. For example, the first user associated with the user module 4024 may be browsing a webpage (e.g. a Google search page, or a page hosted by Google server, or any page that support advertisement) with an advertisement (ad) spot. The sponsor 4026 may be a company and/or an ad server seeking to post an ad on the ad spot of the webpage. The sponsor may want to know if the background of the first user matches its intended audience. The sponsor 4026 may send the enquiry to the big data server 4030 by passing an ID info of the first user to the big data server 4030. The ID server 4028 may associate the first user to a second user associated with the TR client 4020, based on the ID info of the first user and some ID info of the second user. The big data server 4030 may then proceed to analyze the behavior of the second user based on the analytics computed by the analytics server 4018 and any further analytics computed using CSI stored in the CSI storage module 4010. The big data server 4030 sends the answers to the enquiries to the sponsor 4026. There may be a charge associated with the enquiry and the answer.

As another example, the first user of the user module 4024 may be a customer of the sponsor 4026. (For example, the first user may be using some indoor map navigation system in a shopping mall. The user module 4024 may be his mobile phone running a TR application module 4006 which is a map app. The Bot1 4032 may be installed in his mobile phone. The TR client 4020 is a device installed in the shopping mall.) The first user may want to know some information from the sponsor 4026 about the space associated with the TR client 4020 (e.g. the current location of the first user in a shopping mall). The sponsor 4026 may send the enquiry to the big data server 4030 (and command Bot1 4032 to start sending channel probing signals) together with some ID info of the TR client 4020 (e.g. the ID info of Bot1 4032 installed in first user's mobile phone). The big data server 4030 may break down the enquiry into commands to the TR server 4022 and the analytics server 4018 such that the TR client 4020 would capture some instantaneous CSI, pass to the TR server 4022 via internet 4040, WiFi 4038 and/or LTE 4036, and onto the OW engine 4003 (e.g. a location/tracking engine). The OW engine may send the instantaneous CSI to the TRP generation module 4002 which then computes some TRP based on the instantaneous CSI and some CSI stored in the CSI storage module 4010. In some situations, the OW engine 4003 may perform some computation (e.g. the location/tracking engine may determine location of Bot1 4032 based on the TRP computed by the TRP generation module 4002, and/or some auxiliary information from some sensor) and produce a result (e.g. location of Bot1 4032 represented in some mapping coordinate) to the TR server 4022 and onward to the big data server 4030. The big data server 4030 would then send the result to the sponsor 4026, at a fee. The sponsor 4026 may process the result and pass to the first user's user module 4024 (e.g. the user module 4024 may draw the location of the first user on a map app and send another request to the sponsor for the new location of Bot1 4032. And the process repeats itself until the first user arrives at the destination and stop the app.)

In some other situations, the analytics server 4018 may need to perform some analysis, based on past CSI stored in the CSI storage module, some past analytics, and/or the instantaneous CSI. The analytics server 4018 would pass the result to the big data server 4030. The big data server 4030 may process the result and send to the sponsor 4026. Or, the big data server 4030 may combine the results from the OW engine 4003 and the analytics server 4018, process the combined results and send to the sponsor 4026. In the example, the analytic server 4018 may analyze the location of the first user and find that the first user always stops at a computer game store in the shopping mall. The analytic server 4018 may also observe that the first user goes to the men's rest room. Combining with other observations, the analytics server 4018 may know that the first user goes to a particular high school during weekdays. Thus, the analytics server 4018 may conclude that the first user may be a teenage male who loves to play computer games. This information may be useful to the sponsor 4026 who would be willing to pay for this and related data. The computer game store may be particularly interested in identifying the first user and other similar game lovers and may be willing to pay a significantly higher ad fee to play targeted advertisement of the latest game to the such game lovers.

In yet other situations, the TR application module 4006 may send a request to the TR server 4022 directly without going through the sponsor 4026 and the big data server 4030. The TR client 4020 may capture the instantaneous CSI, and pass to TR server via internet 4040, WiFi 4038 and/or LTE 4036, and onto OW engine 4003. The OW engine 4003 may request the TRP generation module 4002 to compute some TRP based on the instantaneous CSI and/or some stored CSI in the CSI storage module 4010. Based on the TRP, the OW engine 4003 may perform some computation to obtain the instantaneous location of Bot1 4032 and may send the result to the TR application module 4006 through the TR server 4022.

Another example is baby breathing monitoring. A mother may buy a pair of TR client 4020 and Bot1 4032 and place them outside a baby room to monitor the breathing of her baby. The mother may use an app (a TR application module 4006) on her mobile phone (user module 4024) to pair up with the TR client 4020 via the TR server 4022. She may use the app (TR application module 4006) to activate the baby monitor (TR client 4020 and Bot1 4032). Once started, TR client 4020 may capture a series of instantaneous CSI and pass to TR server via internet 4040, WiFi 4038 and/or LTE 4036, and onto the OW engine 4003 (a breathing engine). The OW engine 4003 may command the TRP generation module 4002 to compute a series of TRP from the series of instantaneous CSI. The OW engine 4003 may analyze the series of TRP to compute the instantaneous breathing rate of the baby. The OW engine 4003 may send the instantaneous breathing rate to the app (TR application module 4006) of the mother's mobile phone (user module 4024). The app (TR application module 4006) may draw the instantaneous breathing rate in a moving diagram containing the baby's breathing pattern in the past 5 minutes in a GUI for easy visualization for the mother. With the press of a button in the app, the mother may view the baby's breathing pattern in the last 24 hours. From the plot, she may detect that the baby's breathing is unusual and may suspect that the baby may be developing a stuffy nose condition and may need to see a doctor. The baby monitor may be used to monitor the breathing of a senior citizen in a retirement community without intruding into the living space of the senior citizen. It can also be used to monitor a patient in a ward in a hospital.

The relationships shown in FIG. 40 among different blocks are for illustration, not for limitation of their relationships.

Environment Specific Signatures

Figure 11:
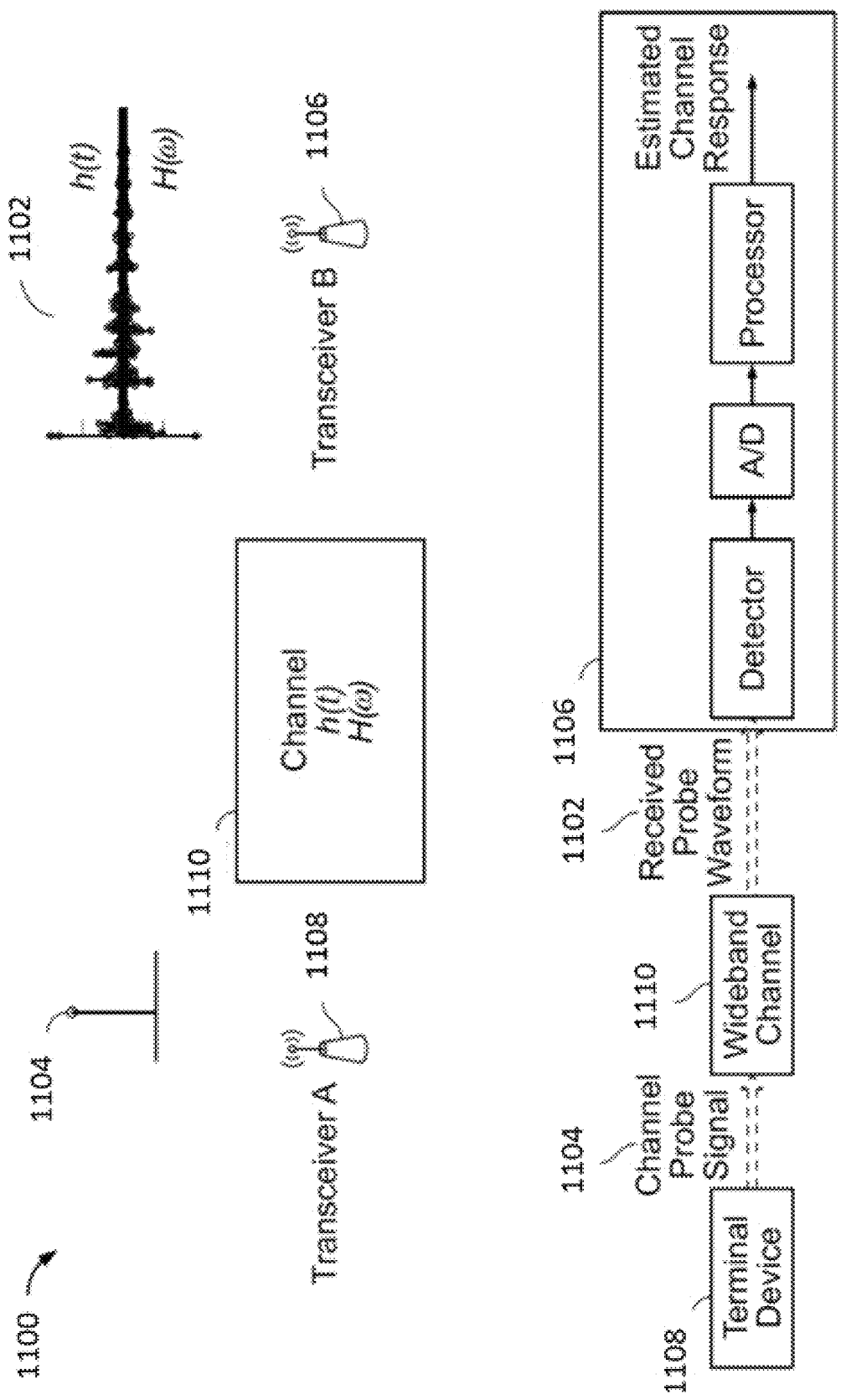
FIG. 11 shows an exemplary diagram showing an exemplary channel probing procedure, according to an embodiment of the present teaching.

FIG. 11 shows an exemplary embodiment of a wireless system 1100 comprising two transceivers 1106 and 1108. In this embodiment, transceiver A 1108, comprising an antenna, launches a wireless signal 1104 that propagates through a wireless channel 1110 and arrives at transceiver B 1106, comprising an antenna, as a multipath wireless signal 1102. In exemplary embodiments, at least one antenna may launch at least one wireless signal into a channel and at least one antenna may receive a signal from the wireless channel. In embodiments, the transmitting and receiving antennas may be placed apart from each other, and in some embodiments, they may be co-located. For example, a device, computer, mobile device, access point and the like may comprise more than one antenna and the antennas may be operated as either or both transmit and receive antennas. In some embodiments, the at least one antenna may be a single antenna that may be used to both launch wireless signals into a channel and to receive multipath signals from the channel. In embodiments, antennas may transmit and receive signals in different time slots, in different frequency bands, in different directions, and/or in different polarizations or they may transmit and receive signals at the same or similar times, in the same or similar frequency bands, in the same or similar directions and/or in the same or similar polarizations. In some embodiments, antennas and/or devices comprising antennas may adjust the timing, carrier frequency, direction and/or polarization of signal transmissions and signal receptions.

Antennas in exemplary embodiments may be any type of electrical device that converts electric power or electric signals into radio waves, microwaves, microwave signals, or radio signals, and vice versa. By way of example but not limitation, the at least one antenna may be configured as a directional antenna or an omni-directional antenna. The at least one antenna may be some type of monopole antenna, dipole antenna, quadrapole antenna and the like. The at least one antenna may be some type of loop antenna and/or may be formed from a length of wire. The at least one antenna may be a patch antenna, a parabolic antenna, a horn antenna, a Yagi antenna, a folded dipole antenna, a multi-band antenna, a shortwave antenna, a microwave antenna, a coaxial antenna, a metamaterial antenna, a satellite antenna, a dielectric resonator antenna, a fractal antenna, a helical antenna, an isotropic radiator, a J-pole antenna, a slot antenna, a microstrip antenna, a conformal antenna, a dish antenna, a television antenna, a radio antenna, a random wire antenna, a sector antenna, a cellular antenna, a smart antenna, an umbrella antenna and the like. The at least one antenna may also be part of an antenna array such as a linear array antenna, a phased array antenna, a reflective array antenna, a directional array antenna, and the like. The at least one antenna may be a narrowband antenna or a broadband antenna, a high gain antenna or a low gain antenna, an adjustable or tunable antenna or a fixed antenna. Any type of antenna may be configured for use in the systems, methods and techniques described herein. In embodiments, the radiation pattern associated with an exemplary antenna may be tunable and may be tuned to improve the performance of the exemplary systems, methods and techniques described herein.

In embodiments, electrical signals may be applied to one or more antennas for wireless transmission and may be received from one or more antennas for processing. In embodiments, wireless signals may be radio waves or microwaves. In embodiments, wireless signals may have carrier frequencies anywhere in the range from kilohertz to terahertz. In embodiments, antennas may comprise at least one of a filter, amplifier, switch, monitor port, impedance matching network, and the like. In embodiments, electrical signals may be generated using analog and/or digital circuitry and may be used to drive at least one antenna. In embodiments, electrical signals received from at least one antenna may be processed using analog and/or digital circuitry. In exemplary embodiments of the inventions disclosed herein, electrical signals may be sampled, digitized, stored, compared, correlated, time reversed, amplified, attenuated, adjusted, compensated, integrated, processed and the like.

In this disclosure, the signal launched by a transmit antenna for the purpose of probing characteristics of the channel may sometimes be referred to as a probe signal or a channel probe signal or a channel probe waveform. FIG. 11 shows a representation of a wireless signal 1104 being transmitted from a first device 1108 to a second device 1106 through a wideband wireless channel 1110. The channel probe signal 1104 may arrive at the second device 1106 as what we may also refer to as a received probe waveform 1102. The waveform 1102 is referred to as channel impulse response (CIR), which reflects the channel state information (CSI) in time domain. In this description, "channel state information" (CSI) refers to channel properties of a communication link. It describes how a signal propagates from the transmitter to the receiver. The channel state information can be obtained using channel estimation based on the received channel sounding or probing signal. The channel state information in the time domain, often referred to as the channel impulse response (CIR), can be represented by a vector of complex values reflecting the channel attenuation and phase shift during the channel delay spread. The channel state information in frequency domain, often referred to as the channel frequency response (CFR), can be represented by a vector of complex values which reflect the channel attenuation and phase shift on each frequency unit, e.g., on a subcarrier within a Wi-Fi channel. This received probe waveform 1102 may be received and processed by a receiver comprising at least one antenna and a set of receiver electronics. In exemplary embodiments, the processing of the received probe waveform 1102 may yield an estimated channel response for the wideband channel between devices 1108 and 1106. In embodiments, probe and received signals may be analog signals that are converted to digital signals (and may be digital signals that are converted to analog signals) and may be processed and/or generated using digital signal processors (DSPs), field programmable gate arrays (FPGAs), Advanced RISC Machine (ARM) processors, microprocessors, computers, application specific integrated circuits (ASICs) and the like.

In the time domain, the channel impulse response of a communication link can be modeled as $h_i[k] = \sum_{l=0}^{L-1} h_{i,l} \delta[k-1]$, in which $h_i[k]$ is the k-th tap of the channel impulse response (CIR) with length L, and $\delta[\ ]$ is the Dirac delta function. Note that the time domain representation of the channel response, h, and the frequency domain representation of the channel response, H, are related by the Fourier Transform.

In exemplary embodiments, the received probe waveform may be predicted by convolving the channel probe signal with the channel impulse response, if the channel impulse response is known. The channel impulse response or estimated channel response may be an approximation or an estimate of the actual channel impulse response. For example, the estimated channel response may be truncated to a certain channel length that is deemed to be an "accurate-enough" estimate of the channel or that is chosen to preferentially probe certain characteristics of the channel. In addition, the estimated channel response may be derived from a discretized approximation of a received probe waveform with the time and amplitude resolution of the discretized signal determined to be "accurate enough" for a particular application. The estimated channel response may be a filtered version of the actual channel response and may be an accurate-enough estimate of the channel. The determination of what is "accurate-enough" may depend on the application, the hardware components used in the wireless devices, the processing power of the devices, the allowed power consumption of the devices, the desired accuracy of the system performance, and the like.

If the probe signal transmitted by a device is a single pulse or impulse signal, then the received probe waveform may be an accurate enough estimate of the channel impulse response and little additional processing other than reception, discretization and storage of the received probe waveform may be necessary to obtain the estimated channel response. If the probe signal transmitted by a device is a waveform other than a single pulse or impulse signal, then a receiver may need to perform additional processing on the received probe waveform in order to determine the estimated channel response. In an exemplary embodiment, a receiver may detect and discretize a received probe waveform. Analog-to-digital (A/D) converters may be used to perform the discretization. In embodiments, a deconvolution process may use the discretized received probe waveform and a representation of the channel probe signal to yield the estimated channel response. In embodiments, other mathematical functions may be used to yield estimated channel responses. Channel impulse responses (CIRs) may also be referred to in this document as channel responses (CRs), CR signals, CIR signals, channel probe signal responses, and estimated channel responses. Channel responses may be measured and/or computed and/or may be generated by a combination of measurement and computation. In this disclosure we may also refer to channel responses and received probe waveforms as location-specific signatures.

In embodiments, different channel probe signals may be chosen to increase or decrease the accuracy of the estimate of the channel response of a wideband channel. In exemplary embodiments, a channel probe signal may be a pulse or an impulse. In addition, the channel probe signal may be a series of pulses with regular, arbitrary or non-regular patterns. The channel probe signal may be a waveform. Waveforms may be substantially square waveforms, raised cosine waveforms, Gaussian waveforms, Lorentzian waveforms, or waveforms with shapes that have been designed to probe the channel in some optimal or desired way. For example, channel probe waveforms may be frequency chirped or may have frequency spectra that are tailored to probe the channel in some optimal or desired way. Probe waveforms may be multiple waveforms with different center frequencies and bandwidths. Probe waveforms may be amplitude modulated, phase modulated, frequency modulated, pulse position modulated, polarization modulated, or modulated in any combination of amplitude, phase, frequency, pulse position and polarization.

The waveform may have a temporal width that is substantially equal to a bit duration of a data stream that may be intended to be exchanged over the associated communication channel. The waveform may have a temporal width that is substantially half, substantially one quarter, substantially one tenth, substantially one hundredth, or less than a bit duration of a data stream intended to be exchanged over the associated communication channel. The probe signal/waveform may be a data pattern and may be a repeating data pattern. The probe signal may include packet and/or framing information, synchronization and/or clock recovery information, stream capture information, device ID and network and link layer operating information. The probe signal may have a frequency spectrum that has been tailored for the operating environment and/or the electronic components in the transmitters and/or receivers of the systems. The probe signal may be an estimate of the channel impulse response or may be an altered version of the estimate of the channel impulse response. For example, the probe signal may be a time-reversed version of the estimated channel response. The probe signal may be designed to compensate for and/or to accentuate signal distortions imposed by certain electronic components in the transmitters and/or receivers and/or imposed by certain environmental factors.

One exemplary type of a channel probing signal is a periodic pulse sequence. With such a channel probing signal, the received probe waveform may be a noisy version of the periodic channel pulse response. In embodiments, a time-averaging scheme can be used to suppress the noise and extract the channel response.

In some embodiments, a time-averaging scheme may not provide a reliable measure of the channel response. To improve the channel response estimation, a longer sequence of pulses can be used to suppress the noise. To further improve the performance of the system, a short pseudo-random sequence of pulses can be used as the channel probing signal. In such a case, the received probe waveform can be the convolution of the pseudo-random sequence with the channel response.

In embodiments, the pseudo-random sequence used as the probing signal may be known by a receiver. Then the channel response can be estimated using a correlation-based method where the received signal is convolved with the pseudo-random sequence. In general, the auto-correlation of the pseudo-random sequence may not be an ideal delta function because there can be inter-symbol interference and thus error in the estimated channel response. In embodiments, such kinds of channel estimation error due to inter-symbol interference may be minimized or avoided by using orthogonal Golay complementary sequences, which may have an ideal delta shape for auto-correlation function, rather than a pseudo-random sequence.

In embodiments, a wireless device may transmit a first wireless signal with a center frequency of $f_1$ GHz. In embodiments, the first wireless signal may be a channel probe signal, a pulse signal, a frame signal, a pseudorandom noise (PN) sequence, a preamble signal, and the like. In embodiments, the bandwidth of the wireless signal may be approximately 10 MHz, 20 MHz, 40 MHz, 60 MHz, 125 MHz, 250 MHz, 500 MHz, 1 GHz and the like. In embodiments, a wireless device may send a second wireless signal with a center frequency of $f_2$ GHz. In embodiments, the second wireless signal may be a channel probe signal, a pulse signal, a frame signal, a PN sequence, a preamble signal, and the like. In embodiments, the bandwidth of the wireless signal may be approximately 10 MHz, 20 MHz, 40 MHz, 60 MHz, 125 MHz, 250 MHz, 500 MHz, 1 GHz and the like. In embodiments, the frequency spectrum of the first wireless signal and the second wireless signal may include overlapping frequencies. In some embodiments, there may be no overlapping frequencies between the two wireless signals. In some embodiments, the frequency spectra of the different wireless signals may be separated by so-called guard-bands or guard-band frequencies. The channel response for the channel probed using the first wireless signal (for example at frequency $f_1$) may be represented as $H_{ij}(f_1)$. The channel response for the channel probed using the second wireless signal (for example at probe frequency $f_2$) may be represented as $H_{ij}(f_2)$. In embodiments, more than two probe frequency signals may be used to probe the channel. The more than two probe frequency signals may have some overlapping frequencies or they may have no overlapping frequencies.

In embodiments, a wireless device may use channel tuning and/or frequency hopping to tune to different wireless signal carrier frequencies to probe a wireless channel. In some embodiments, a wireless device may tune to different channels within a specified frequency band to probe the wireless channel. For example, a wireless device may first tune to one channel within the Wi-Fi, (IEEE 802.11) signaling bandwidth and then to another channel within the wireless band. The frequency tuning may be from one channel to the next in a sequential fashion, but it may also hop from one channel to another in a random fashion anywhere within the Wi-Fi band. In embodiments, the different channels may have different channel bandwidths. In embodiments, any wireless protocol may be used to generate probe signals and/or to analyze channel information in the received signal.

In embodiments, multiple channel probe signals may be used to probe a channel. In some implementations, the same probe signal may be sent multiple times and the received probe waveforms may be averaged and/or compared. For example, a probe signal may be sent twice, 5 times, 10 times, 30 times, 50 times, 100 times, 500 times or 1000 times. In embodiments, a probe signal may be sent once or may be sent any number of times between 2 and 1000 times. In embodiments, a probe signal may be sent more than 1000 times. For example, in some monitoring and security applications, probe signals may be sent continuously. For example, probe signals at 1 probe signal per second, 10 probe signals per second, 100 probe signals per second, and the like may be sent continuously to monitor and probe a space. The rate at which probe signals are continually sent may be determined by the speed at which changes to an environment should be detected.

In embodiments, only some of the received probe waveforms may be used for further processing. For example, some received probe waveforms and/or the estimated channel responses may be discarded or trimmed. The discarded and/or trimmed waveforms and or responses may be sufficiently different from other received waveforms and/or estimated responses that they may be deemed as outliers and not accurate-enough representations of the channel. In some embodiments, different probe signals may be sent at different times and/or in response to feedback from the receiver. For example, a probe signal at the transmitter may be tuned to improve the received probe waveforms, the estimated channel responses and/or the similarity of the received probe waveforms and/or the estimated channel responses. In embodiments, a transmitter may send at least two different probe signals and a receiver may estimate channel responses based on either one, some or all of the at least two different received probe waveforms. In embodiments, probe signals may be versions of previously measured and/or calculated channel responses and/or time reversed versions of the measured and/or calculated channel responses.

As will be discussed in more detail later in this disclosure, similarity or matching or correlation of waveforms, signatures and/or responses may be determined using virtual time reversal processing techniques, time-reversal resonating strengths, pattern recognition and/or matching, linear and/or nonlinear support vector machines and/or support vector networks, machine learning, data mining, classification, statistical classification, tagging, kernel tricks (e.g., kernel methods that apply kernel functions) and the like.

In embodiments, processing a received probe waveform may include amplifying or attenuating any portion of the received signal. In embodiments, a channel may be probed once or a channel may be probed more than once. In embodiments, multiple received probe waveforms may be measured, processed, recorded and the like. In embodiments, some channel responses may be averaged with others. In embodiments, some channel responses may be discarded or not recorded. In embodiments, some channel responses may be measured under different environmental conditions and stored. Such stored response signals may be used as reference signals to indicate the environmental conditions associated with the original measurements. In embodiments, a newly measured channel response may be compared to a number of previously stored channel responses to determine which previously stored channel response most closely matches the newly measured channel response. Then, the environmental parameters of the most closely correlated or most closely matched previously stored channel response may be associated with the newly measured channel response. In exemplary embodiments, environmental conditions may include, but may not be limited to, temperature, location or placement of objects, location or placement of people, pose of objects, pose of people, location and/or pose of access points, terminal devices, position and/or pose of sensors, position and/or pose of signal reflectors, position and/or pose of signal scatterers, position and/or pose of signal attenuators, and the like.

In an exemplary embodiment, the estimated channel response may be considered an environment-specific waveform and/or signature because it represents the channel response between two devices in a certain environment or between a device and the objects and/or structures in a venue or in a certain environment. As shown in FIG. 11, if there are one or more movements in one or more objects and/or structures and/or surfaces in a venue or environment in which the signal transmitted between devices 1108 and 1106 propagates, then at least some of the multiple propagation paths through which a signal propagates can change, thereby changing the channel response. The characteristics of the estimated channel waveform and how much they change may depend on the venue, the environment, and the hardware components in the system.

Overview of Time-Reversal Wireless System of the TRM

In one embodiment, a technology called Time Reversal Machine (TRM) that performs broadband multi-path signaling (with broadband signals transmitted and received in multipath-rich broadband wireless channels) is used as an enabling technology to support communication (especially indoor communication) and Internet-of-things (IoT) applications. Referring to FIG. 1, in some implementations, a time-reversal wireless communication system 100 includes time-reversal base stations (e.g., 102a to 102c, collectively referenced as 102) that communication with many things, objects, or devices, such as laptop computers 104, smart phones 106, tablet computers 108, air conditioners 110, coffee makers 112, rice cookers 114, refrigerators 116, televisions 118, cars 120, cameras 122, lighting devices 124, audio systems 126, and clothes 128. For example, the clothes 128 may have embedded sensors that can communicate with base stations. A big challenge of indoor communication and indoor IoT applications is the presence of many multi-paths with similar path lengths. While multipath fading may be known to cause problems in communication and may often be suppressed by rake receivers or equalizers, Time Reversal Machine (TRM) recognizes hidden values of multi-paths and seeks to capture and exploit the inherent structures of the multi-paths to achieve high communication capacity, low power consumption, good battery life, collision-free multiple access, low cost terminal devices, heterogeneous terminal devices, indoor positioning, life detection, scalability, privacy and security, etc. A high sampling frequency may be used to capture the useful details of the multi-paths.

High communication capacity: The TRM system supports spatial division multiple access supporting high throughput for each TRM device (e.g. IoT devices, smart phones, smart devices). The TRM system achieves high signal-to-noise ratio due to its inherent nature to fully harvest energy from the surrounding environment by exploiting the multi-path propagation to recollect all the signal energy that could be collected as the ideal RAKE receiver. The achievable rate can be very high when the bandwidth is sufficiently wide.

Good battery life: Many TRM devices (e.g. IoT devices, smart phones, smart devices) may be powered by small batteries. The TRM devices may need to be designed to have low power consumption and use wireless communication techniques that have low computational complexity. The TRM system uses physics instead of electronics to perform channel equalization and thus supports low power consumption and low computational complexity. The TRM system has a potential of over an order of magnitude of power consumption reduction and interference alleviation, which means that the TRM system can provide better battery life and support multiple concurrent active users.

Collision-free multiple access: The TRM system allows many active TRM devices to connect to the Internet and transmit/receive data concurrently without collision with other TRM devices. The TRM system uses low-interference wireless technologies to reduce the interference among and within things.

Low cost terminal devices: The TRM system is designed so that most of the processing for signal communication is performed at the base station, thus allowing the terminal TRM devices (e.g. handsets, smart devices, IoT devices), to be simple with low cost, low power consumption and good battery life. The terminal TRM devices only need to perform simple processing and thus can use low cost processors. In some examples, by using an asymmetric TRM architecture, only a simple one-tap detection is needed.

Heterogeneous terminal devices: The TRM system can support a high level of heterogeneity among the TRM devices connected to the Internet. For example, TRM devices that have different functionality, technology, and application fields can communicate with one another. The wireless technology used by TRM system can support heterogeneous terminal devices with different quality-of-service (QoS) options, such as bit rate, adjustment of waveform and back-off factor. Conventional technologies (e.g., ZigBee, Z-Wave, Bluetooth, and Wi-Fi) may not simultaneously support a high level of heterogeneity among terminal devices and support a wide range of density of terminal devices.

Secure communication: The TRM system provides added security by the spatial division multiple access. Only the intended TRM device at a particular location can receive the intended information. The unique location-specific signature in the TRM system can provide additional physical-layer security and thus can enhance the privacy and security of customers.

Indoor positioning: The TRM exploits the details of the multi-paths so that each TRM device can determine the current location of the individual receiver.

Life detection: The TRM system exploits the changes of the details of the multi-paths and allows TRM devices to detect living things in the environment.

Scalability: The system supports a wide range of density of TRM devices (e.g. IoT devices, smart phones, smart devices) and uses wireless technology that is highly scalable to provide satisfactory quality of service for low to high density areas.

Privacy and security: The TRM system allows each TRM device (e.g. IoT device, smart device, smart phone) to have a unique identification, and ensures privacy and the security of the customers.

The broadband wireless channels may be a set of wireless channels (e.g. Wi-Fi channels with 20 or 40 MHz bandwidth, Zigbee, BlueTooth, Z-Wave, etc.), mobile communication channels (e.g. 3G/4G/5G/6G, WiMax, etc.), etc. Multiple antennas may be used in the transmitter and receiver. Multiple narrow-band channels may be combined to achieve a large effective bandwidth.

In one embodiment, a time-reversal wireless system 100 of the Time Reversal Machine (TRM), as shown in FIG. 1, includes time-reversal base stations (e.g., 102a to 102c, collectively referenced as 102) that communicate with many TRM devices (e.g. things, objects, or devices) such as laptop computers 104, smart phones 106, tablet computers 108, air conditioners 110, coffee makers 112, rice cookers 114, refrigerators 116, televisions 118, cars 120, cameras 122, lighting devices 124, audio systems 126, and clothes 128. Each TRM device may perform different functions using the TRM. Each TRM device may communicate with a base station to transmit and/or receive information, obtain TRM-based indoor and/or outdoor positioning information, perform surveillance, detect living things, perform health-related monitoring, etc. For example, the clothes 128 may have embedded temperature, motion, heart-beat, and/or other health-care sensors that can communicate with the base stations 102 using the TRM.

Basic Principles of Time Reversal of the TRM System

The time-reversal signal processing of the TRM system is a technology to focus the power of broadband signal waves in both time and space domains. The time-reversal technology of the TRM system uses receivers with high sampling frequency to digitize and record the broadband signal waves, applies digital signal processing (including time reversal) to the recorded digital waveforms and transmits the processed signal back in reverse timing (first in last out). The energy of the time-reversal broadband signal waves from transmitters is refocused at the intended location with very high spatial resolution. The time-reversal technology of the TRM system takes advantage of multi-path propagation and requires less complicated channel processing and equalization. The time-reversal technology can achieve focusing that is far beyond the diffraction limit, i.e., half wavelength.

Figure 12:
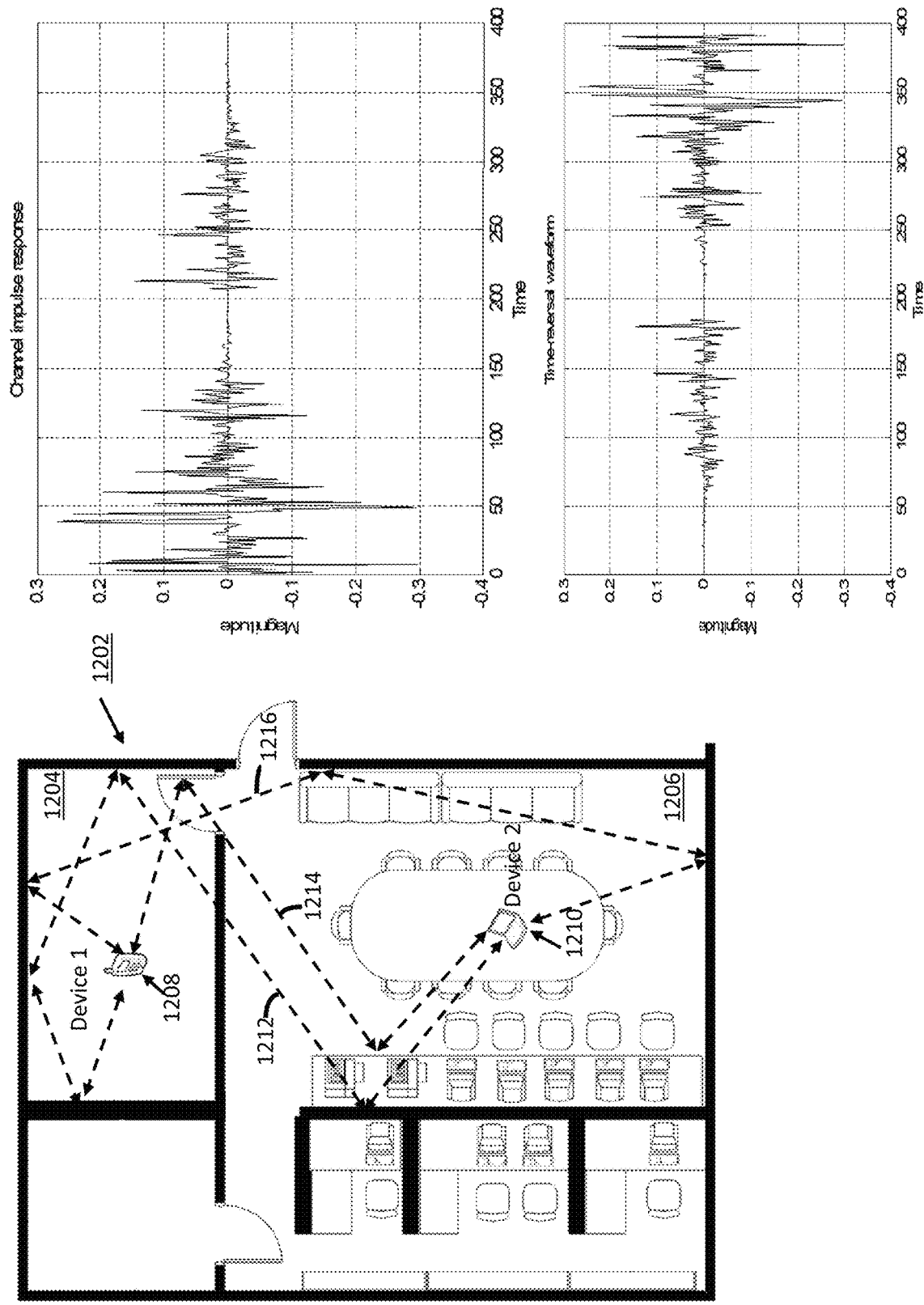
FIG. 12 shows an exemplary TR multipath propagation with channel impulse response and corresponding time reversal waveform, according to an embodiment of the present teaching.

Referring to FIG. 12, a time-reversal system can be used in an environment having structures or objects that may cause one or more reflections of wireless signals. For example, a venue 1202 may have a first room 1204 and a second room 1206. When a first device 1208 in the first room 1204 transmits a signal to a second device 1210 in the second room 1206, the signal can propagate in several directions and reach the second device 1210 by traveling through several propagation paths, e.g., 1212, 1214, and 1216. The signal traveling through multiple propagation paths is referred to as a multipath signal. As the signal travels through the propagation paths, the signal may become distorted. The multipath signal received by the second device 1210 can be quite different from the signal transmitted by the first device 1208.

Figure 13:
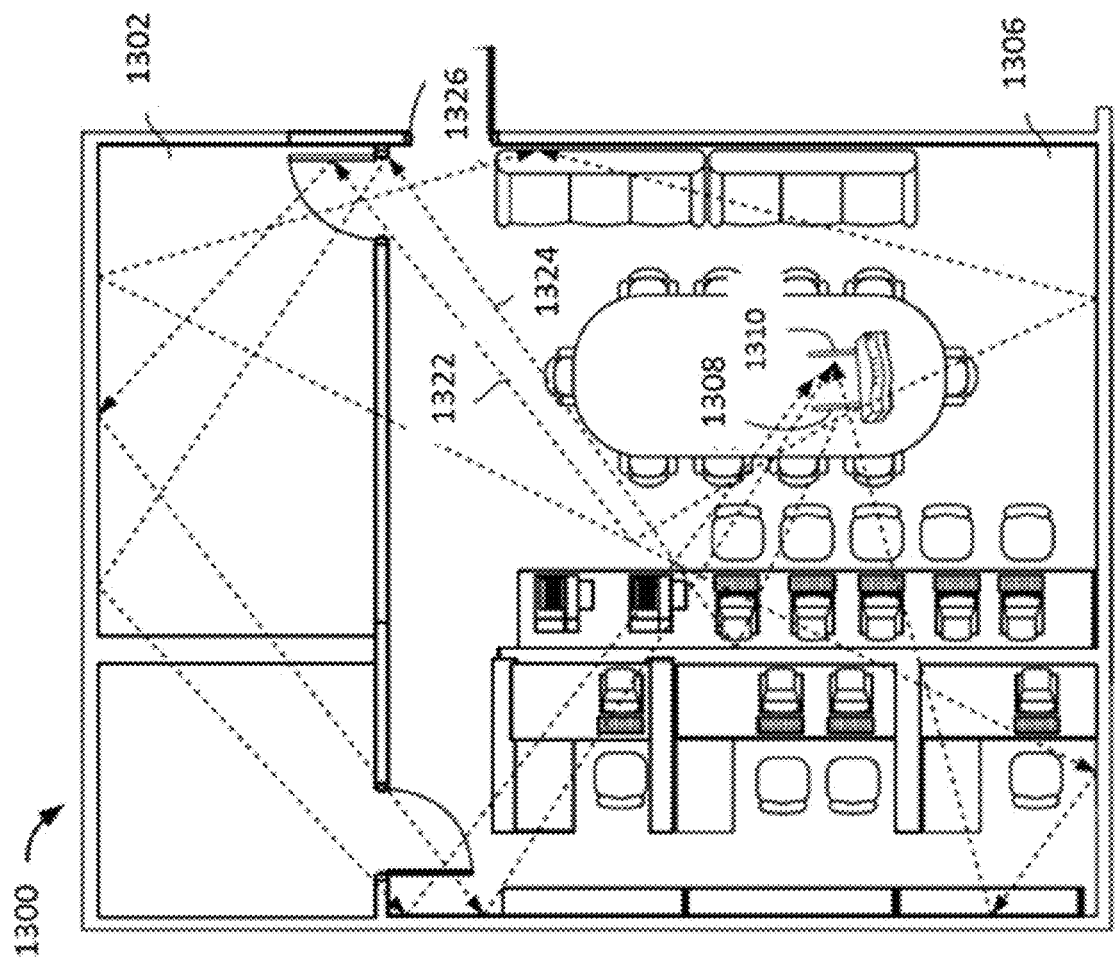
FIG. 13 shows an exemplary graph showing an exemplary TR multipath propagation in an office environment with transmit and receive antenna on the same device, according to an embodiment of the present teaching.

In another embodiment, referring to FIG. 13, a first antenna 1308 transmits a signal to a second antenna 1310 in a room 1306, the signal can propagate in several directions and reach the second antenna 1310 by traveling through several propagation paths, e.g., 1322, 1324, and 1326. The first antenna 1308 and the second antenna can be co-located on the same device.

Figure 2:
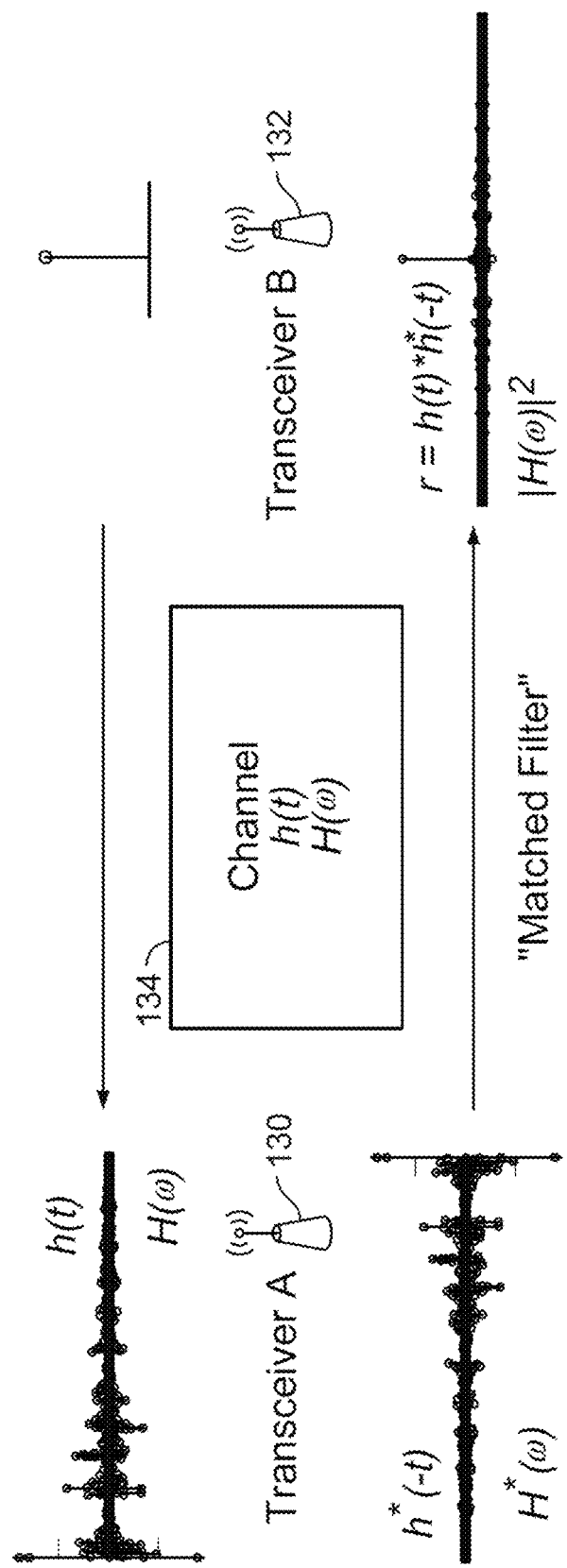
FIG. 2 shows an exemplary diagram showing the time reversal signal processing principle, according to an embodiment of the present teaching.

FIG. 2 is a diagram illustrating an example of time reversal transmission between a broadband transceiver A 130 (of a TRM device A1) and a broadband transceiver B 132 (of a TRM device B1) through a channel 134 with broad effective bandwidth. When transceiver A 130 wants to transmit information to transceiver B 132, transceiver B 132 first sends an impulse-like pilot signal that propagates through a scattering and multi-path-rich broadband environment (channel 134) and the resulting waveforms are received and recorded by transceiver A 130. This is called the channel probing phase. The pilot signal is sometimes referred to as a "training sequence." Transceiver A 130 then time-reverses (and conjugates, if the signal is complex valued) the received waveform and transmits it back through the same channel to transceiver B. This is called the time-reversal-transmission phase.

There are two assumptions for the time reversal communication system to function properly.

Channel reciprocity: The impulse responses of the forward link channel and the backward link channel are assumed to be identical.

Channel stationarity: The channel impulse responses are assumed to be stationary for at least one probing-and-transmitting cycle.

These two assumptions are generally valid, especially for indoor environments. For example, experiments have been conducted in a campus lab area in which the correlation between the impulse response of the forward link channel and that of the backward link channel is as high as about 0.98, which means that the channel is highly reciprocal. Experiments have shown that in some examples the multi-path channel of an office environment does not change significantly over a short period of time.

By utilizing channel reciprocity, the re-emitted time-reversal waves can retrace the incoming paths, ending up with a constructive sum of signals of all the paths at the intended location and a "spiky" signal-power distribution over the space, as commonly referred as spatial focusing effect. Also from the signal processing point of view, in the point-to-point communications, time-reversal essentially leverages the multi-path channel as a matched filter and focuses the wave in the time domain as well, as commonly referred as temporal focusing effect. By exploiting the multi-path environment as a facilitating matched filter computing machine instead of fighting the multi-path with a complicated RAKE receiver, the TRM devices in the TRM system can have a significantly reduced complexity (and thus lower cost and lower power consumption and longer battery life for the hardware due to the reduced computation requirement), which is ideal for implementing the Internet of Things.

Channel Probing

Figure 14:
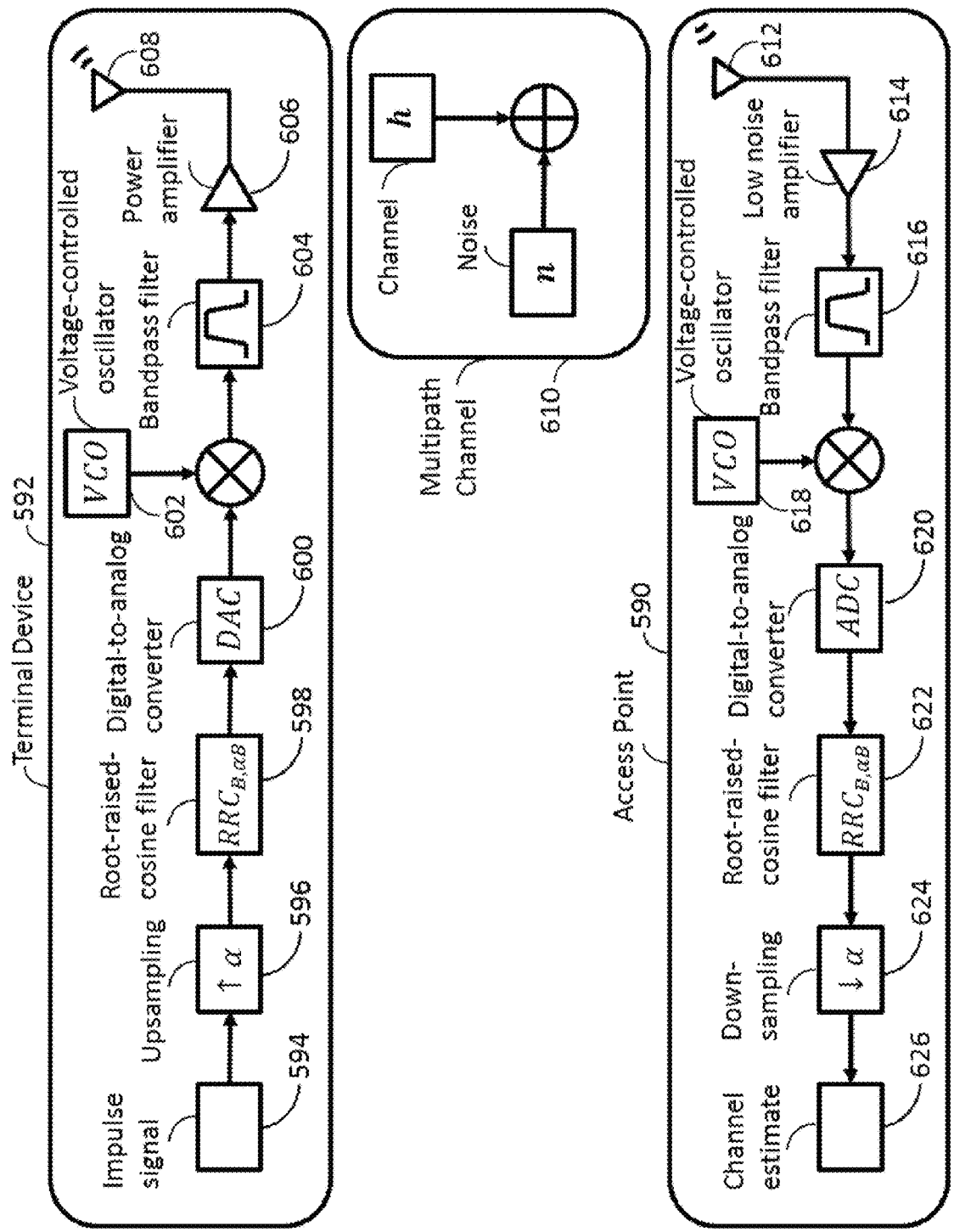
FIG. 14 shows an exemplary diagram showing exemplary operations in the channel probing phase.

In some implementations, referring to FIG. 14, channel probing is performed when a transceiver or access point (AP) 590 communicates with a terminal device 592. In the channel probing phase, the terminal device 592 upsamples an impulse signal 594 by $\alpha$ using an upsampling unit 596, filters the upsampled signal by using a root-raise-cosine (RRC) filter $RRC_{B,f_s}$ 598, in which B is the bandwidth and $f_s=\alpha B$ is the sample rate. One of the purposes of increasing the bit rate is that by oversampling, we can obtain the correct sample when there exists sample frequency offset between the transmitter and the receiver in the data transmission phase. Since the oversampling can be one of the steps in the data transmission phase, to estimate the channel correctly, we also include oversampling and downsampling in the channel probing phase. The value of a can be chosen by the user. For example, a can be chosen to be equal to 4, but can also be other values. The root-raised-cosine filter can perform pulse shaping to limit the bandwidth. In a heterogeneous time-reversal system, different types of devices may different bandwidths, so the bandwidths of the root-raised-cosine filters for the different types of devices are also different.

The filtered signal is converted to an analog baseband signal by a digital-to-analog converter (DAC) 600. The baseband signal is modulated to a high carrier frequency by a voltage-controlled oscillator (VCO) 602, then put through a bandpass filter 604 and amplified by a power amplifier 606 to produce a radio frequency (RF) signal. The RF signal is broadcasted by an antenna 608. The broadcast signal passes through a multipath channel 610 having a profile, in which noise n' is added to the signal. The broadcast signal is captured by an antenna 612 at the access point 590. The captured signal is amplified by a low-noise amplifier (LNA) 614, filtered by a bandpass filter 616, and converted to the analog baseband signal using a voltage-controlled oscillator 618. The baseband signal is sampled by an analog-to-digital converter (ADC) 620 with a sample rate $f_s=\alpha B$ to produce a digital signal. The digital signal is filtered by a root-raised-cosine filter $RRC_{B,f_s}$ 622 and downsampled by a factor $\alpha$ by a downsampling unit 624. Because an impulse signal was transmitted by the terminal device 592, the downsampled signal is treated as a channel estimate ĥ 626.

The root-raised-cosine filter 598 is a digital filter, and the root-raised-cosine filter 622 is an analog filter, they both have the same bandwidth. The bandpass filter 604 defines the frequency band used by the terminal device 592. Thus, if the terminal device 592 includes a bandpass filter 604 having a passband from frequency f1 to frequency f2, we say that the terminal device 592 uses or is associated with the frequency band f1 to f2. In the example of FIG. 14, the passband of the bandpass filter 604 in the terminal device 592 is the same as the passband of the bandpass filter 616 in the access point 590.

The access point 590 can also be a base station or a transceiver that communicates with multiple other devices using the communication techniques described here.

With a sampling rate $f_s=\alpha B$, the discrete channel impulse response can be written as $$\bar{h}[n]=\Sigma_{v=1}^{V} h_v \delta[nT_s-\tau_v],$$

where $T_s=1/(\alpha B)$. Assuming perfect channel estimation (noise and interference are ignored in the channel probing phase), the equivalent channel impulse response between two root-raised-cosine filters 598, 622 in FIG. 14 is written as $$\hat{h}=(RRC_{B,f_s}*\bar{h}*RRC_{B,f_s}).$$

Figure 17:
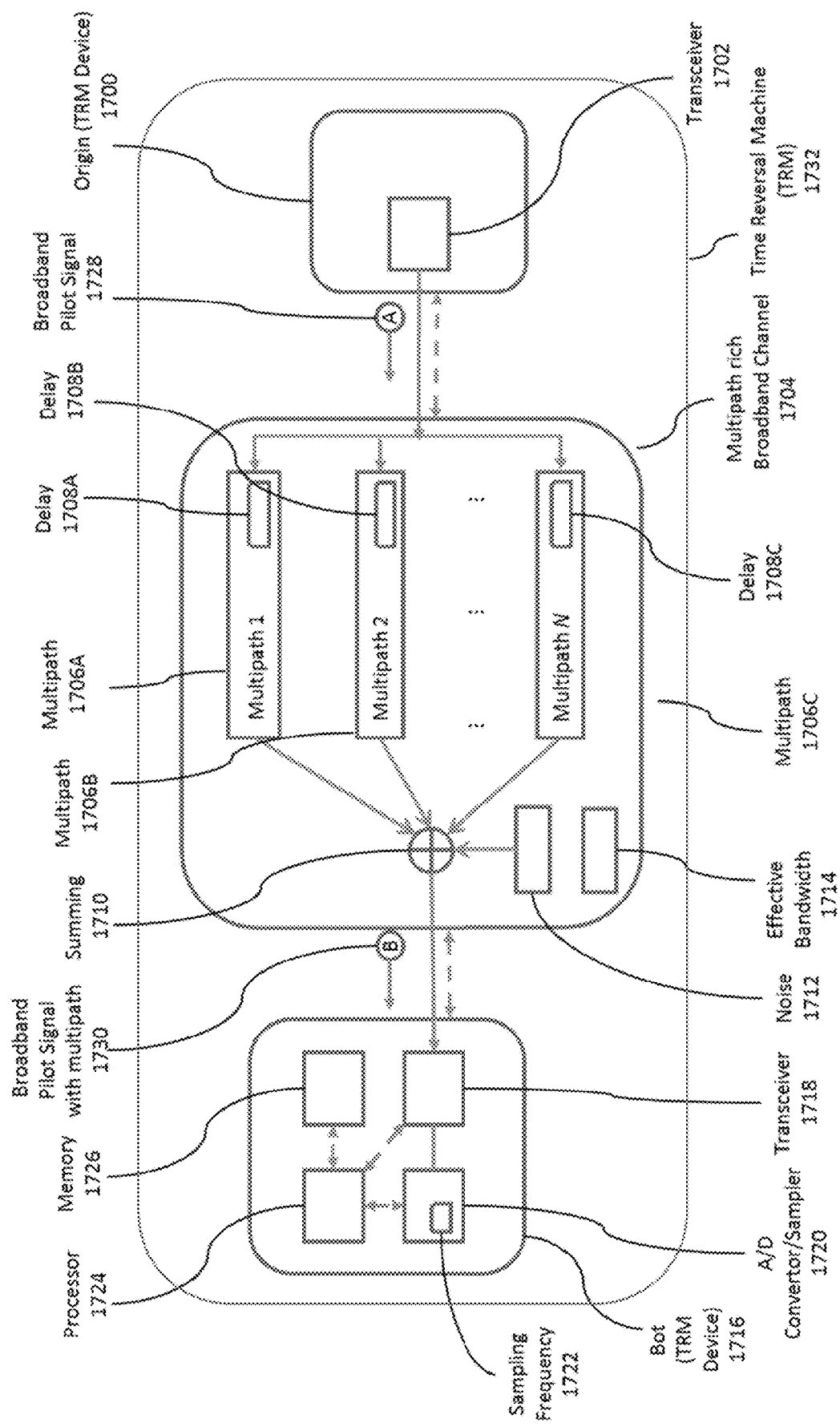
FIG. 17 shows an exemplary diagram showing an exemplary channel probing procedure based on TRM, according to an embodiment of the present teaching.

FIG. 17 shows an exemplary diagram showing an exemplary channel probing procedure based on TRM, according to an embodiment of the present teaching. As shown in FIG. 17, in the channel probing procedure, channel probing is performed when a first TRM device 1700 (serving as Origin in the channel probing) communicates with a second TRM device 1716 (serving as Bot in the channel probing).

The Origin 1700 in this example includes a transceiver 1702 which can transmit a broadband pilot signal 1728 through a multipath rich broadband channel 1704 to the Bot 1716. The broadband pilot signal 1728 may be referred to as a ping signal, a training signal or a training sequence. As discussed before, the Origin 1700 may produce the broadband pilot signal 1728 by a series of operations, including but not limited to, upsampling, RRC filtering, digital-to-analog conversion, signal modulation by a VCO, bandpass filtering and power amplification. The broadband pilot signal 1728 can be broadcasted by the transceiver 1702 and pass through the multipath rich broadband channel 1704.

The multipath rich broadband channel 1704 in this example includes N multipaths 1706A, 1706B, 1706C. Each of the multipaths is associated with a corresponding delay 1708A, 1708B, or 1708C. The total channel response of the multipath rich broadband channel 1704 can be represented by summing 1710 the channel responses of the N multipaths 1706A, 1706B, 1706C and a noise 1712. The multipath rich broadband channel 1704 has an effective bandwidth 1714, which can be a combination of multiple narrow bands from base station channels when multiple antennas are utilized at the Origin 1700 and/or at the Bot 1716.

The signal transmitted by the Origin 1700 and through the multipath rich broadband channel 1704 may be referred to as broadband pilot signal with multipath 1730, which can be captured by the Bot 1716 via a transceiver 1718 included in the Bot 1716. As shown in FIG. 17, the Bot 1716 in this example includes the transceiver 1718, a processor 1724, memory 1726, an A/D converter/sampler 1720. As discussed before, the Bot 1716 may perform a series of operations on the captured broadband pilot signal with multipath 1730, e.g. using the processor 1724 and the memory 1726. The operations may include signal amplification by an LNA, filtering by a bandpass filter, and signal conversion to an analog baseband signal using a VCO. The baseband signal can be sampled by the A/D converter/sampler 1720 according to a sampling frequency 1722 to produce a digital signal. The digital signal may then be filtered by a RRC filter and downsampled to generate a channel estimate of the multipath rich broadband channel 1704.

Data Transmission in TRM System

Figure 18A:
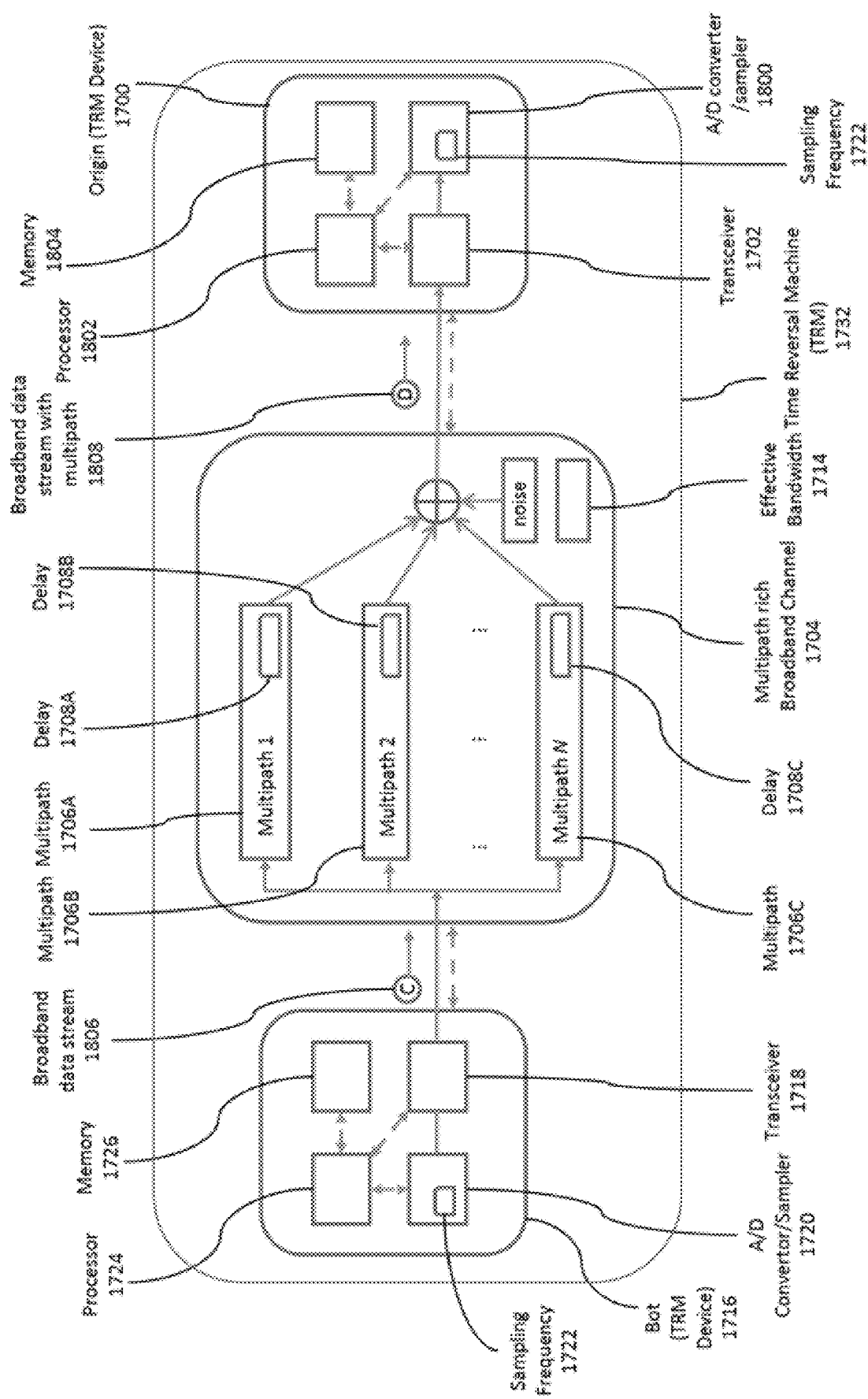
FIG. 18A shows an exemplary diagram showing an exemplary data transmission procedure based on TRM, according to an embodiment of the present teaching.

FIG. 18A shows an exemplary diagram showing an exemplary data transmission procedure based on TRM, according to an embodiment of the present teaching. As discussed before, in the channel probing phase, the Origin 1700 can transmit a pilot signal to the Bot 1716. Meanwhile, the Bot 1716 can estimate and record the channel response and store a time-reversed and conjugated version of the channel response for the transmission phase.

In one embodiment, the Bot 1716 may include a conversion module and a time reversal mirror comprising a plurality of TRMs. With the TRMs, the Bot 1716 can record and time-reverse (and conjugate if complex-valued) a received waveform, which will be used to modulate the time-reversed waveform with an input signal by convolving them together in the following transmission phase.

After the channel probing phase, the transmission phase is initiated. During the transmission phase, the Bot 1716 may transmit a broadband data stream 1806, through the multipath rich broadband channel 1704 to the Origin 1700. The broadband data stream 1806 has been up-sampled at the A/D converter/sampler 1720 of the Bot 1716, according to a sampling frequency 1722.

The data transmitted by the Bot 1716 and through the multipath rich broadband channel 1704 may be referred to as broadband data stream with multipath 1808, which can be captured by the Origin 1700 via the transceiver 1702 included in the Origin 1700. As shown in FIG. 18A, the Origin 1700 in this example includes the transceiver 1702, a processor 1802, memory 1804, and an A/D converter/sampler 1800. After receiving the broadband data stream with multipath 1808, the Origin 1700 may perform a gain adjustment to recover the data and down-sample the data using the A/D converter/sampler 1800, according to the same sampling frequency 1722 to obtain the transmitted data.

Figure 18B:
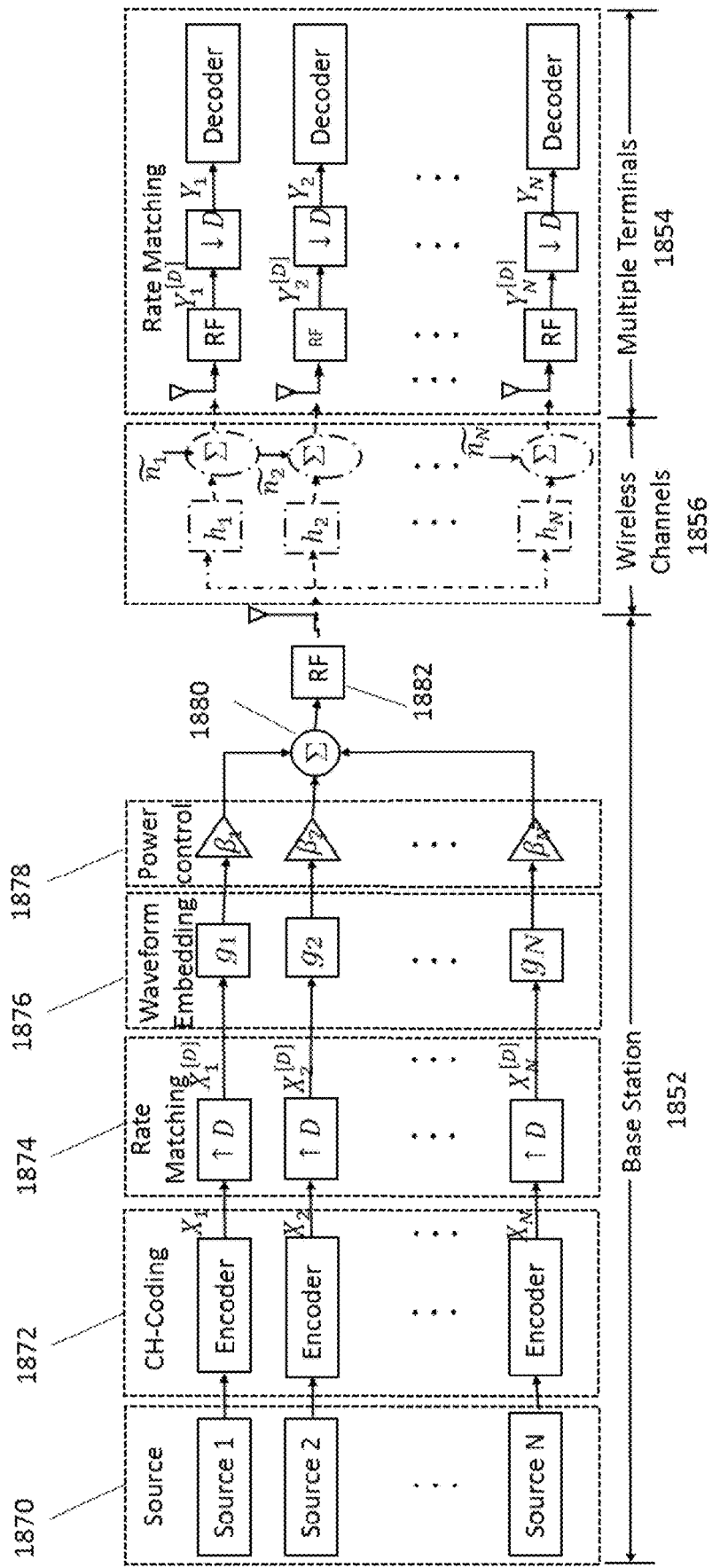
FIG. 18B shows an exemplary diagram showing an exemplary downlink data transmission procedure based on TRM in a multi-user system, according to an embodiment of the present teaching.

A similar scheme can be applied to a multi-user TRM system, where the Bot serves as a base station (BS) to communicate with N users. FIG. 18B shows an exemplary diagram showing an exemplary downlink data transmission procedure based on TRM in a multi-user system, according to an embodiment of the present teaching. In one embodiment, the N users (or also referred to as receivers) may receive statistically independent messages $\{X_1[k], X_2[k], \ldots, X_N[k]\}$ from the BS, via wireless channels 1856. The base station 1852 may include a conversion module and the time reversal mirror comprising plural TRMs.

During the channel probing phase, the N intended users first take turns to transmit an impulse signal to the BS. Meanwhile, the TRMs at the BS record the channel response of each link and store the time-reversed and conjugated version of each channel response for the transmission phase. After the channel probing phase, the transmission phase is initiated. At the BS, each of $\{X_1[k], X_2[k], \ldots, X_N[k]\}$ represents a sequence of information symbols that are independent complex random variables. The rate back-off factor D is introduced as the ratio of the sampling rate to the baud rate, by performing up-sampling and down-sampling with a factor D at the rate conversion module of the BS and the rate conversion module at the receivers. These sequences are first up-sampled by a factor of D at the rate conversion module of the BS. Then the up-sampled sequences are fed into the bank of TRMs. After that, all the outputs of the TRM bank are added together at adder and then the combined signal is transmitted into wireless channels. The signal energy is concentrated in a single time sample and the i-th receiver simply performs a one-tap gain adjustment to the received signal using the adjustment module to recover the signal and then down-samples it with the same factor D using the rate conversion module, ending up with $\{Y_1[k]\}$.

Figure 18C:
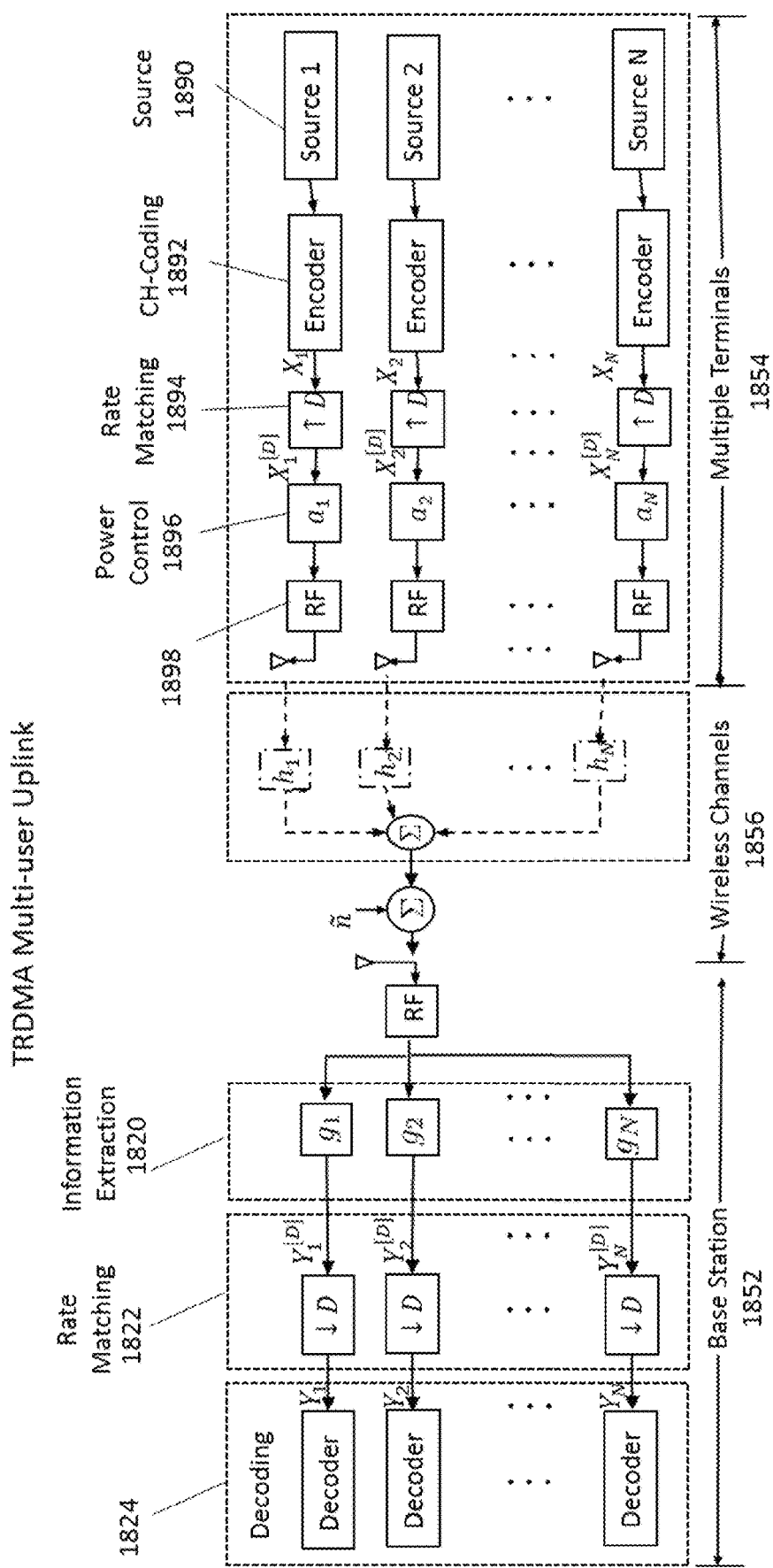
FIG. 18C shows an exemplary diagram showing an exemplary uplink data transmission procedure based on TRM in a multi-user system, according to an embodiment of the present teaching.

FIG. 18C shows an exemplary diagram showing an exemplary uplink data transmission procedure based on TRM in a multi-user system, according to an embodiment of the present teaching. With respect to the uplink, N users can transmit their own data to the base station concurrently. Each user has its own information source which is independent of others. At each user, the information bits are first encoded by the channel coding block. Then the coded symbols $\{X_i[k]\}$ are upsampled by the rate back-off factor D for rate matching at the rate matching module. The scaling factors $\{a_i\}$ are used to implement the power control at the power control module. After multiplying with scaling factor, the sequence of $a_i\{X_i^{[D]}[k]\}$ is transmitted by the RF module. When the sequence $a_i\{X_i^{[D]}[k]\}$ propagates through its wireless channel $\{h_i[k]\}$, the convolution between $a_i\{X_i^{[D]}[k]\}$ and the channel impulse response $\{h_i[k]\}$ is automatically taken as the channel output for the i-th user. Since each user's multipath channel response is unique, the automatic convolution between the $a_i\{X_i^{[D]}[k]\}$ and $\{h_i[k]\}$ is automatically equivalent to the base station's signature embedding process in the downlink. All of the channel outputs for the N users are mixed together in the air plus the additive noise at the base station. Upon receiving the mixed signal, the base station passes this mixed signal through an information extraction module that includes a filter bank of the calculated signature waveforms $h_i$, each of which performs the convolution between its input signal and the corresponding user's signature waveform. Such a convolution using the signature waveform extracts the useful signal component and suppresses the signals of other users. The rate matching is performed by down-sampling (with the same factor D) the filter bank's output signal at the rate matching module to recover the original symbol of each user. Based on $\{Y_i[k]\}$, an estimation about $\{X_i[k]\}$ is made. Then the estimated/reconstructed symbol sequence is fed into the corresponding decoder to recover the information bits from each user at the base station.

Exploiting LTE, Wi-Fi and Other Infrastructures in TRM System

In some embodiments, the TRM systems are deployed by installing one set of at least one TRM transceivers (serving as TRM device A1) and another set of at least one TRM transceivers (serving as TRM device B1).

In yet other embodiments, the TRM systems are deployed by leveraging on existing LTE, Wi-Fi and/or other wireless infrastructures. In these situations, some LTE, Wi-Fi and/or other wireless infrastructure base stations (or their repeaters) play the role of TRM device A1 sending out periodic "ping" signals (pilot signals, or training signals). We deploy a set of at least one TRM transceivers (serving as TRM device B1) which may/may not have accounts/access rights to the LTE/Wi-Fi/other wireless infrastructure base stations. A common feature of these LTE/Wi-Fi/other wireless infrastructure base stations is that they periodically broadcast "ping" signals which can be received by all devices including our TRM transceivers. Our TRM transceivers treat each "ping" signal as a pilot signal and capture the "ping" signal using a high sampling frequency.

Figure 19:
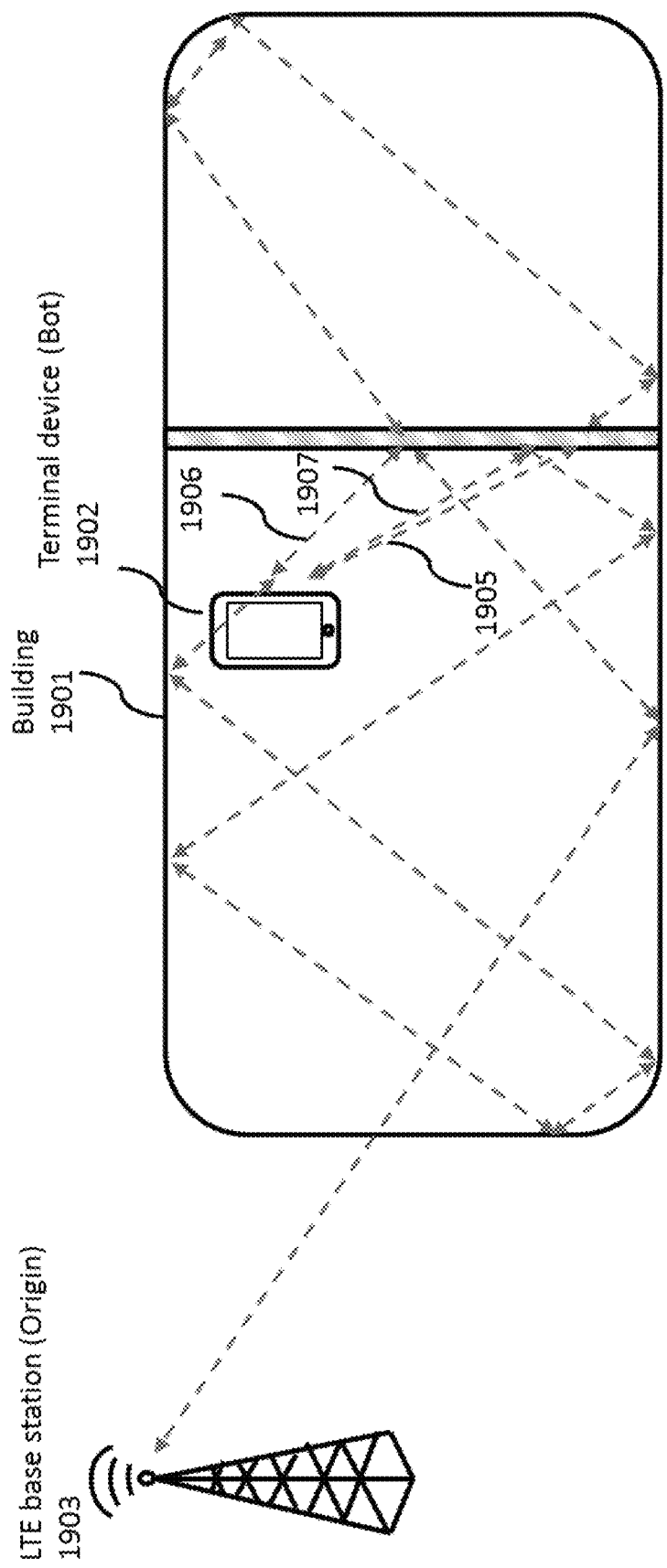
FIG. 19 shows an exemplary diagram showing an exemplary TR system based on TRM where LTE base station working as Origin and terminal device working as Bot, according to an embodiment of the present teaching.

An example is shown in FIG. 19. A "ping" signal from an LTE base station is sent to a terminal device in a facility which is a local multipath-rich environment (e.g. a house, an office, a building, a car, a parking lot, a tunnel, etc.). While the path from the LTE base station to the immediate outside of the local environment may not be rich in multipath, the local environment be multipath rich due to many reflective surfaces, refractive features, diffusion features, etc. The multipath-rich environment is sufficient for the temporal and spatial focusing effect of the TRM to work.

Figure 20:
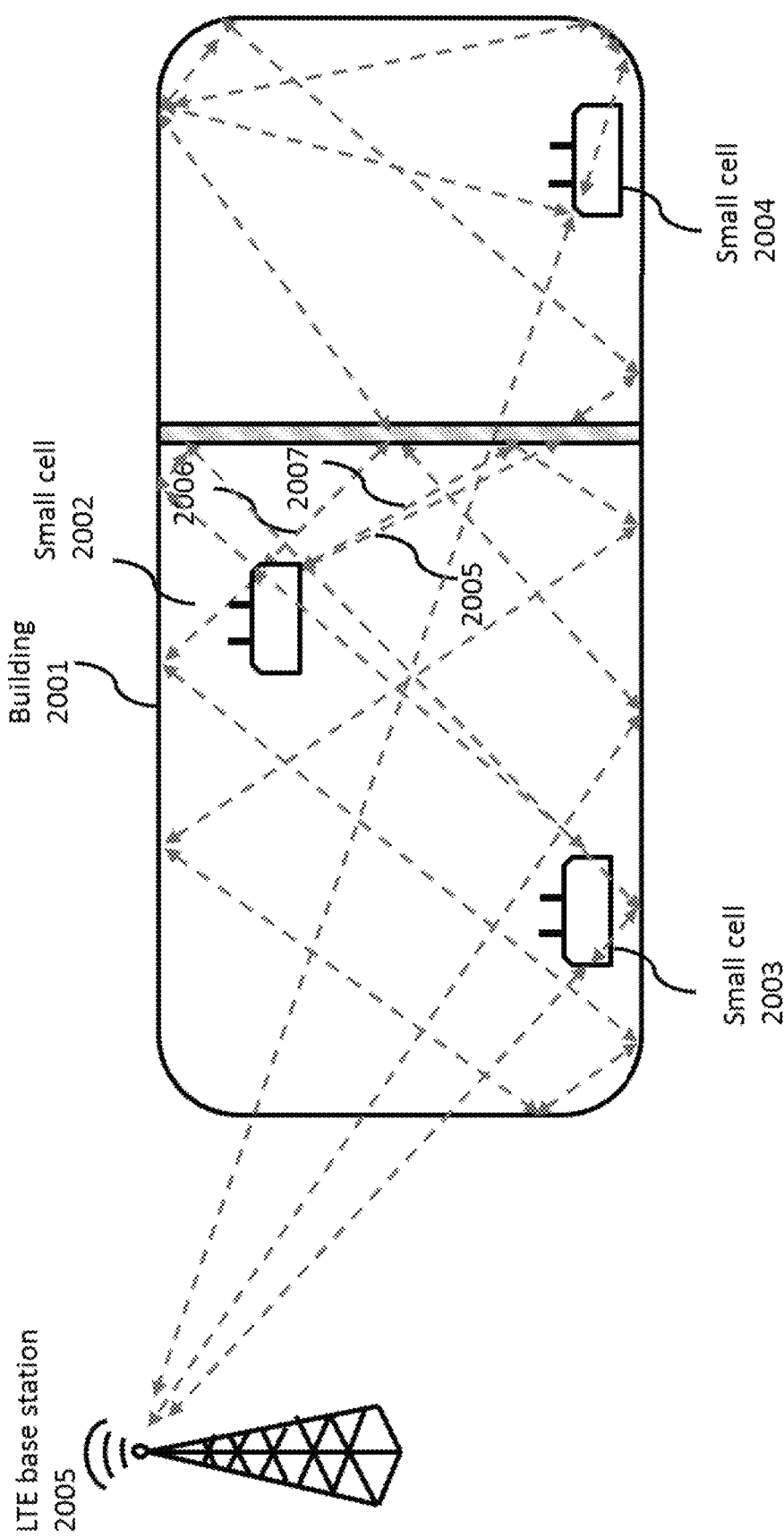
FIG. 20 shows an exemplary diagram showing an exemplary TR system based on TRM where LTE base station working as Origin and small cell working as Bot, according to an embodiment of the present teaching.

Another example is shown in FIG. 20. An LTE base station 2005 may be far from the building 2001 (e.g. a large airport terminal, a large train station, a large shopping mall, etc.) which is a local multipath-rich environment. Thus many small cell (e.g. pico cell and/or femto cell) base stations (e.g. 2002, 2003, 2004) may be installed in the building 2001 to establish small LTE cells and serve LTE devices in the small LTE cells in the building 2001. In one embodiment, all the small cell base stations may be wirelessly connected to the LTE base station. The small cell base stations are designed to be a TRM device, at least part of the time. Periodically, the LTE base station would send broadband "ping" signal. The small cell base stations would receive and sample the broadband "ping" signal (with all the multipath effects) with high sampling frequency, and derive the useful channel impulse response (CIR)/channel state information (CSI) from the received broadband "ping" signal. Then the small cell base stations can use the CIR/CSI to implement any TR-enabled applications such as time reversal monitoring (security/surveillance system), time reversal breathing/vital sign monitoring (life-detection, breathing rate detection/estimation).

In another embodiment, the small cell base stations 2002, 2003, 2004 in FIG. 20 may not be wirelessly connected to the LTE base station 2005, as the LTE base station 2005 may be too far. Instead, the small cell base stations 2002, 2003 and 2004 may be connected to broadband. In an embodiment, periodically one of the small cell base station (e.g. 2002) may serve as TRM device A1 and send out "ping" signals. The other small cell base stations (e.g. 2003, 2004) may serve as TRM device B1 and receive and sample the broadband "ping" signal (with all the multipath effects) with high sampling frequency, and derive the useful CIR/CSI from the received broadband "ping" signal. Then the other small cell base stations can use the CIR/CSI to implement any TR-enabled applications such as time reversal monitoring (security/surveillance system), time reversal breathing/vital sign monitoring (life-detection, breathing rate detection/estimation). The small cell base station that sends out the "ping" signal may change over time (e.g. using 2002 at time 1, using 2003 at time 2, using 2004 at time 3, and so on).

Figure 21:
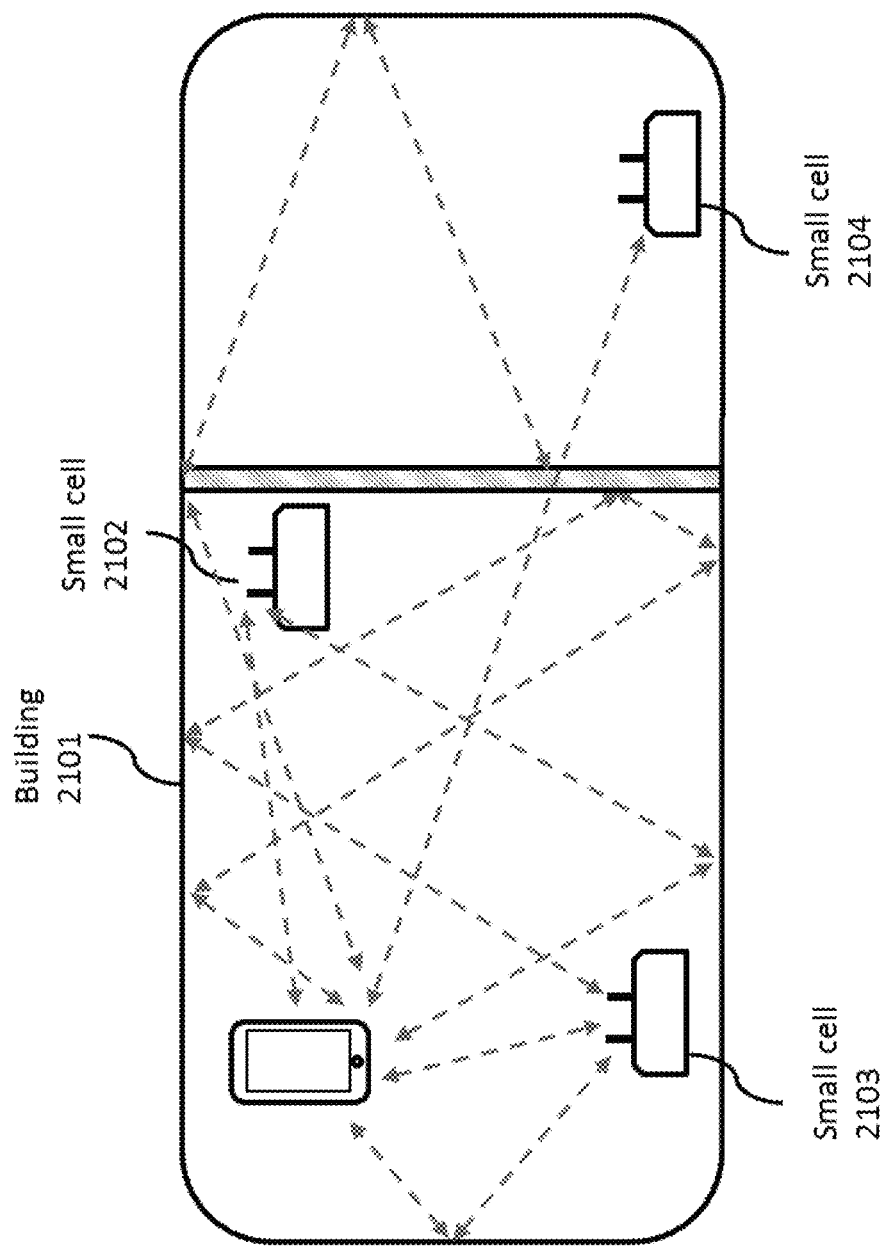
FIG. 21 shows an exemplary diagram showing an exemplary TR system based on TRM where small cell working as Origin and terminal device working as Bot, according to an embodiment of the present teaching.

In another embodiment, the small cell base stations in FIG. 21 may take turn to send out "ping" signals (serving as TRM device A1), which are received by a TRM device (e.g. mobile phone, serving as TRM device B1). The TRM device (e.g. mobile phone) in FIG. 21 may serve as TRM device B1 and receive and sample the broadband "ping" signal (with all the multipath effects) with high sampling frequency, and derive the useful CIR/CSI from the received broadband "ping" signal. Then the other small cell base stations can use the CIR/CSI to implement any TR-enabled applications such as time reversal monitoring (security/surveillance system), time reversal breathing/vital sign monitoring (life-detection, breathing rate detection/estimation). In another embodiment, the mobile phone in FIG. 21 may not be TRM-ready. Instead, a TRM-ready coin-size gadget is inserted into the mobile phone and a matching application/driver is installed in the mobile phone making it TRM-ready. The coin-size TRM-read gadget serves as the TRM device B1 and receive and sample the broadband "ping" signal (with all the multipath effects) with high sampling frequency, and derive the useful CIR/CSI from the received broadband "ping" signal. It communicates the CIR/CSI and/or other TR related data to the application/driver in the mobile phone to support TRM-enabled application such as the time reversal monitoring (security/surveillance system), time reversal breathing/vital sign monitoring (life-detection, breathing rate detection/estimation) to be performed in the mobile phone.

The LTE/Wi-Fi/other wireless infrastructure base station channels may be broadband channels. If the LTE/Wi-Fi/other wireless infrastructure base station channels are somewhat narrow band (with a bandwidth less than broadband), multiple narrow bands may be combined together to achieve an effectively broadband channel with a wide effective bandwidth. Multiple antenna may be exploited to enable such combination of narrow channels. For example, in a 4×2 (or 2T4R) configuration with the base station having 4 antennas and our TRM transceiver having 2 antennas. One narrow band channel exists between each pair of base station antenna and our TRM transceiver antenna. With the 4×2 configuration, there are 8 narrow band channels which when combined can provide an effective bandwidth 8 times wider than the narrow band channel. If each narrow band channel is 20 MHz, the 4×2 configuration can give a 160 MHz effective channel bandwidth. In a 2×2 (or 2T2R) configuration as may happen in a LTE femto cell, four narrow bands of 20 MHz can be combined to give a wide-band channel with an effective bandwidth of 80 MHz. In IoT devices, there may only be a single antenna. We may have 4 antennas in the base station such that we have a 4×1 (or 1T4R) configuration and four 20 MHz channels to give an effective bandwidth of 80 MHz.

In some situations, our TRM transceivers may re-emit time reversal signals to communicate/connect with the LTE/Wi-Fi/other wireless infrastructure base stations, if the LTE/Wi-Fi/other wireless infrastructure base stations are prepared to receive the time reversal signals. The temporal focusing and/or spatial focusing properties (both explained below) of the TRM enables our TRM transceivers to communicate with the LTE/Wi-Fi/other wireless infrastructure base stations with less computation, less energy consumption, lower cost, longer battery life and higher data rate/throughput.

In some other situations, our TRM transceivers may not re-emit time-reversal signals as the LTE/Wi-Fi/other wireless infrastructure base stations may/may not be prepared to receive the time-reversal signals. In the absence of the re-emission of time reversal signals, many useful applications such as time reversal monitoring (security/surveillance system), time reversal breathing/vital sign monitoring (life-detection, breathing rate detection/estimation) can still be achieved using the received "ping" signals (from which, CSI, CIR, as explained below, can be obtained). One advantage of these is that the LTE/Wi-Fi/other wireless infrastructure base station do not need to be installed by us and we can exploit the "ping" signals which are "free" and can be received without requiring any payment/subscription associated with our TRM transceivers. Another advantage of these is that the LTE/Wi-Fi/other wireless infrastructure base stations may be numerous as they may be infrastructure level facilities. The base stations can provide good coverage of "ping" signal within a metropolitan area making the TRM functionalities applicable through the coverage area (e.g. the entire city including subways, the entire country, the entire continent).

For example, the base stations may already be numerous for one LTE carrier such as Verizon, and they are even more numerous when all LTE carriers (e.g. AT&T, T-Mobile, Sprint, etc.) are considered. The LTE base stations may be especially dense in places with high people density such as shopping malls, government agencies, airport, shipping terminals, sport arena/stadiums, etc. In such high people density places, pico cells and femto cells may be employed with very dense base stations. The LTE base stations may be dense in densely populated cities (such as New York City, London, Paris, San Francisco, Hong Kong, Beijing, Shanghai, Tokyo, Seoul, etc.) and densely populated countries (such as Japan, China, Korea, Singapore, India, other Asian countries and other countries/territories).

For another example, city-wide Wi-Fi hot spots are widely available in many government agency, airports, train stations, piers, terminals, subways, sports facilities/arenas/stadiums, libraries, schools, universities, coffee shops, restaurants, malls, parks, museums, and other public areas. Many private household may have one or more private Wi-Fi routers/access points. Although these private Wi-Fi routers/access points may be password protected, the "ping" signals are always available free-of-charge for any devices (including our TRM devices) to receive. Such "ping" signals may often be available 24 hours a day, and 7 days a week.

These infrastructure level LTE/Wi-Fi/other wireless infrastructure base stations are numerous and their "ping" signals are freely available. All our TRM devices need to do is to receive them, sample them at high enough sampling frequency, derive the useful CIR (channel impulse response, as explained below) and/or the useful CSI (channel state information, as explained below) and analyze them for our need/use.

Temporal Focusing and Spatial Focusing of Time Reversal Signals in TRM Systems

The following describes the temporal focusing and spatial focusing of a TRM system. In principle, the mechanisms of reflection, diffraction and scattering in wireless medium give rise to the uniqueness and independence of the channel impulse response of each multi-path communication link. As described in B. Wang et al., "Green wireless communications: A time-reversal paradigm," IEEE Journal of Selected Areas in Communications, special issue on Energy-Efficient Wireless Communications, vol. 29, no. 8, pp. 1698-1710, September 2011, data obtained from indoor experiments show that when the re-emitted time-reversal waves from transceiver A 130 (of a TRM device A1) propagate in the wireless medium in a multipath environment, the location of transceiver B 132 (of another TRM device B1) is the only location that is associated with the reciprocal channel impulse response. Given the re-emitted time-reversal waveform from transceiver A 130 that is specific to the channel impulse response between transceivers A 130 (of the TRM device A1) and B 132 (of TRM device B1), the environment serves as a natural matched-filter only for the intended transceiver B 132 but not other transceivers at other locations. As a result, the temporal focusing effect of the specific re-emitted time-reversal waveform can be observed only at the location of the transceiver B 132 (of the TRM device B1).

Figure 3:
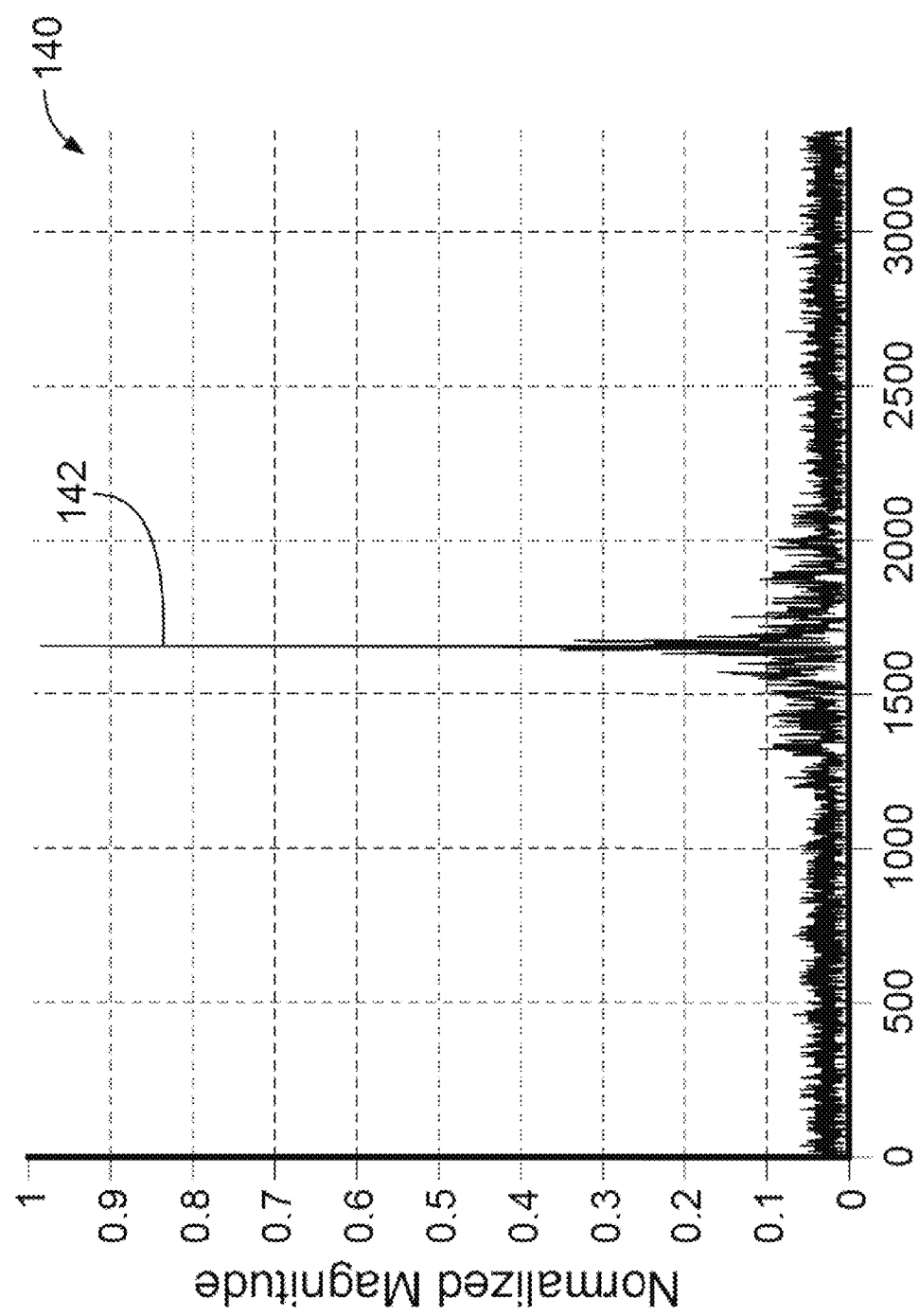
FIG. 3 shows an exemplary graph showing the temporal focusing effect of time-reversal signals, according to an embodiment of the present teaching.
Figure 4:
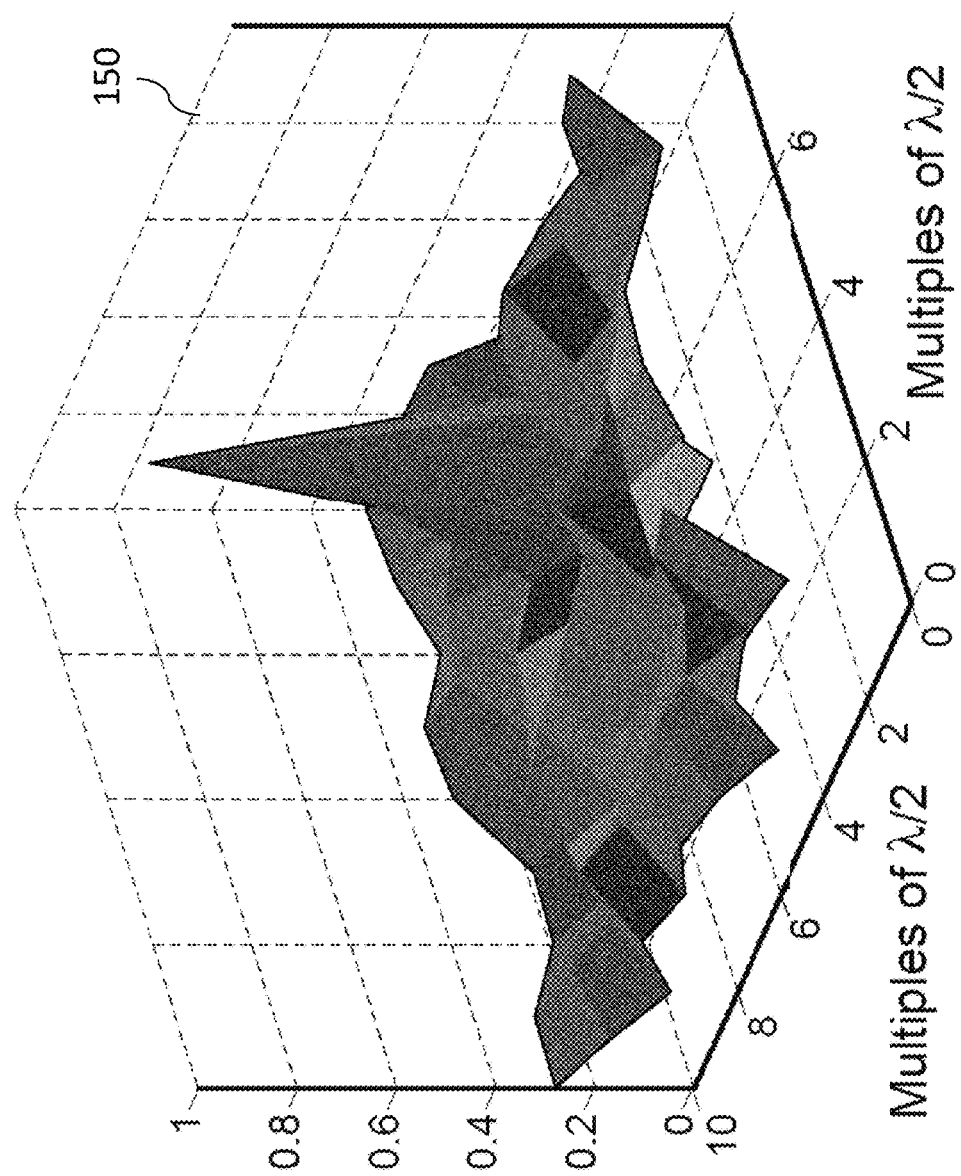
FIG. 4 shows an exemplary graph showing the spatial focusing effect of time-reversal signals, according to an embodiment of the present teaching.

In FIG. 3, a graph 140 shows the signal strength detected at transceiver B 132 (of TRM device B1) over a period of time after transceiver A 132 (of TRM device A1) transmits a time-reversal signal. At a particular time, the signal power exhibits a strong peak 142 at the transceiver B 132. As the time-reversal signal is sent In FIG. 4, a graph 150 shows the spatial distribution of signal strength detected at a region in the vicinity of the transceiver B 132 at the time when the peak signal occurs at the location of transceiver B 132. The signal power concentrates spatially only at the location of the transceiver B 132. The graphs 140 and 150 show that the re-emitted time-reversal waveform generates a resonant effect at a particular location at a particular time, demonstrating the spatial and temporal focusing effects of the time-reversal signal of the TRM system.

Experimental results in both acoustic/ultrasound domain and radio frequency (RF) domain have verified the temporal focusing and spatial focusing effects of the time reversal transmission, as predicted by theory.

In the context of communication systems, the temporal focusing effect concentrates a large portion of the useful signal energy of each symbol within a short time interval, which effectively suppresses the inter-symbol interference (ISI) for high speed broadband communications. The spatial focusing effect allows the signal energy to be harvested at the intended location and reduces leakage to other locations, leading to a reduced transmit power requirement and lower co-channel interference to other locations. The benefits and unique advantages of time-reversal based wireless systems due to the temporal and spatial focusing effects can be applied to implement the Internet of Things.

The spatial and temporal effect can also be used to achieve wireless power transfer to any TRM devices (e.g. IoT devices, smart phone, and/or smart devices) within the multi-path environment. Many TRM devices may run on batteries which have limited capacity. When the batteries run out, the TRM devices cannot operate. Thus the batteries need to be charged. But connecting the TRM devices by wire to power supply (e.g. household AC power supply or a portable power bank) tends to be tedious. Users may forget to charge. Users may find it troublesome to charge periodically. So it is highly desirable to charge these TRM devices wireless, wherever they are (e.g. inside or outside the household, the office, the building, the facility, the installation, etc.). The TRM device A1 (wherever it is) can communicate a pilot signal to TRM device B1 which may be a base station at a fixed location connected AC power, or a portable power bank with ample power. Based on the captured channel impulse response, the TRM device B1 can re-emit time-reversal signal waveforms repeatedly such that the power of the time-reversal signal waveforms focuses at the TRM device A1, which then stores the wirelessly transmitted power in its battery.

Time Reversal Positioning/Tracking System Based on the TRM

Figure 5:
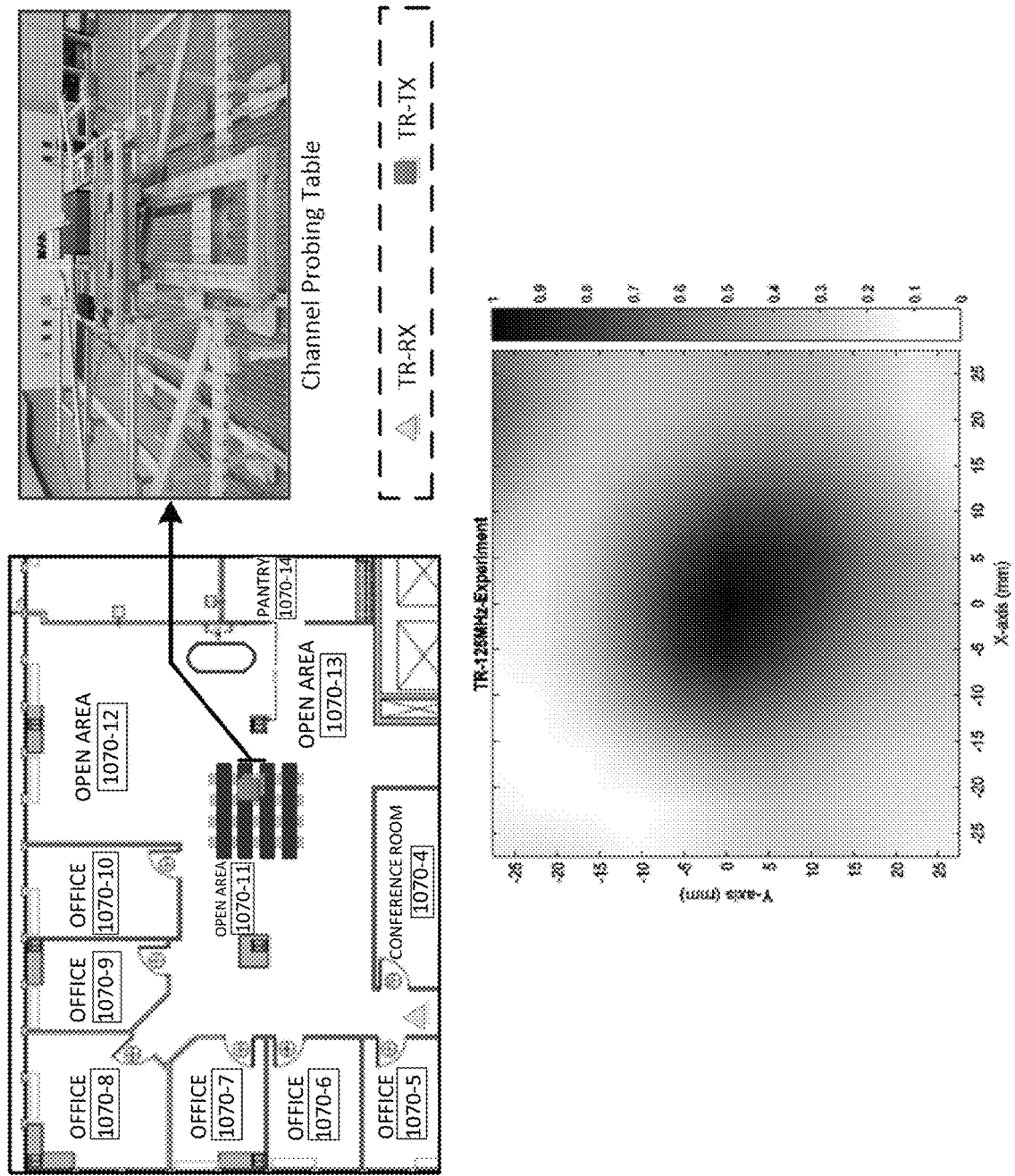
FIG. 5 shows an exemplary office environment and a graph showing the spatial focusing effect of time-reversal signals in the office environment, according to an embodiment of the present teaching.

An example of a TRM system in an indoor environment is shown in FIG. 5. The layout of an office unit with a rectangular shape is shown in FIG. 5. There are some rooms with walls and doors on the side of an office unit. This is a multi-path rich wide-band environment due to all the reflection (from surfaces of the walls, floor, ceiling, structural features, tables, chairs, computers, shelves, refrigerator, furniture, etc.), refraction and diffusion (from small opening, gaps, corners, grids), and passage way (from the open space, paths, alleys, doors, windows, openings, etc.). A channel probing table is constructed and placed in the center open area of the office unit. One TRM device called TR-TX (serving as TRM device A1) is placed on the movable platform of the channel probing table while another TRM device called TR-RX (serving as TRM device B1) is placed at a location in the office unit with the line-of-sight being blocked by at least one wall. The TR-TX sends a broadband pilot signal to the TR-RX which samples (with high sampling frequency), captures, records, and processes (including time reversal) the received broadband pilot signal. The TR-RX re-emits the time-reversal broadband signal which goes through the multi-paths in the environment such that all the multi-path signals arrive coherently at a particular time at the TR-TX. The movable platform is moved around a vicinity of the original location of TR-TX to capture the spatial distribution of signal energy around the intended location.

Due to the spatial and temporal focusing effect as shown in the example of FIG. 5, in a time reversal wireless system, the energy is distributed in a small "focusing ball" in the close vicinity of the intended location. In a rich-scattering environment, e.g., an office, the energy distribution inside the focusing ball is stationary and location-independent. When the bandwidth of the time reversal wireless system is large enough, the focusing behavior for each location in the typical rich-scattering environment exhibits less randomness and become deterministic-like. The location-independent characteristic can be utilized for positioning/tracking. Let us define the time reversal resonating strength (TRRS) as the normalized energy of the received signal at the receiver, when the waveform applied at the receiver side is the time-reversed and conjugated version of the channel impulse response (CIR)/channel state information (CSI) (of the TRM).

The TRRS at the intended location is normalized to be 1 and the TRRS at other locations should be less than 1, defined as the TRRS decay function. Using a Clarke one-ring scattering model, the TRRS decay function is shown to be a Bessel function of the first kind. Experimental results have shown that the TRRS decay function is statistically stationary in space and become deterministic-like. Therefore, the reduction of the TRRS between CSIs measured in adjacent locations can be mapped to the moving distance of a TR transmitter or receiver during the channel probing time interval. We use the average of TRRS decay function as the reference curve. An averaging window can be applied to further average out the fluctuations of the TRRS decay function.

We construct a TRRS-based speed estimator to estimate the speed of a moving object (the moving object carrying the TRM device A1, while the TRM device B1 remains stationary). The speed estimator first estimates an average decay of the TRRS of a signal within a time window. Then, it compares the average decay with a reference TRRS decay function. After that, it estimates an elapsed time for moving a predetermined distance based on the comparison of the average decay with the reference TRRS decay function and obtains the speed of the moving object based on the distance and the estimated elapsed time.

Utilizing the TRRS-based speed estimation, a tracking system can be built. The tracking system first receives a wireless signal from the object to be tracked (carrying the TRM device A1), then estimates a first distance of a movement of the object (carrying the TRM device A1) based on information derived from the received wireless signal, and obtain the location of the object based on a combination of the estimated first distance and the estimated direction. The direction of the movement of the object can be estimated by obtaining an angular velocity based on an output signal provided by a gyroscope and integrating the angular velocity over time. The direction of the movement of the object can also be estimated from an output signal provided by a magnetometer.

In other embodiments, the tracking system first estimates an initial position of the object (carrying the TRM device A1) prior to the movement, determines a moving trajectory based on the estimated first distance and the estimated direction of the movement, and determines a new estimated position of the object by adding the moving trajectory to the estimated initial position. In other embodiments, the first distance can be estimated by first estimating an average decay of TRRS within a time window based on the information derived from the received wireless signal, comparing the average decay with a reference TRRS decay function, and estimating the first distance based on a mapping of the decay and distances.

In various embodiments, the object (carrying the TRM device A1 of the TR tracking system) to be tracked can be a human, an animal, a car, a truck, a bus, a ship, a train, and etc. The object can move in an office, a store, a factory, a hotel, a museum, a house, a room, a building, a classroom, a warehouse, a storage facility, a parking lot, a walled facility, a garden, a forest, a valley, a river-valley, a terrain, a coastal area, a maze, an alley, a path, a road, a track, a canal, a trajectory, a sewage system, a fire-exit path, a subway system, a tunnel system, a cavern, an underground structure, a volcano, a mine, a mining facility, a floating structure, a submerged/semi-submerged structure in river/sea, a ruin/destruction/catastrophic site with debris, an obstacle path, a mapped area, an air space with some surrounding natural/artificial reflecting surfaces on earth and/or in outer space, a piping system, a machine/device, a structure with hallow cavities and/or openings and/or gaps, a body of a human/creature, a facility/installation with multiple reflecting surfaces, a car, a truck, a bus, a ship, a train, a mobile home, and etc. The place where the object is moving in can be one-floor, multi-floor, with or without constructions underground.

In various embodiments, there can be at least one transmitter (in at least one TRM device A1) and at least one receiver (in at least one TRM device B1) in the TR tracking system, each with at least one antenna.

In various embodiments, when the TR tracking system is used to track an object (carrying a TRM device A1) inside/outside/near/above/below a building, the shape of the building can be round, square, rectangular, triangle, irregular-shaped, etc. The construction material used in the building may be concrete, cement, glass, metal, wood, paper, fabric, sand, a kind of stone, plastic, rubber, soil, rock, plants, tree trunk/bark/root/leaves, creature tissues, and/or other material natural/synthetic/artificial/man-made in solid/liquid/gas/plasma state. The structures inside the building may include ceilings, floors, walls, partitions, carpets, windows, drapes, shelves, table, chairs, human, mesh/net/network, pipes, ducts, holes, gaps, alleys, paths, walkway, hallway, lobby, toilets, rooms, doors, windows, openings, lifts, escalators, fixtures, furniture, aquarium, water/liquid/fluid bodies, computers, utensils, and other structures that may be software/hard/permeable/flexible/rigid in solid/liquid/gas/plasma form.

The trajectory of the object can be displayed/visualized/rendered on a surface, a screen, a projected screen, a computer screen, a virtual reality unit and/or an augmented reality unit with/without the coordination/collaboration/interaction/input of at least one auxiliary system (e.g. map system, navigation system, transportation system, healthcare system, security system, surveillance system, communication system, information system, internet/cloud system, gaming system, tracking system, positioning system, localization system, entertainment system, manufacturing system, office automation system, personal assistance system, advertising system, e-Commerce system, government system, law enforcement system, defense system, educational system, searching system, disaster relief system, etc.), played out from an audio device, described in text (e.g. text messages, emails, twitter, Facebook, social network), and/or other means of user interface etc.

Time Reversal Monitoring System Based on the TRM

TR technique of the TRM system treats each path of the multipath channel in a rich scattering environment as a widely distributed virtual antenna and provides a high-resolution spatial-temporal resonance, i.e., the focusing effect. The spatial-temporal resonance, uniquely determined by multipath propagation environment, includes all the information during RF signal transmission and compresses it into a scaler metric. When there is an event happening or a change in the propagation environment, the involved multipath signal varies correspondingly. As a consequence, the spatial-temporal resonance also changes. The TR based monitoring system adopts TR technology to fully utilize all the multipath information in a rich-scattering (multi-path rich) indoor and/or outdoor environment, and treats the unique spatial-temporal (broadband, with large effective bandwidth) resonances as features. The TR spatial-temporal resonances naturally combine and compress the unique (broadband, with large effective bandwidth) multipath profile into a scaler. When the multipath profile changes, the corresponding spatial-temporal resonances vary and are captured by the broadband TR monitoring system (with a high sampling frequency). Therefore, by utilizing such a unique environment-specific multipath CSI (of the TRM), the TR monitoring system is able to detect an event by matching the multipath CSI to an event happening in the wide-band environment.

Due to existence of the carrier frequency offset (CFO), the sampling frequency offset (SFO) and the symbol timing offset (STO), the estimated CSI (in the TRM) is corrupted with common phase distortion and linear phase distortion. The broadband monitoring system eliminates the phase offset residuals in the estimated CSI by receiving a wireless signal from a device, estimating the linear phase offset in the estimated CSI due to the SFO and the STO, estimating the common phase offset in the estimated CSI due to CFO, and obtaining a clean CSI at the receiver without referring to any reference CSI. The linear phase distortion coefficient can be estimated based on the element-wise product of the raw CSI and a shifted version of it. The common phase offset can be estimated based on the angle of the average on the complex-valued CSI on each subcarrier of the wireless signal.

The TRRS can be calculated using an inner product operation. Since the estimated CSI collected at the same location or state is the real CSI corrupted by noise, it can be shown that the term, "1—TRRS between the CSI coming from the same location/state" follows a lognormal distribution, and the scale parameter and the location parameter of the lognormal distribution can be estimated with the knowledge of the noise variance. Based on the statistical model, a real-time TR statistics-based monitoring system can be built, as shown in FIGS. 6 and 7, comprising processors for: receiving wireless signals from commodity Wi-Fi-like devices (or LTE-like devices or other wireless broadband devices) to estimate the CSI; in the training phase, training a statistical based classifier with the knowledge of indoor events and the corresponding CSI; in the testing phase, estimating which indoor event is happening in the course of the Wi-Fi transmission (or LTE transmission or the transmission of the other wireless broadband devices); applying a sliding window combined with a majority vote to fuse the decisions of each testing CSI samples over time domain; and detecting human motion by tracking the variance on TRRS within each sliding window on TRRS samples.

Figure 6:
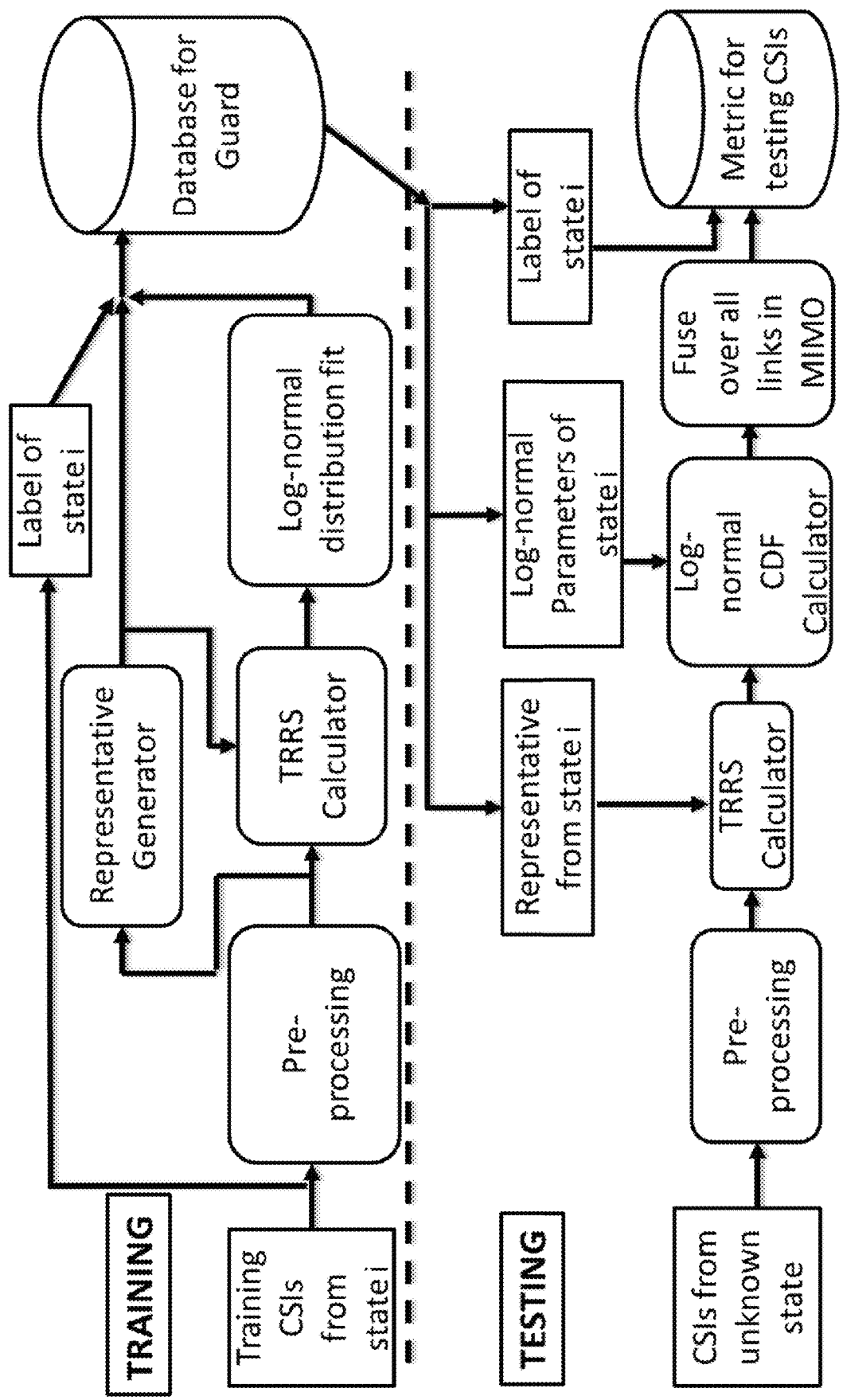
FIG. 6 shows an exemplary diagram showing the time reversal monitoring system based on the TRM using statistics-modelling-based approach Part I, according to an embodiment of the present teaching.
Figure 7:
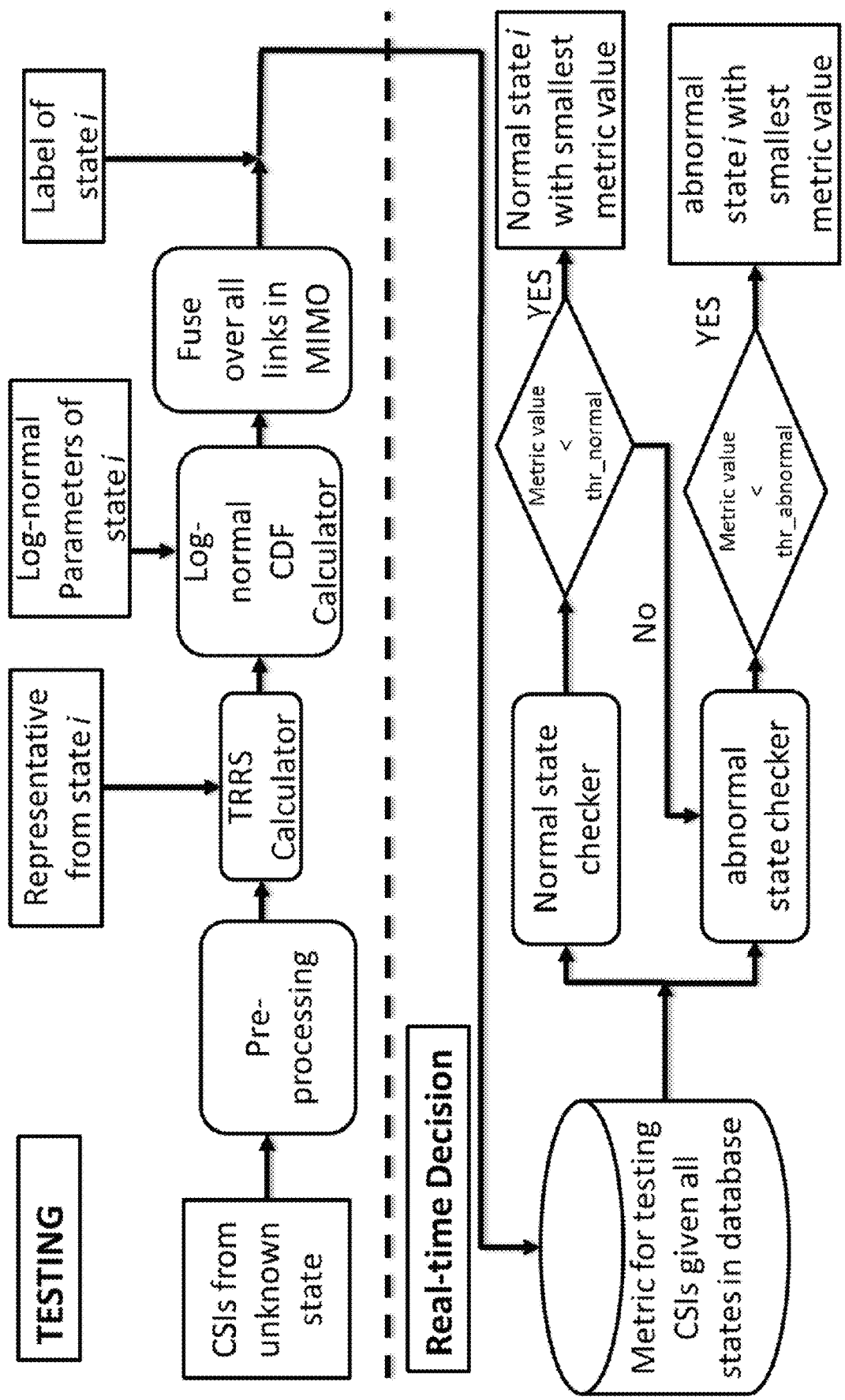
FIG. 7 shows an exemplary diagram showing the time reversal monitoring system based on the TRM using statistics-modelling-based approach Part II, according to an embodiment of the present teaching.

In the real-time TR statistics-based monitoring system (based on the TRM), referring to FIG. 6 and FIG. 7, there is at least a processor for learning a statistics-based classifier, comprising: cleaning and compensating the phase offset in the raw CSI; extracting a representative CSI for each link for each indoor event; calculating intra-class per-link TRRSs for each indoor event between the representative and other training CSI samples; estimating the parameters of the TRRS distribution assuming lognormal distribution based on the samples of intra-class 1-TRRS for each link; and building a training database with pairs of lognormal distribution parameters and CSI representatives for each link and each indoor event.

In the present disclosure, "phase offset compensation", "phase offset cleaning", "phase offset calibration" and "phase offset sanitization" will be used interchangeably.

In the real-time TR statistics-based monitoring system, there is at least a processor for estimating which event is happening, comprising: cleaning and compensating the phase offset in the raw CSI; given a hypothesis of each specific indoor event, calculating intra-class per-link TRRSs for the indoor event between the representative and the clean tested CSI; given a hypothesis of each specific indoor event, calculating the parameter of the cumulative distribution function (CDF) of "1-TRRS" of the tested CSI assuming lognormal distribution; given a hypothesis of each specific indoor event, obtaining the metric from the tested CSI by taking the product of CDF values for all links; and making the decision based on the metric value of different event hypothesis as: firstly, checking the metric values for the normal states: if it is below a first threshold, the estimated indoor event is the one with the smallest metric value; otherwise, checking the metric values for the abnormal states: if it is below a second threshold, then the estimated indoor event is the one with the smallest metric value.

Figure 8:
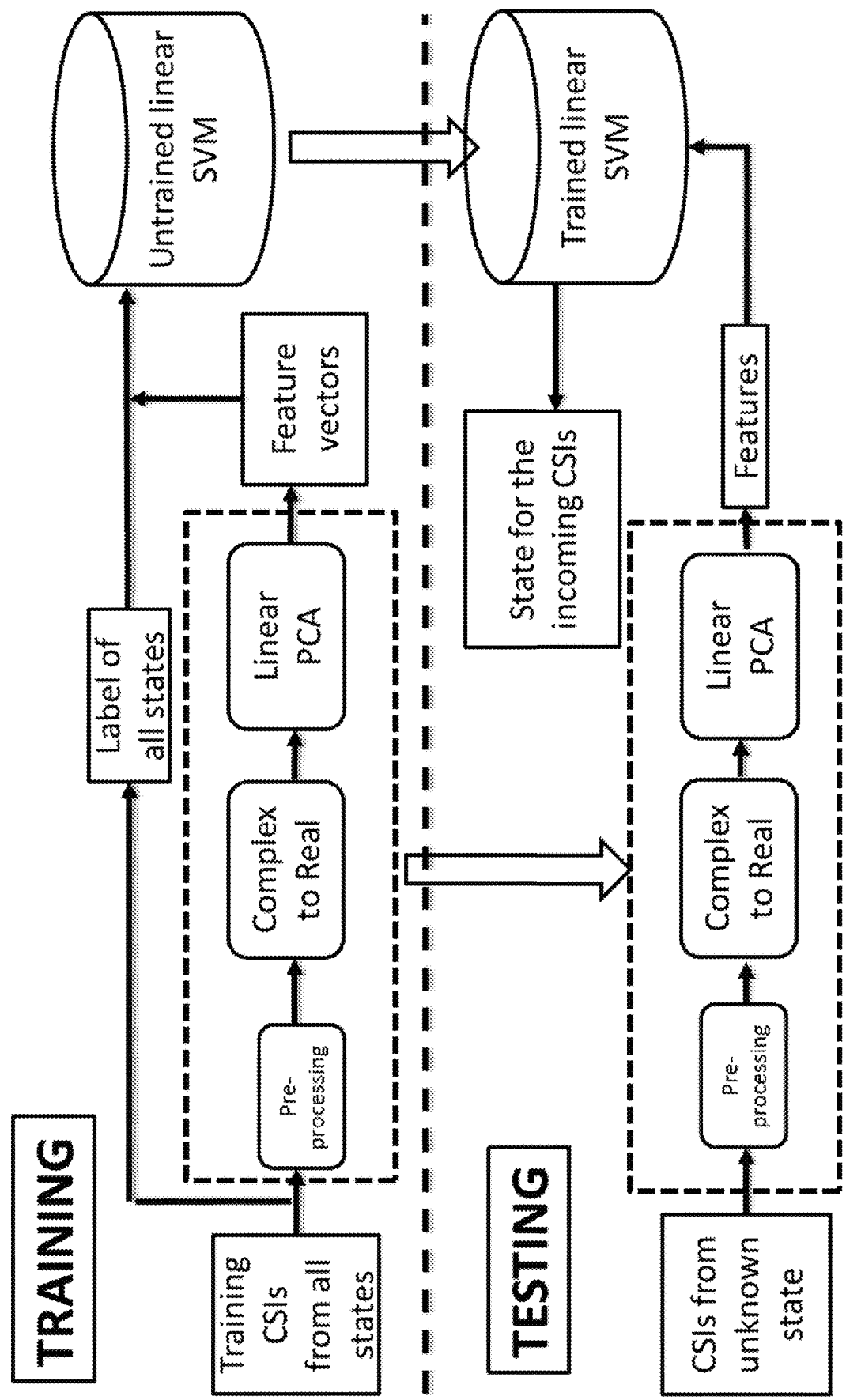
FIG. 8 shows an exemplary diagram showing the time reversal monitoring system based on the TRM using machine-learning-based approach, according to an embodiment of the present teaching.
Figure 9:
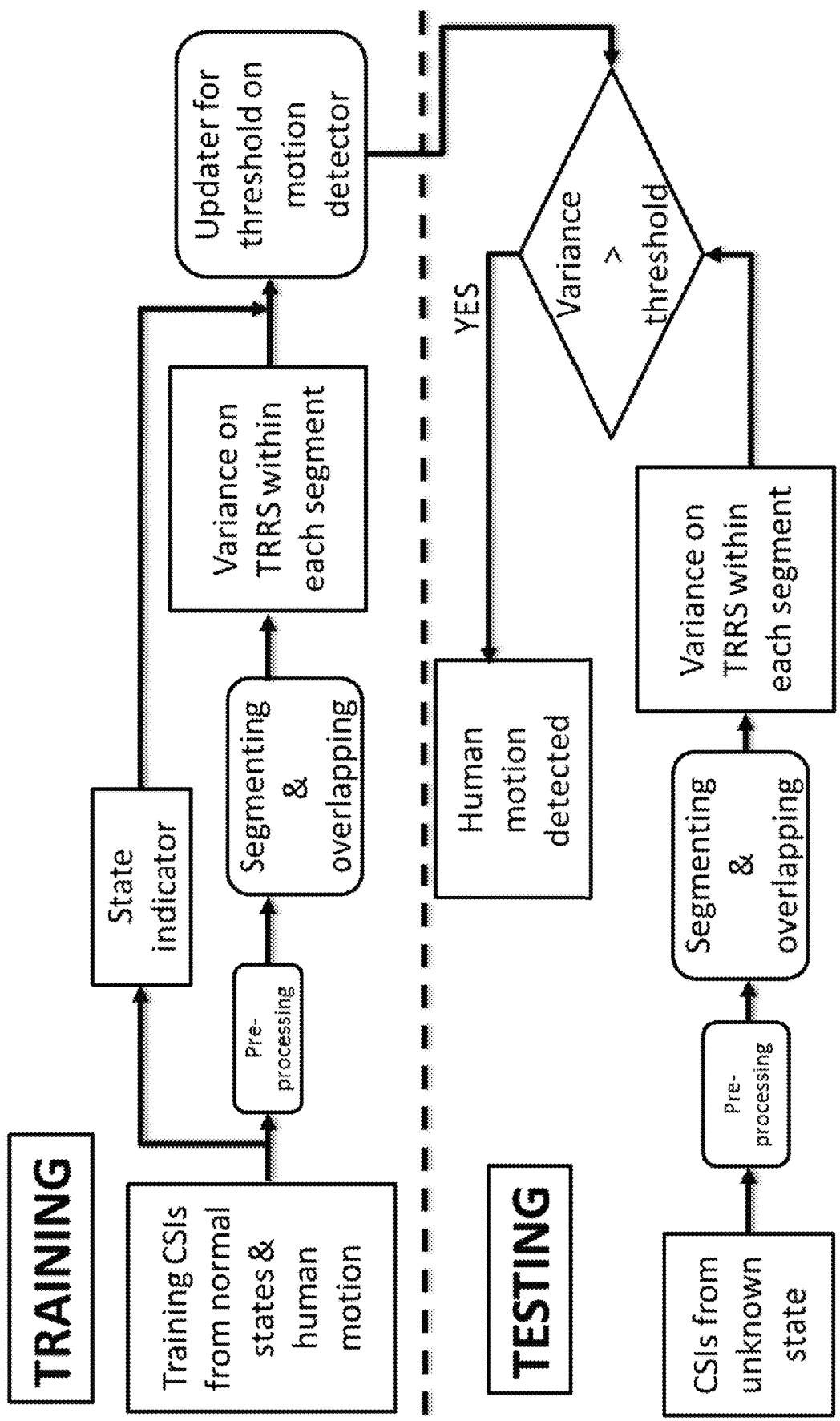
FIG. 9 shows an exemplary diagram showing the time reversal monitoring system based on the TRM, human motion detection module, according to an embodiment of the present teaching.

Referring to FIG. 8, other methods such as machine learning can also be exploited by the monitoring system. In the real-time machine-learning-based TR monitoring system (based on the TRM), the system comprising at least one processor for: receiving wireless signals to estimate the CSI; in the training phase, extracting features from labeled CSI samples in the training database and learning a classifier based on the features; in the testing phase, estimating which indoor event is happening in the course of the wireless signal transmission; sliding window combined with majority vote is applied to fuse the decisions of each testing CSI samples over time domain; and detecting human motion by tracking the variance on TRRS within each sliding window on TRRS samples (based on procedures in FIG. 9).

In the real-time machine-learning-based monitoring system, the step of extracting features and learning a classifier comprises: cleaning and compensating the phase offset in the raw CSI; training a principle component analysis (PCA) for dimension reduction on the clean CSI for all indoor events; extracting features as the first 200 major components in the raw CSI after going through a PCA; and learning a linear support vector machine (SVM) with the feature vectors from the trained PCA as the input and with the knowledge of labels for each sample.

In the real-time machine-learning-based monitoring, the step of estimating which indoor event is happening comprises: cleaning and compensating the phase offset in the raw CSI; extracting features from the learned PCA; and obtaining a predicted label for the extracted feature by using the learned linear SVM.

In embodiments, the TR monitoring system (based on the TRM) can monitor the state of a door opening/closed, a window opening/closed, etc. In embodiments, the TR monitoring system can detect motion of a human, motion of an animal, motion of a vehicle, etc.

In some embodiments, the monitoring system may be adaptive such that the training of the system may be adaptive. The adaptive training of the system may be on-going (e.g. continuously or intermittently) to adapt to slight change/drift of the environment over time.

In embodiments, the environment to be monitored by the TR monitoring system can be an office, a store, a factory, a hotel, a museum, a house, a room, a building, a classroom, a warehouse, a storage facility, a parking lot, a walled facility, a garden, a forest, a valley, a river-valley, a terrain, a coastal area, a maze, an alley, a path, a road, a track, a canal, a trajectory, a sewage system, a fire-exit path, a subway system, a tunnel system, a cavern, an underground structure, a volcano, a mine, a mining facility, a floating structure, a submerged/semi-submerged structure in river/sea, a ruin/destruction/catastrophic site with debris, an obstacle path, a mapped area, an air space with some surrounding natural/artificial reflecting surfaces on earth and/or in outer space, a piping system, a machine/device, a structure with hallow cavities and/or openings and/or gaps, a body of a human/creature, a facility/installation with multiple reflecting surfaces, a car, a truck, a bus, a ship, a train, a mobile home, and etc. In embodiments, the object of the TR monitoring system can be one-floor, multi-floor, with or without constructions underground. In embodiments, the shape of the object of the TR monitoring system can be round, square, rectangular, triangle, irregular-shaped, etc.

In embodiments, there may be at least one transmitter (e.g. TRM device A1) and/or at least one receiver (e.g. TRM device B1) in the TR tracking system (based on the TRM), each with at least one antenna. In embodiments, the transmitter and/or receiver can be at fixed locations or mobile.

In embodiments, when a special event or motion is detected by the TR monitoring system, the system can give alarm signals via audio, video, sms, email, etc. The system can be standalone, used to assist other monitoring system to reduce false alarm, used to assist other monitoring system to improve sensitivity, etc.

Time Reversal for Breathing and Vital Signs Monitoring Based on TRM

CSI (of the TRM system) is a fine-grained information that portraits the propagation path of electromagnetic waves. It is temporally stationary in a static environment. Human activities introduce dynamics into the CSIs. The TR monitoring system (based on TRM) in the previous section can monitor large-scale state change, e.g., a window or door open/close, and human/animal motion. Actually, small scale human activities such as human breathing can also be monitored, which will be detailed in the following TR breathing and vital signs monitoring system (based on TRM).

Figure 10:
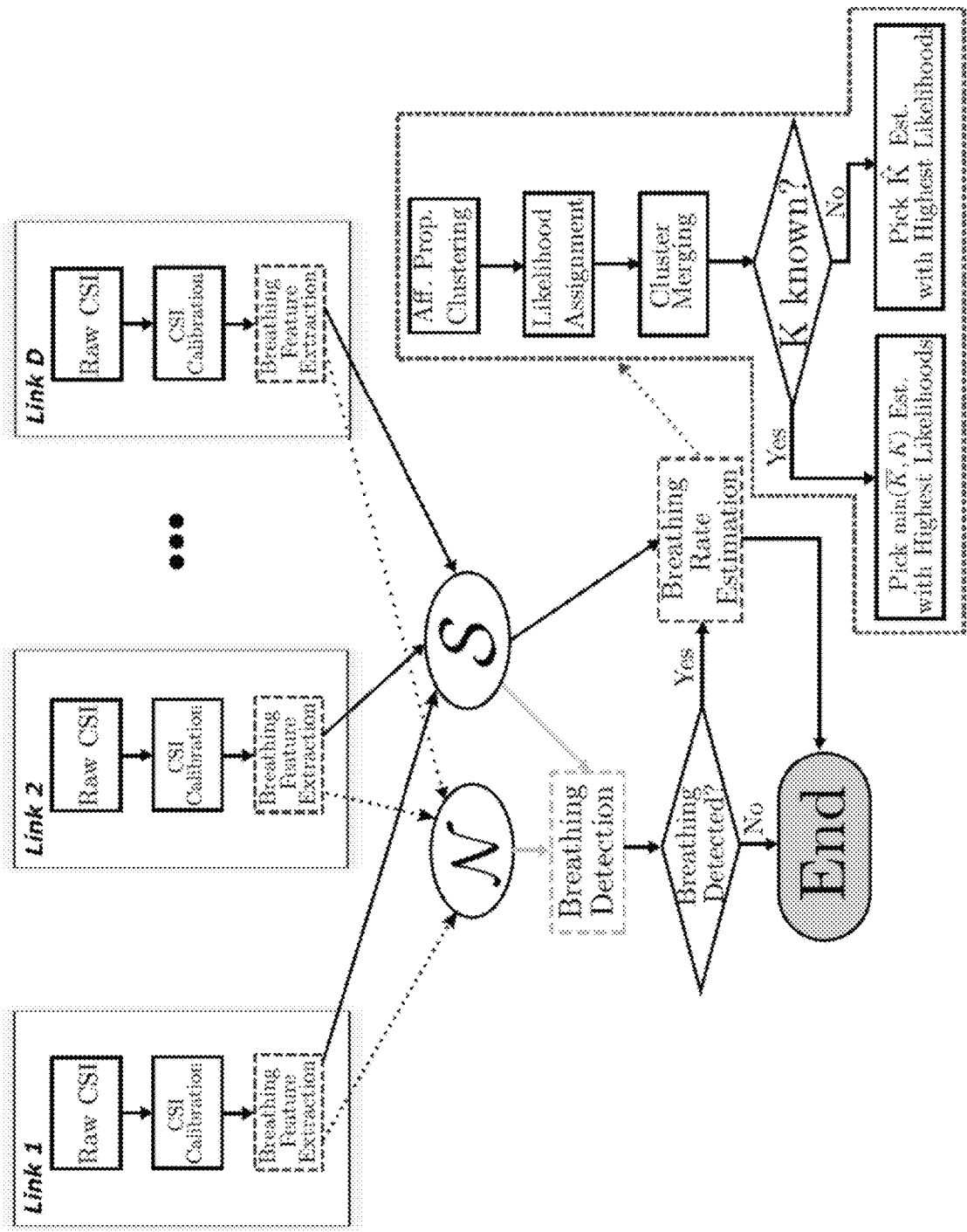
FIG. 10 shows an exemplary diagram showing the architecture of TR for breathing and vital signs monitoring based on TRM, according to an embodiment of the present teaching.

In an environment without dynamics, CSI is highly stationary. Human breathing introduces dynamics into CSIs, since the electromagnetic wave reflected from the human chest varies periodically due to exhalation and inhalation. Consequently, the CSI amplitudes and phases undergo periodic changes which are encapsulated into the CSIs. The architecture of the TR breathing monitoring system (based on TRM) is shown in FIG. 10. Assume there is a total of D transmitting-receiving links in a multi-antenna wireless system, for example, a Wi-Fi-like and/or a LTE-like system. CSIs captured on link d are calibrated to mitigate the impact of the residual synchronization errors. The calibrated CSIs are further processed by breathing feature extraction. In the breathing feature extraction, the TRRS is calculated between the CSIs collected from a series of time instances. Given M CSI measurements, a M*M TRRS matrix R is formulated which can be expressed by $R=[(\phi_0\ \phi_1\ \phi_2\ \ldots\ \phi_K]A+\eta$, where $\phi_K$ is the steering vector associated with the k-th breathing rate, A contains the Fourier series coefficients, and $\eta$ contains the remaining terms including the harmonics and the static terms. The breathing rate in the steering vector can be estimated by Root-MUSIC. The breathing feature extraction generates two sets: $N_d$ and $S_d$. The $S_d$ is a set containing the breathing rate estimation on link d, while the $N_d$ is a set containing a number of empty sets meaning no reasonable breathing rate is estimated. The sets $N_d$ and $S_d$ with d=1, 2, . . . , D are combined into the set N and S, and the TR breathing monitoring system learns from the statistics of N and S to train a logistic regression binary classifier for breathing detection. If breathing is detected, the system performs affinity propagation clustering on S, which partitions the breathing rate estimation into different clusters. Then the system assigns likelihood to each cluster, indicating the possibility of that cluster in representing the breathing rate. The centroid of each cluster is interpreted as the estimated breathing rate of one person. Realizing that close breathing rate estimation may actually correspond to the same person, the system merges clusters if their centroid differences fall below a threshold and recalculates the breathing rate estimations as well as their likelihoods. Finally the system outputs the breathing rate estimation with the highest likelihoods, as well as the number of people detected by the system.

In general, a life-detecting apparatus is provided. This apparatus comprises at least one broadband radio transmitter (e.g. transceiver in TRM device A1 or B1) for transmitting radio signals over a first period of time; at least one broadband radio receiver (e.g. transceiver in TRM device B1 or A1) for receiving radio signals over a second period of time; and at least one processor for processing the radio signals received over the second period of time to estimate a time series of channel state information for a wideband channel between the at least one broadband radio transmitter and the at least one broadband radio receiver; determine resonating strength amongst the time series of channel state information; and analyze the determined resonating strengths to obtain presence of periodic fluctuations that indicate breathing (and/or other instantaneously periodic activities of a living being, a natural/artificial phenomenon, a robot, or a machine). The processor can determine the breathing rate of at least a person and the at least one person can be static, moving, performing exercises, etc. The processor can determine the breathing rates of at least one animal, and the at least one animal can be static, moving, etc. (If it is a robot, an example may be a robot performing repetitive movement in an assembly line. If it is a machine, an example may be a windmill move at a certain pace under a certain wind speed, or objects moving at a steady pace on a conveyor belt, etc. If it is a natural phenomenon, an example may be tree branches swaying at a steady pace under a certain wind condition. The periodic movement of these kinds of periodic activities of natural/artificial phenomenon, robots and machines would most likely have an observably different frequency from the human breathing.)

With information about the breathing rate estimation, the system can communicate presence or absence of a living being in a vicinity of the radio receiver.

Time Reversal Machine Platform

Figure 15:
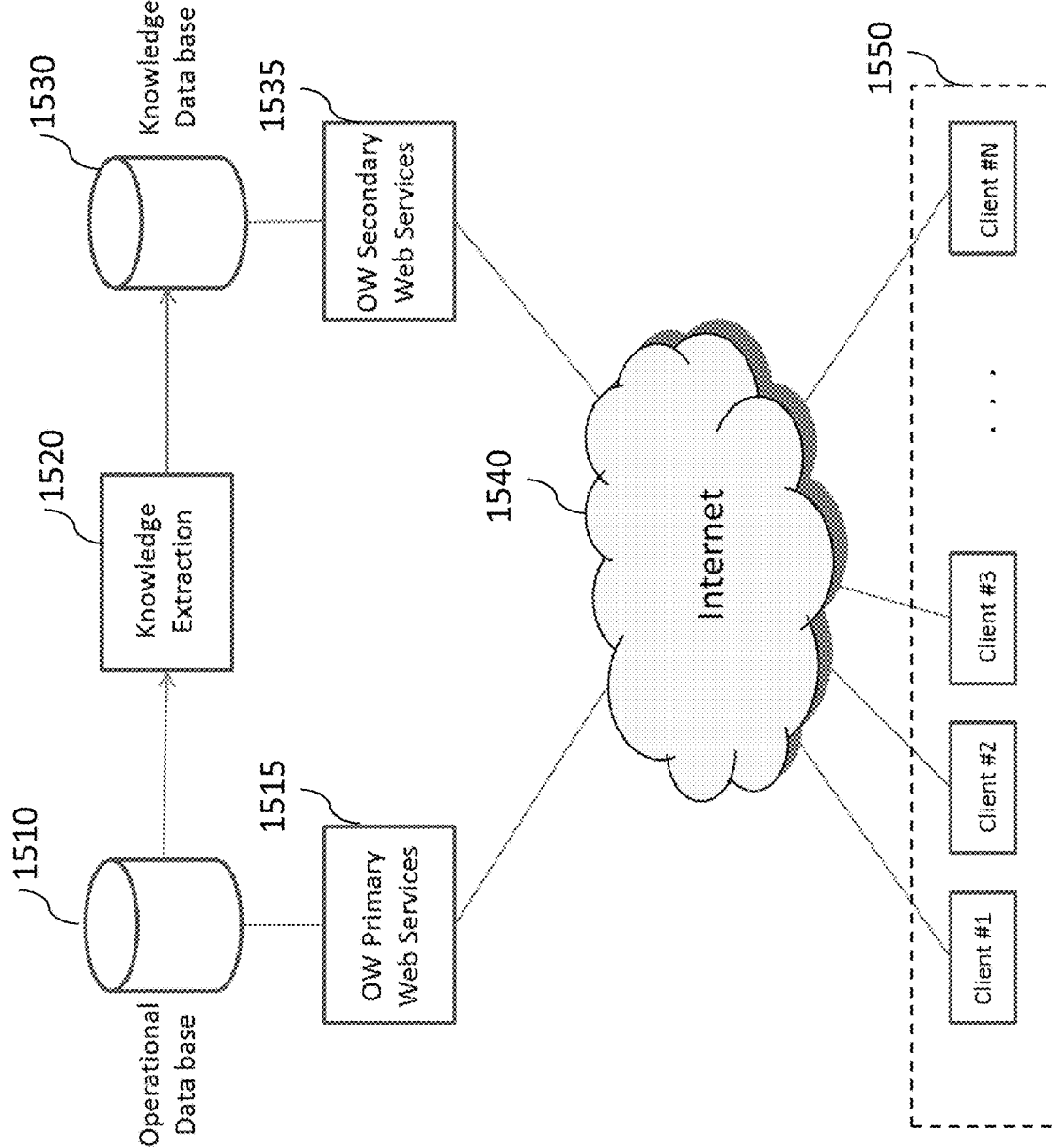
FIG. 15 illustrates system architecture of a cloud system for providing web-based services to customers.

FIG. 15 illustrates system architecture of a cloud system for providing web-based services to its customers and storing and leveraging the data obtained while serving customers of Origin Wireless (OW) and/or any other company or entity. The system will be referred to as OW cloud system, while it can be understood that it may be utilized to serve customers of any company or entity.

As shown in FIG. 15, the OW cloud system has two main components: the primary web services 1515 and the secondary web services 1535. The primary web services 1515 may include a portal which enables clients to access/use the company's traditional (e.g. non-data-related) services. Examples of the services may include location determination, security/monitoring, or health/monitoring. Clients 1550 or equipment installed on clients' premises can be connected to a service point of the primary web services 1515, and send relevant status information to the primary server of the primary web services 1515. This information may include, but not limited to, IP address, time stamp, RSSI, or CSI. The primary web server may use this information to provide a requested service to the client, e.g. determining the client's location in a shopping mall. In addition, the primary server can save the received information in a suitable format in the operational database 1510, making it available to a knowledge extraction processor 1520.

This processor 1520 can use data mining and machine learning techniques to extract useful information/intelligence from the recorded data in the operational database 1510. An example of such extracted intelligence could be that in a certain shopping mall, people tend to visit H&M first and then go to the GAP store. The extracted information is then stored in a knowledge database 1530. The secondary web services 1535 may provide this information to the company's other clients, included in the clients 1550. These clients are, typically, but not necessarily, a different set of customers, and can access the company's secondary services that provide access to the knowledge and the intelligence extracted from the stored operational data. The knowledge and intelligence can also be extracted in real time (on the fly) if required.

The stored operational data may serve as a basis for the knowledge extraction process. In one example, in a location determination service where a primary service is sending location-based ads or coupons to a user who walks near a store in a shopping mall, data in the operational database may include client location and the associated time stamp; and extracted intelligence may be based on that in a certain shopping mall, people tend to visit H&M first and then go to the GAP store afterwards.

In another example, in a security/surveillance service where a primary service includes sounding an alarm, informing the house owner, and/or calling the police if human activity is detected while the alarm system is armed, data in the operational database may include human activity (e.g. as measured by CSI variations) in a home when the owners are not at home; and extracted intelligence may be based on that in a certain neighborhood, most break-ins happen between 11:00 am and 2:00 pm.

In yet another example, in a medical/healthcare service where a primary service includes baby monitoring and alerting the parents when abnormal breathing patterns occur, data in the operational database may include a baby's breathing rate and a timestamp; and extracted intelligence may be based on that when babies get sick, most of them tend to have irregular breathing patterns 12 hours before other symptoms (e.g. high temperature) become observable.

Figure 16:
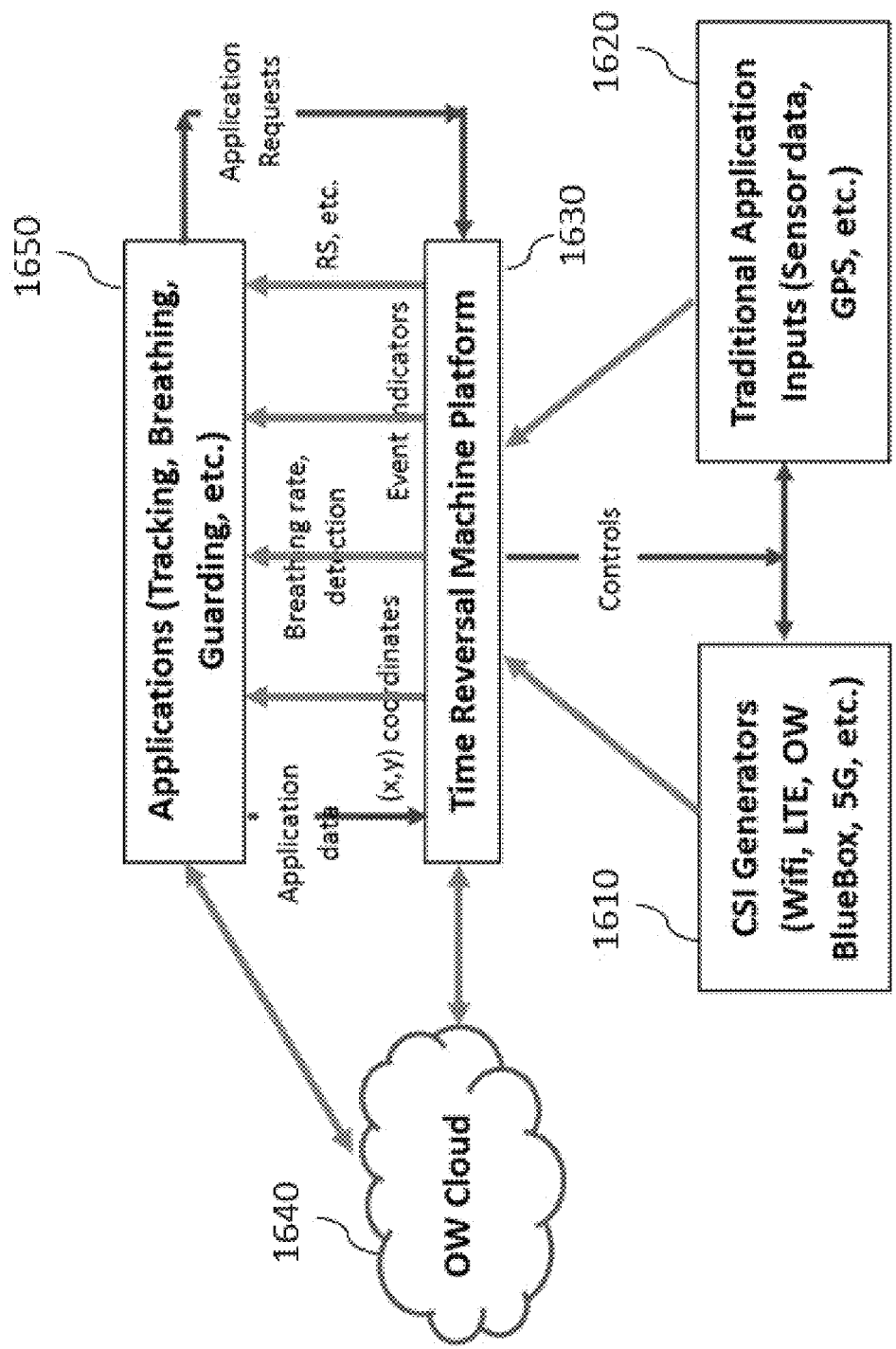
FIG. 16 shows an exemplary diagram showing TRM platform, according to an embodiment of the present teaching.

FIG. 16 shows an exemplary system including a TRM platform, according to an embodiment of the present teaching. As shown in FIG. 16, the system includes CSI generators 1610, traditional application inputs 1620, a TRM platform 1630, an OW cloud 1640, and applications 1650.

The CSI generators 1610 in this example may generate CSI in different environments, e.g. Wi-Fi, LTE, OW Blue- Box, 5G, WiMax, another environment, etc. The environment may be broadband (having wide effective bandwidth). The CSI generator may access a Wi-Fi chip, an LTE chip, a 5G chip and/or other chip to fetch the CSI.

As discussed above, the CSI may comprise a channel impulse response, a channel frequency response, another channel state data, and/or a physical layer channel information. The CSI may be a reference CSI captured when a probing signal is sent through a wireless multipath channel during a training phase; or may be a test CSI captured when another probing signal is sent through the wireless multipath channel during a testing phase. According to various applications, the testing phase may be a positioning phase for localization, or a phase for testing different TRP. In one example, the TRP may be an inner-product of two vectors corresponding to test CSI and the reference CSI. In another example, the TRP may be: a TRRS, a cross-correlation, an inner product of two vectors, a similarity score or a distance score of two particular CSI. In the example shown in FIG. 16, the CSI generators 1610 may send the generated CSI to the TRM platform 1630 for calculating the particular TRP, and other data used for various applications.

The traditional application inputs 1620 in this example may collect inputs for various applications, e.g. sensor data for a security application, GPS data for a positioning application, accelerometers, gyroscopes, cameras, microphones, temperature, health probes, etc. In one embodiment, the traditional application inputs 1620 may exchange data with the CSI generators 1610. The traditional application inputs 1620 may also send the collected inputs to the TRM platform 1630 for calculating TRP used for various applications.

The TRM platform 1630 in this example may obtain generated CSI (e.g. test CSI) from the CSI generators 1610 and collected inputs from the traditional application inputs 1620. The TRM platform 1630 may obtain some stored CSI (e.g. reference CSI) from a CSI storage in the cloud (e.g. OW cloud 1640). In one embodiment, the OW cloud 1640 has an architecture as shown in FIG. 15. The TRM platform 1630 can comprise a TRP generation module configured for generating one or more TRPs based on the generated CSI, the reference CSI, and/or the collected inputs. For example, the TRM platform 1630 may calculate a TRRS based on two particular CSI sent by the CSI generators 1610. The TRM platform 1630 may also compute a TRRS based on a CSI from the CSI generator 1610 and a stored CSI from the CSI storage. In another example, the TRM platform 1630 may obtain GPS data from the traditional application inputs 1620 and use the GPS data to verify localization of a user in a TRRS localization application, or to obtain location of a user in a security application based on some TRP.

In one embodiment, the TRM platform 1630 can also obtain application data from the applications 1650. The application data, including user information, can be sent from the Applications to the TRM platform 1630, which returns positioning information, breathing rate information, event indicators, etc. to the applications 1650.

There may be a two-way data transfer between the Origin Wireless Cloud (OW cloud) 1640 and the TRM platform 1630. There may be some means in the TRM platform 1630 to penetrate a firewall (of the OS such as Android/iOS, or of the web browser) to have access to internet, and thus to reach OW cloud.

In one embodiment, the TRM platform 1630 may be embedded in a user device that can communicate with the OW cloud 1640, such that a server (not shown) can collect all data involved in the various applications from all users, via the OW cloud 1640. The server may use the collected data in various ways, e.g. process the data and determine a method for better implementation of an application based on the data, find an optimal, efficient, and/or effective function for calculating particular TRP in future applications, provide the data to a third party for further processing, etc. In this example, the TRM platform 1630 in a local user device may be able to calculate basic functions based on generated CSI, and can send a request for advanced functions of generated CSI to the server via the OW cloud 1640, such that the data can be collected by the server via premium services provided by the server. The data may be collected during different phases of an application, e.g. a training phase and/or a positioning phase of a localization application.

In one embodiment, the TRM platform 1630 may be a common platform that is coupled with the OW cloud 1640 and is shared by all users, such that each user can communicate with the TRM platform 1630 for calculating TRPs for various applications. In this example, the TRM platform 1630 may automatically store the data related to the calculation either at the TRM platform 1630 or into the OW cloud 1640.

The applications 1650 in this example may comprise a time reversal application module and can also communicate with the OW cloud 1640 to obtain big data collected during previous TRP calculations and/or application executions. The applications 1650 may obtain the calculation results from the TRM platform 1630 and generate a non-transitory machine readable medium that comprises an API (application programming interface) and/or SDK (software development kit) for executing a particular application, e.g. tracking, breathing, guarding, etc. In one embodiment, the medium can be provided or sold to a third party for further implementation. For example, the applications 1650 can provide a general API for wireless tracking to a third party that wants to produce a tracking system based on the general API. The tracking system may be generated based on specific parameters and/or additional functions added to the general API. For example, the additional functions may include generating and sending warning signals based on tracking results, when the tracking system is used for tracking an animal or a kid in a predetermined range; displaying different information according to a user's location to a virtual reality or augmented reality device worn by the user, when the tracking system is used for tracking a user who is playing in a big resort like Disneyland or Sea World, etc.

In another example about a breathing application, the applications 1650 may provide a general SDK to a third party that wants to produce a breathing detection device based on the general SDK. The breathing detection device may execute functions of the general SDK and/or additional functions based on specific implementations of the breathing detection device. For example, in a specific implementation, the basic functions of the general SDK may include testing a breathing rate of a user using the device, while the additional functions may include generating an alert to the user and/or sending an urgent help signal to a potential helper, like a hospital, a medical professional person, a volunteer nearby, a relative of the user, or one or more persons selected from a predetermined list.

In yet another example about a security application, the applications 1650 may provide a general SDK (or API) to a third party that wants to produce a home security device based on the general SDK. The home security device may execute functions of the general SDK and/or additional functions based on specific implementations of the home security device. For example, in a specific implementation, the basic functions of the general SDK may include detecting an event, e.g. door open, that can indicate a potential security issue; while the additional functions may include triggering an alarm and/or sending a message to a potential helper, like a police station, a volunteer nearby, a relative of the user, or one or more persons selected from a predetermined list.

The applications 1650 in FIG. 16 may send application requests to the TRM platform 1630 for calculating different TRP according to different application requests. The applications 1650 may obtain the calculation results from the TRM platform 1630 and generate corresponding application data. The application data may be sent back to the TRM platform 1630 for further calculation and/or used for generating the general SDK/API. The data generated or collected by the applications 1650 may also be stored at the OW cloud 1640. As discussed above, a server connected to the OW cloud 1640 may use these data to do some optimization, training, inference, and/or recommendation. For example, the server may determine a time period in a day when most security issues can happen based on security application data from different users; determine a type of animals or an age range of kids that may trigger most warning signals based on location tracking; determine a type of patients who may have most frequent breathing issues based on detected breathing rates, etc. The server may then generate a trained function to implement these determined features into corresponding applications to further take into consideration of particular users or customized implementations. The server may also generate inference and/or recommendation to the applications 1650 and/or to the third party based on the above features determined based on big data collected from the users.

In one embodiment, the system disclosed in the FIG. 16 may all be implemented at a server side. In another embodiment, one or more components in the system may be implemented in a user device. For example, the CSI generators 1610, the traditional application inputs 1620, and/or the TRM platform 1630 may be embedded in a user device produced by a third party based on a general SDK/API. In another example, the applications 1650 in FIG. 16 may represent a specialized SDK/API generated by the third party and embedded in the user device. In these situations, the user device can calculate some TRPs and execute corresponding applications locally at the user side, and can upload data generated during the calculation and execution to the server via the OW cloud 1640.

Figure 22:
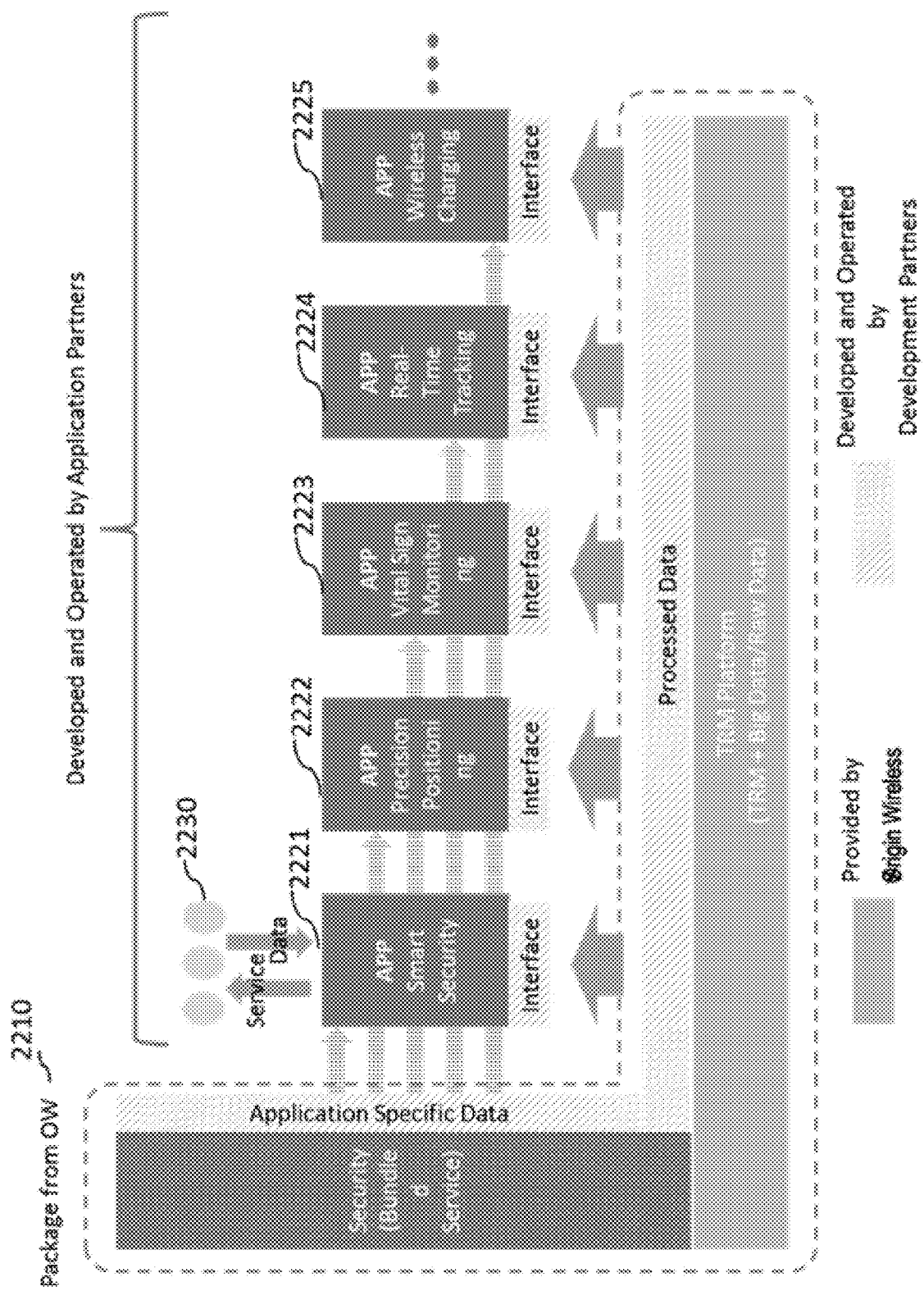
FIG. 22 illustrates an exemplary structure of a system provided based on TRM, according to an embodiment of the present teaching.

FIG. 22 illustrates an exemplary structure of a system provided based on TRM, according to an embodiment of the present teaching. As shown in FIG. 22, the structure includes service and TRM platform provided in a package 2210, APPs 2221, 2222, 2223, 2224, 2225 provided by application partners, and users 2230. The package 2210 may be provided according to a system disclosed in the present teaching. For example, the system can collect big data and raw data for various calculations of TRP based on the TRM platform, and provide a general SDK/API in a single or bundled service. The package may also include application specific data that are related to a specific service or application, e.g. user identification information for a security application, user average moving speed for a real-time tracking application, etc. The package may also include processed data based on the TRM calculation. The package may be provided to one or more application partners for development and operation.

In one embodiment, the system can provide the package 2210 to a third party for generating one or more of the APPs: smart security APP 2221, precision positioning APP 2222, vital sign monitoring APP 2223, real-time tracking APP 2224, and wireless charging APP 2225, via one or more interfaces. As discussed above, each of these APPs may be generated based on a general SDK or API. For example, the smart security APP 2221 may be generated based on a security SDK provided by the system by adding a smart analysis and alerting system; the precision positioning APP 2222 may be generated based on a positioning SDK provided by the system by adding a function for improving positioning precision, the vital sign monitoring APP 2223 may be generated based on a monitoring SDK provided by the system by adding a function of analyzing vital signals stored in a database, the real-time tracking APP 2224 may be generated based on a tracking SDK provided by the system by adding a local CPU and storage with specific algorithm to track locations in a real-time scenario, and the wireless charging APP 2225 may be generated based on a power transmission SDK provided by the system by adding a battery charging function that can operate in a wireless environment.

Each of these APPs can be provided to users 2230 as a web service or an app service. The users 2230 can use the service based on the APP and provide the service data back to the APP provider, who in turn can send the collected service data to the system or the server. In one embodiment, the system or the server may be implemented in a company, e.g. Origin Wireless as shown in FIG. 22.

Figure 23:
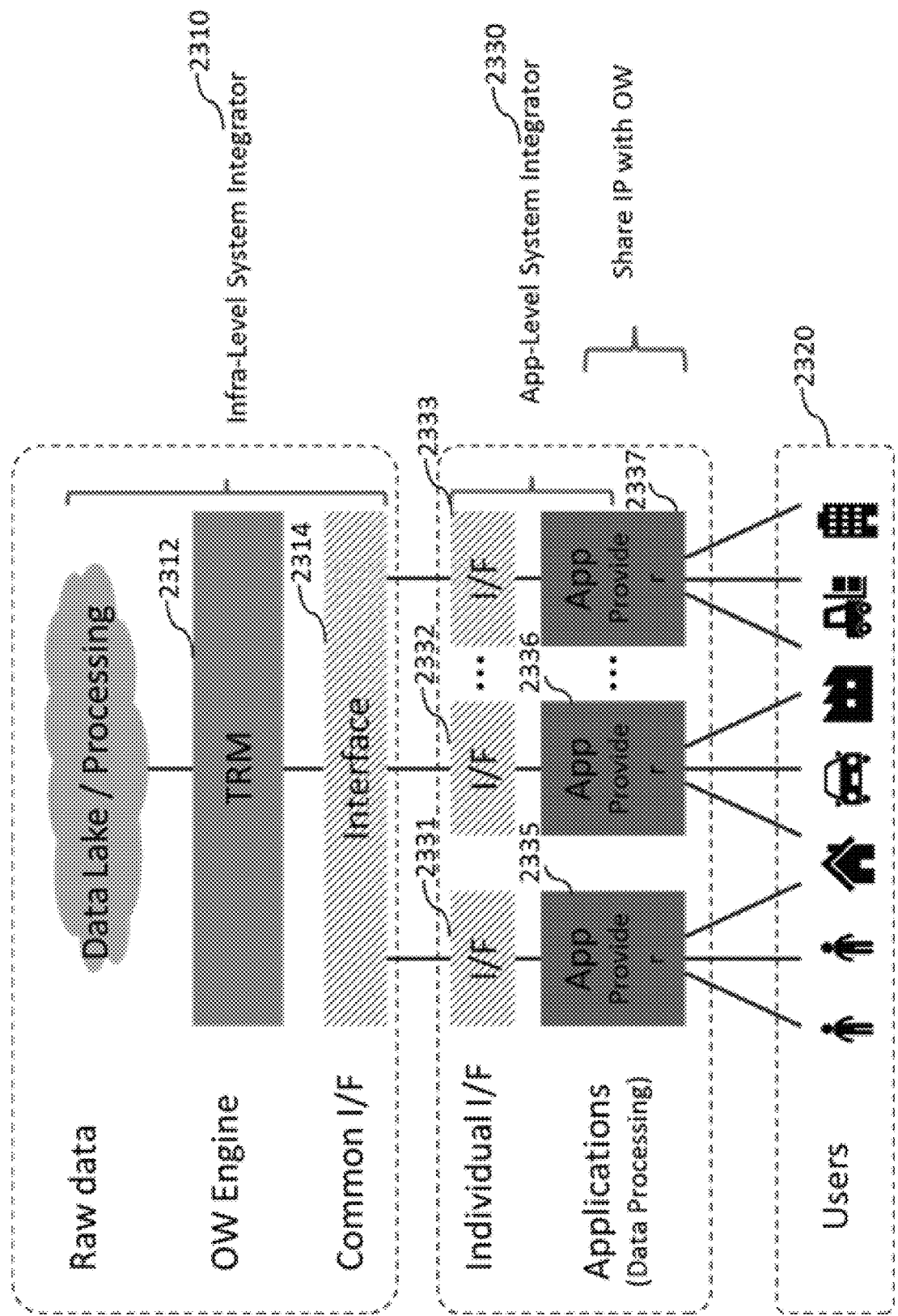
FIG. 23 illustrates an exemplary data network of a system provided based on TRM, according to an embodiment of the present teaching.

FIG. 23 illustrates an exemplary data network of a system provided based on TRM, according to an embodiment of the present teaching. As shown in FIG. 23, the data network includes an infra-level system integrator 2310, one or more users 2320, and an app-level system integrator 2330.

The infra-level system integrator 2310 in this example includes a TRM engine 2312 and a common interface 2314. In one embodiment, the TRM engine 2312 may comprise a TRP generation module that can generate a particular TRP, e.g. TRRS, a CSI storage module that can store CSI in a particular format, and/or a time reversal application module that can generate a general SDK or API for further development and operation by a third party. In one example, the TRM engine 2312 may generate and send SDK/APIs for different applications to the common interface 2314, which can forward each SDK/API to a corresponding individual interface, e.g. one of the individual interfaces 2331, 2332, 2333, according to different applications. The TRM engine 2312 may comprise a system disclosed in the present teaching, based on time reversal techniques. The TRM engine 2312 may obtain data processed based on some raw data in a data lake. For example, the raw data may come from the users 2320, when they are using the applications.

The app-level system integrator 2330 in this example may include some individual interfaces 2331, 2332, 2333, and different application providers 2335, 2336, 2337. Each of the application providers 2335, 2336, 2337 may correspond to a specific application or service, e.g. smart tracking, precision positioning, etc. The application provider may obtain a general SDK/API through a corresponding individual interface, generate the specific application based on the general SDK/API, and provide the specific application to the users 2320. In one embodiment, one or more of the application providers may share IP with the OW who provides the TRM engine 2312.

As discussed above, while the users 2320 use the applications provided by the application providers, data may be generated and collected by the application providers, who can in turn send the collected data to a server, e.g. the TRM engine 2312 that is connected to all of the application providers. In one embodiment, the data generated during the use of the applications may be directly collected by the TRM engine 2312, e.g. by a setup on each user device that can send the data to the TRM engine 2312 periodically or upon request.

Figure 24:
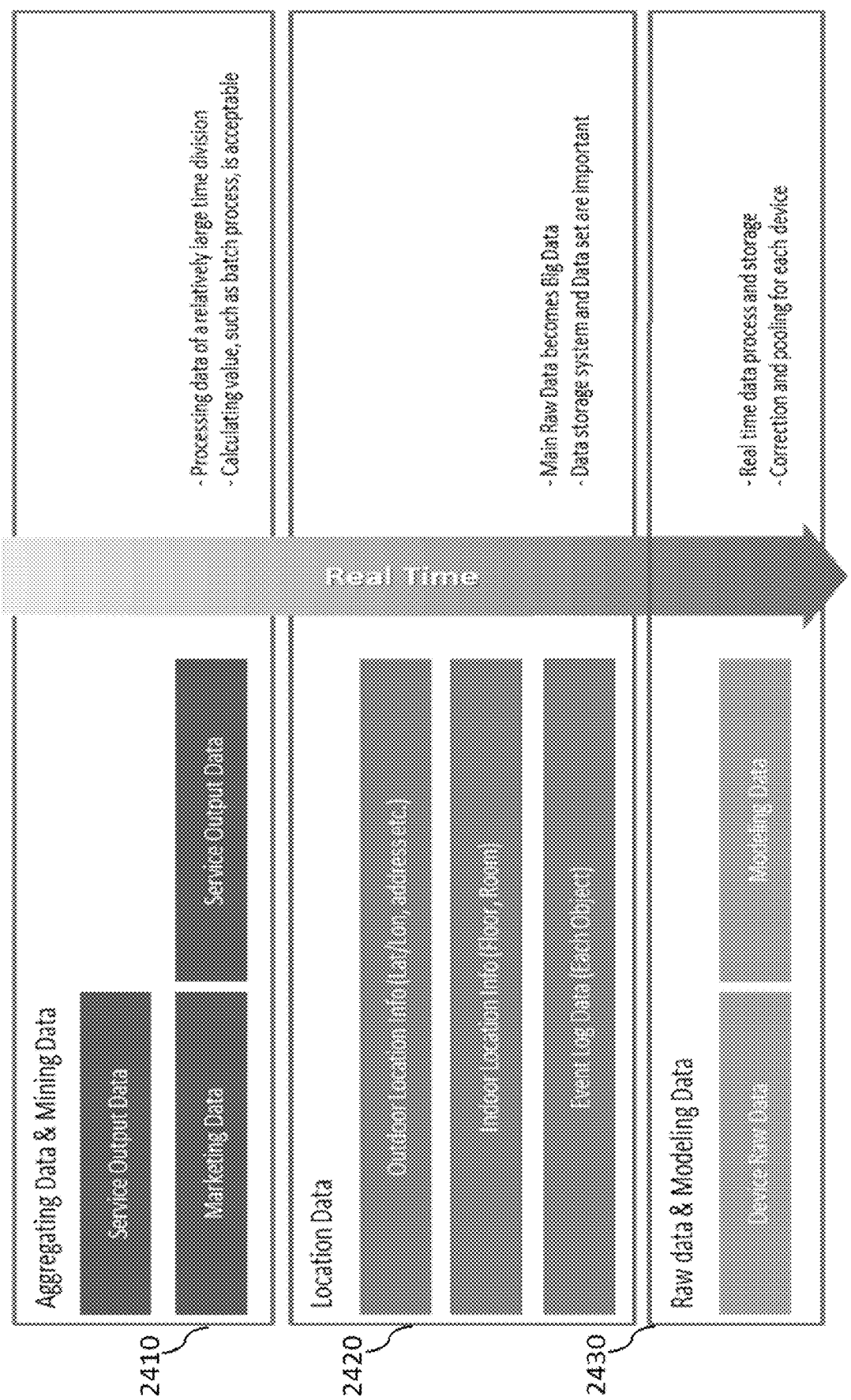
FIG. 24 illustrates an exemplary structure of data sets provided based on TRM, according to an embodiment of the present teaching.

FIG. 24 illustrates an exemplary structure of data sets provided based on TRM, according to an embodiment of the present teaching. As shown in FIG. 24, data generated and collected during application executions may include aggregating data and mining data 2410, location data 2420, and raw data and modeling data 2430. The aggregating data and mining data 2410 may further include service output data and marketing data for processing data of a relatively large time division and calculating values in a batch process. The location data 2420 may further include outdoor location information, indoor location information, and event log data for big data processing and data storage system. The raw data and modeling data 2430 may further include device raw data and modeling data for real time data processing and storage, and correction and pooling for each device.

Localization and Tracking Systems in Indoor Environments

The Global Positioning System (GPS) is a space-based navigation system that can provide location and time information when there is an unobstructed line of sight (LOS) to four or more GPS satellites. Such a system provides critical capabilities to military, civil and commercial applications around the world. On the other hand, given that people nowadays spend more than 80% of their time in indoor environments, accurate indoor localization is highly desirable and has great potential impact in many scenarios. Unfortunately, the use of GPS satellites to enable indoor localization is a non-starter due to a variety of reasons including poor signal strength, multipath effect and limited on-device computation and communication power. Therefore, over the past two decades, the research community has been urgently seeking new technologies that can enable high accuracy indoor localization. However, the results are still mostly unsatisfied. Microsoft hosted Indoor Localization Competitions in recent years and concluded that "The Indoor Location Problem is NOT Solved."

Many indoor positioning systems (IPSs) have been developed by leveraging radio wave, magnetic field, acoustic signal, or other sensory information collected by mobile devices. Most of these systems are based on the ranging technique. Ranging is a process to determine the distance from one location to another location by utilizing the collected information such as the received signal strength indicator (RSSI) and/or time of arrival (TOA). Typically, these systems require multiple anchors at known locations and dedicated devices to collect fine-grained information for accurate ranging.

However, when there are obstacles between the localized device and the anchors, the localization performance degrades significantly. In other words, the performance of ranging-based systems cannot maintain under non-line-of-sight (NLOS) scenarios, which is very common for indoor environments. Such degradation is fundamentally due to a reason that the physical ranging rules that translate the collected information into the distances are impaired by the blockage and multipath components naturally existing indoor. Developing a general physical ranging rule that suits NLOS conditions is practically difficult, if not impossible, due to the complicated indoor environment, which motivates the development of the fingerprint-based IPSs. A summary of the existing state-of-the-art capabilities from the Microsoft hosted Indoor Localization Competitions is given in FIG. 25, in which one can see that under the LOS condition, with more than one anchors, sub-meter accuracy can be achieved. However, under the NLOS condition, only the meter-range can be obtained by most methods, except the recently proposed time-reversal approach that can obtain 1-2 cm accuracy for both LOS and NLOS conditions by Origin Wireless.

In an indoor environment, there naturally exists some location-specific information, known as the fingerprints. Examples include the magnetic field, RSSI, and the channel state information (CSI). All these fingerprints can be exploited for indoor localization. Specifically, in the fingerprint-based IPS, the location-specific fingerprints may be collected and stored in a database in the mapping phase. Then, in the localization phase, the location of the device can be determined by comparing the device fingerprint with those in the database. The physical phenomenon of time-reversal focusing effect can provide a high-resolution fingerprint for indoor localization. One can use a dedicated device to obtain the channel impulse response under the 5 GHz ISM band with a bandwidth of 125 MHz as the fingerprint and utilize the time-reversal resonating strength (TRRS) as the similarity measure, which can give an accuracy of 1-2 cm.

The question now is: can one use the ubiquitous Wi-Fi devices to achieve the same? The answer is yes when one utilizes frequency hopping and/or multi-antenna spatial diversity to increase the effective bandwidth. As a result, the localization resolution can be significantly improved to 1-2 cm.

The present teaching discloses basic principles of how one can achieve indoor localization resolution down to centimeter accuracy level using standard Wi-Fi devices. A unified view by combining both the frequency and spatial diversities is also disclosed in the present teaching.

How Bandwidth Affects the Localization Performance

The main reason that most of the fingerprint-based methods utilizing CSI in Wi-Fi systems cannot achieve centimeter localization accuracy is due to the bandwidth limitation. More specifically, the maximum bandwidth in mainstream Wi-Fi devices is only 20 or 40 MHz, which introduces severe ambiguity into the fingerprints of different locations and thus leads to the poor accuracy for indoor localization.

To clearly illustrate the impact of bandwidth on localization performance, the present teaching discloses exemplary experiments conducted to collect CSIs under different bandwidths in a typical indoor environment. In one example, two channel sounders are placed in an NLOS setting, where one of them is placed on a customized experiment structure with 5 mm resolution.

To characterize the similarity between CSIs collected at the same or different locations, the TRRS can be calculated as $$\mathcal{TR}(h_0, h_1) = \frac{\eta^2}{\Lambda_0 \Lambda_1} \quad \text{Equ. (1)}$$

with $$\eta = \max_\phi \left| \sum H_0^*[k] H_1[k] e^{-jk\phi} \right|^2,$$

$$\Lambda_0 = \sum |H_0[k]|^2,$$

$$\Lambda_1 = \sum |H_1[k]|^2$$

where $h_0$ and $h_1$ are the two fingerprints, K is the total number of usable subcarriers, $H_0[k]$ and $H_1[k]$ are the CSIs on subcarrier k, η is the modified cross-correlation between $h_0$ and $h_1$ with synchronization error compensated, and $\Lambda_0$, $\Lambda_1$ are the channel energies of $h_0$ and $h_1$, respectively. Realizing that the Wi-Fi receiver may not be fully synchronous with the Wi-Fi transmitter due to mismatches in their radio-frequency front-end components, an additional phase rotation of $e^{-jk\phi}$ is employed to counteract the phase distortions incurred by the synchronization errors in the calculation of η, where ϕ can be estimated and compensated using Algorithm 1 to be shown later. Equ. (1) above implies that TRRS ranges from 0 to 1. More specifically, a larger TRRS can indicate a higher similarity between two fingerprints and thus a higher similarity between the two associated locations.

Figure 26:
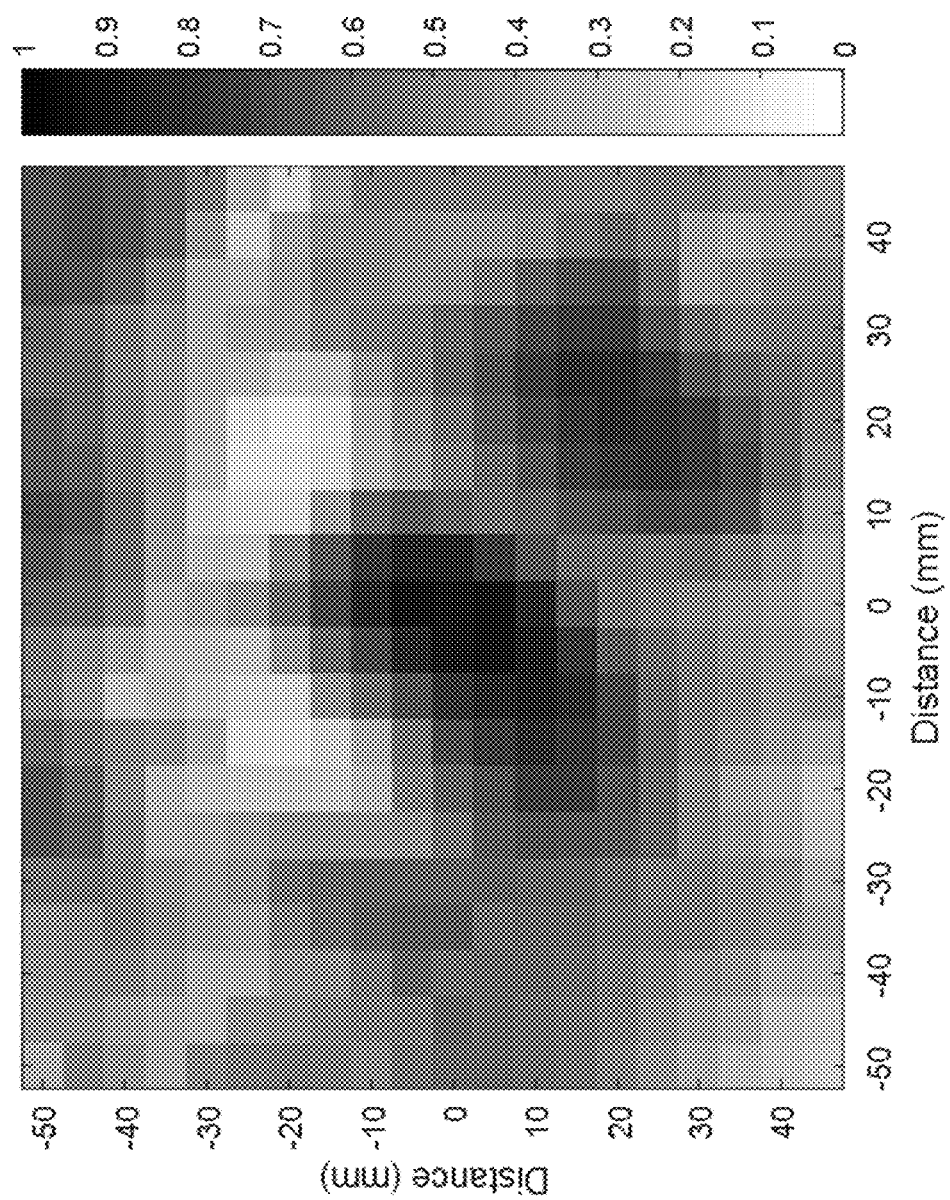
FIG. 26 illustrates corresponding time-reversal resonating strength (TRRS) between the target location and nearby locations under 40 MHz bandwidth, according to an embodiment of the present teaching.
Figure 27:
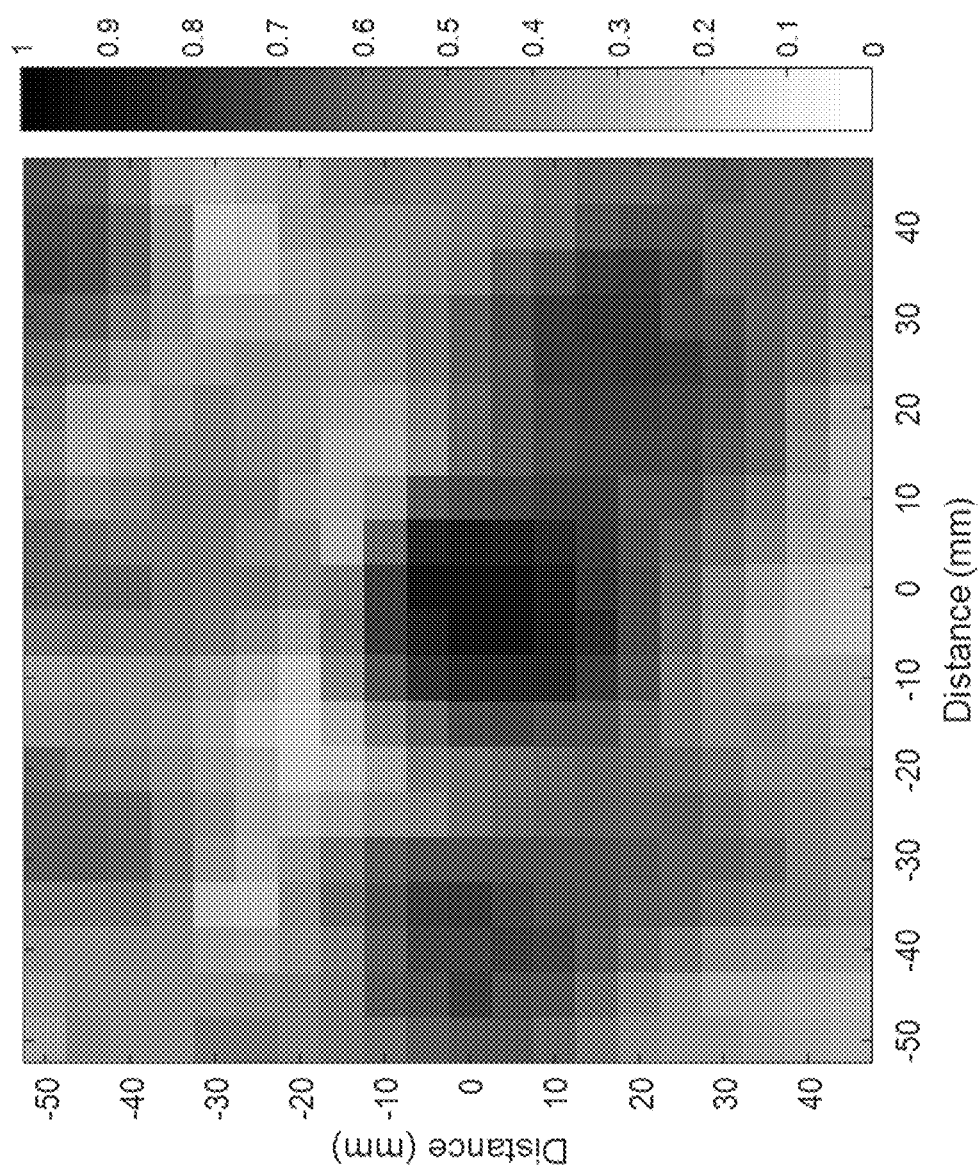
FIG. 27 illustrates corresponding TRRS between the target location and nearby locations under 120 MHz bandwidth, according to an embodiment of the present teaching.
Figure 28:
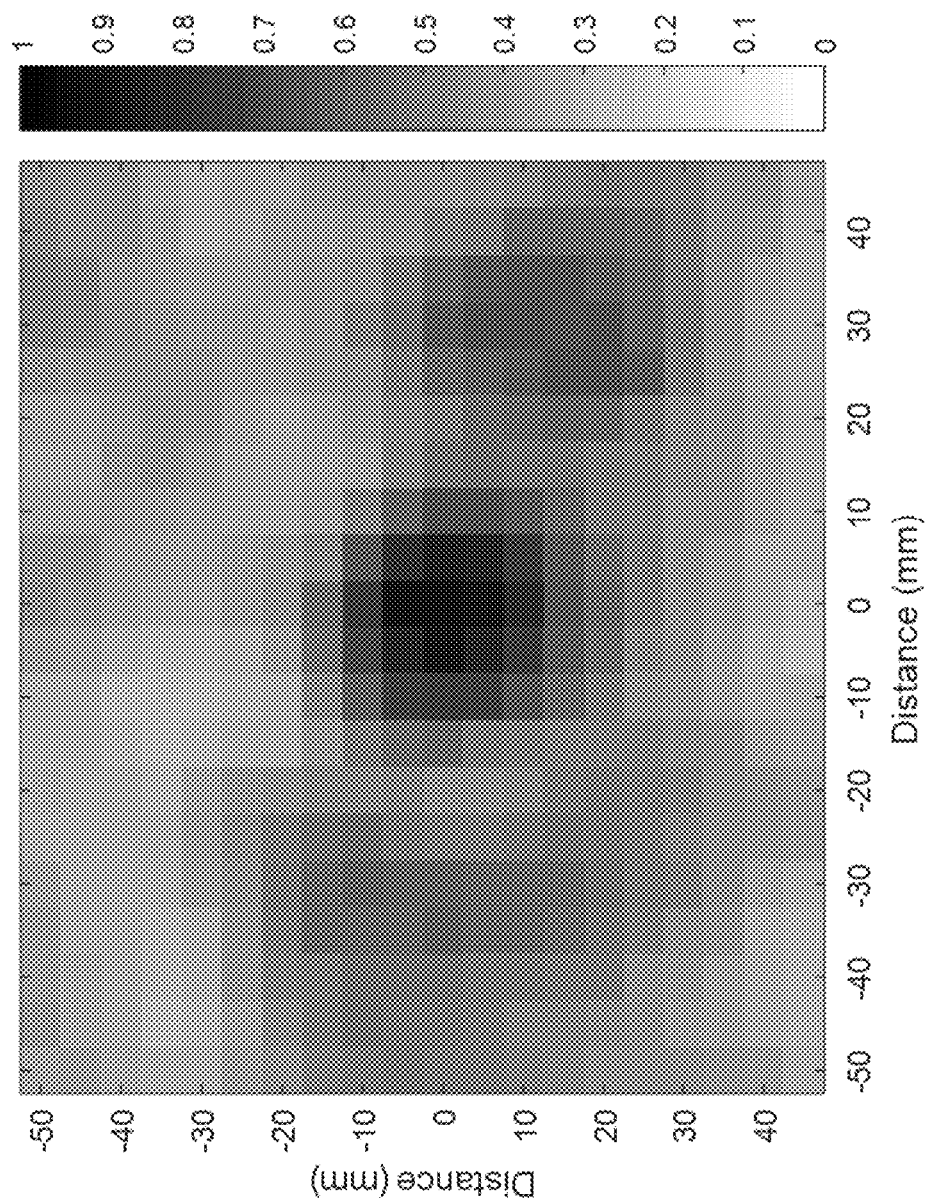
FIG. 28 illustrates corresponding TRRS between the target location and nearby locations under 360 MHz bandwidth, according to an embodiment of the present teaching.

The corresponding TRRS between the target location and nearby locations are illustrated in FIGS. 26-28 under different bandwidth settings. It is shown in FIG. 26 that with 40 MHz bandwidth, a large region of nearby locations is ambiguous with the target location in terms of the TRRS. Enlarging the bandwidth shrinks the area of ambiguous regions. As demonstrated in FIG. 28, when the bandwidth increases to 360 MHz, the ambiguous region is reduced to a ball of 1 cm radius which implies centimeter accuracy in localization.

As motivated by the experiment results, the present teaching discloses methods and systems for achieving a large effective bandwidth by exploiting diversities on Wi-Fi devices to facilitate centimeter accuracy indoor localization.
Increasing Effective Bandwidth Via Diversity Exploitation The present teaching aims at achieving an increasing effective bandwidth via the exploitation of diversities, including the frequency and space diversity. The frequency diversity can be achieved based on usage of different Wi-Fi channels. Additionally, frequency diversity can also include the diversity introduced by the subcarriers in an OFDM system. The large amount of subcarriers (114 subcarriers in case of 40 MHz bandwidth using 802.11n) may lead to a very stable performance.

The present teaching discloses a method for calculating the TRRS when combining different diversities, by compensating the hardware imperfection that is inevitable in wireless communication systems. In general, TRRS can be considered as a metric that quantifies the differences between two CSIs. The two CSIs can be originated from two different physical locations, but could also be originated from two virtual (logic) locations/states. In the former case, the TRRS with diversities can help the localization and tracking. In the latter case, the TRRS with diversities can help the breathing monitoring, human recognition, and the guard/security system.

The present teaching discloses a localization/tracking system that is able to localize/track in an environment with LOS or without LOS. In one embodiment, the disclosed system is an indoor positioning system. Because existing indoor positioning systems actually utilize the unobstructed LOS path to estimate the time-of-flight and angle-of-arrival between the wireless transmitter and receiver, they perform poorly when strong NLOS paths exist. In contrast, the disclosed system in the present teaching can work in both LOS and NLOS scenarios. To achieve the same performance under both the LOS and NLOS, different system parameters can be used with certain thresholds. In addition, the disclosed system can utilize techniques such as LOS path removal to further enhance its localization performance in a strong LOS scenario.

Two different diversities exist in current Wi-Fi system, i.e., frequency diversity and spatial diversity. According to IEEE 802.11n, 35 Wi-Fi channels are dedicated to Wi-Fi transmission in 2.4 GHz and 5 GHz frequency bands with a maximum bandwidth of 40 MHz. The multitude of Wi-Fi channels leads to frequency diversity in that, they provide opportunities for Wi-Fi devices to perform frequency hopping when experiencing deep fading or severe interference. On the other hand, spatial diversity can be exploited on multiple-input-multiple-out (MIMO) Wi-Fi devices, which is a mature technique that greatly boosts the spectral efficiency. MIMO has not only become an essential component of IEEE 802.11n/ac but also been ubiquitously deployed on numerous commercial Wi-Fi devices. For Wi-Fi systems, both types of diversity can be harvested to provide fingerprint with much finer granularity and thus lead to less ambiguity in comparison with the fingerprint measured with a bandwidth of only 40 MHz.

Figure 29:
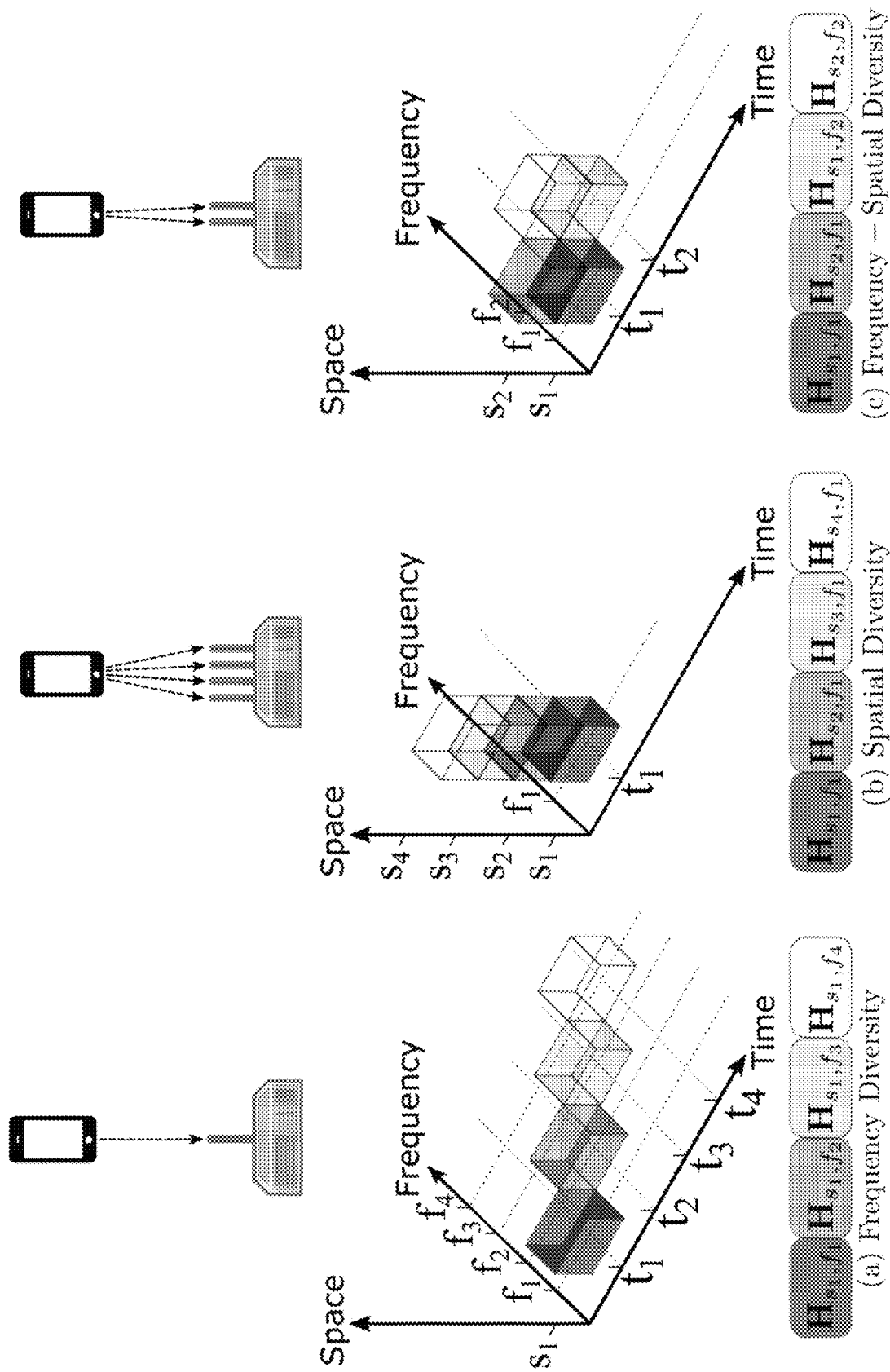
FIG. 29 shows an exemplary graph showing combining channel state information (CSI) in frequency domain, in spatial domain, and in frequency-spatial domain to get a larger effective bandwidth, according to an embodiment of the present teaching.

FIG. 29 shows the general principle of creating a large effective bandwidth by exploiting the frequency and spatial diversities either independently or jointly. Since Wi-Fi devices can work on multiple Wi-Fi channels, one can exploit the frequency diversity by performing frequency hopping to obtain CSIs on different Wi-Fi channels. As demonstrated in FIG. 29(a), CSIs on four different Wi-Fi channels are concatenated together to formulate a fingerprint of a large effective bandwidth (a fingerprint comparable with one associated with a large bandwidth). Despite the fact that the frequency diversity can be exploited on a single-antenna Wi-Fi device, it is time-consuming to perform frequency hopping. For time efficiency, spatial diversity can be exploited on multi-antenna Wi-Fi devices. For a Wi-Fi receiver with four antennas, e.g., in FIG. 29(b), CSIs on the four receiving antennas can be combined together to formulate the fingerprint with a large effective bandwidth. FIG. 29(c) shows an example of utilizing both the frequency and spatial diversities, where CSIs on two Wi-Fi channels and from two receiving antennas are combined into the fingerprint.

For a Wi-Fi system, the spatial diversity is determined by the number of antenna links, while the frequency diversity is dependent on the number of available Wi-Fi channels. Denote the maximum spatial diversity by S, the maximum frequency diversity by F, and the bandwidth for each Wi-Fi channel by W, the effective bandwidth is calculated as S×F×W.
Achieving Centimeter Accuracy Via Time-Reversal Resonating Strength As discussed before, a fine-grained fingerprint associated with a large effective band-width can be generated through diversity exploitation on Wi-Fi devices. In this section, we first introduce the calculation of TRRS when both of the frequency and spatial diversities are available. Then, we present the algorithm for indoor localization.
Calculating Time-Reversal Resonating Strength by Diversity Exploitation As discussed before, in order to achieve centimeter localization accuracy, a large effective bandwidth beyond 40 MHz is required, which can be obtained by diversity exploitation. For Wi-Fi devices with a spatial diversity of S and a frequency diversity of F, the CSI measurements can be written as $h=\{h_{s,f}\}_{s=1, 2, \ldots, S}^{f=1, 2, \ldots, F}$ can provide fine-grained fingerprint with an effective bandwidth of S×F×W.

Consequently, TRRS in Equ. (1) can be extended to the fine-grained fingerprint $\overline{h_0}$ and $\overline{h_1}$, with η and $\Lambda_0$, $\Lambda_1$ modified as $$\eta = \Sigma_s \Sigma_f \eta_{s,f}, \Lambda_0 = \Sigma_s \Sigma_f \Lambda_{0,s,f}, \Lambda_1 = \Sigma_s \Sigma_f \Lambda_{1,s,f} \qquad \text{Equ. (2)}$$

where $$n_{s,f} = \max_\phi |\Sigma H_{0,s,f}^*[k] H_{1,s,f}[k] e^{-jk\phi}|^2$$

represents the modified cross-correlation on the virtual link (s, f), and $\Lambda_{0,s,f} = \Sigma_{k=1}^K |H_{0,s,f}[k]|^2$, $\Lambda_{1,s,f} = \Sigma_{k=1}^K |H_{1,s,f}[k]|^2$ are the channel energies of $h_{0,s,f}$ and $h_{1,s,f}$ on the virtual link (s, f), respectively.

Algorithm 1 shown below elaborates on the calculation of $\mathcal{TR}(\overline{h}_0, \overline{h}_1)$. As shown in Algorithm 1, steps 4-9 are used to calculate the channel energies on the virtual link (s, f), while steps 10-14 are targeted to compute the modified cross-correlation of two fingerprints on the virtual link (s, f). The channel energies and modified cross-correlation on each virtual link are accumulated as shown in step 9 and step 15, respectively. Finally, the TRRS is obtained by step 18. The computation of $\eta_{s,f}$ is approximated by $$\overline{\eta}_{s,f} = \max_n \left| H_{0,s,f}^*[k] H_{1,s,f}[k] e^{-j\frac{2\pi n(k-1)}{N}} \right|$$

that takes the same format of a discrete Fourier transform of size N and thus can be computed efficiently by fast Fourier transform. Using a large N in the computations leads to a more accurate approximation of $\eta_{s,f}$.

---

Algorithm 1 Calculating TRRS by exploiting diversities

Input: $\overline{h}_0 = \{h_{0,s,f}\}_{s=1,2,\ldots,S}^{f=1,2,\ldots,F}$, $\overline{h}_1 = \{h_{1,s,f}\}_{s=1,2,\ldots,S}^{f=1,2,\ldots,F}$
Output: $\mathcal{TR}[\overline{h}_0, \overline{h}_1]$
1: $\Lambda_0 = 0$, $\Lambda_1 = 0$, $\eta = 0$
2: for s = 1, 2, ..., S do
3:    for f = 1, 2, ..., F do 4:    $\Lambda_{0,s,f} = 0$, $\Lambda_{1,s,f} = 0$
5:    for k = 1, 2, ..., K do
6:        $\Lambda_{0,s,f} \leftarrow \Lambda_{0,s,f} + |H_{0,s,f}[k]|^2$ } Calculating channel energies on virtual link(s, f)
7:        $\Lambda_{1,s,f} \leftarrow \Lambda_{1,s,f} + |H_{1,s,f}[k]|^2$
8:    end for 9:    $\Lambda_0 \leftarrow \Lambda + \Lambda_{0,s,f}$, $\Lambda_1 \leftarrow \Lambda + \Lambda_{1,s,f}$ 10:   for n = 1, 2, ..., N do
11:       $z[n] \leftarrow \sum_{k=1}^{N} H_{0,s,f}^*[k] H_{1,s,f}[k] e^{-j\frac{2\pi n(k-1)}{N}}$ } Calculating modified cross-correlation on virtual link(s, f)
12:   end for
13:   $n^* = \operatorname*{argmax}_{n=1,2,\ldots,N} |z[n]|$
14:   $\overline{\eta}_{s,f} = z[n^*]$ 15:   $\eta \leftarrow \eta + \overline{\eta}_{s,f}$
16:   end for
17: end for 18:  $\mathcal{TR}[\overline{h}_0, \overline{h}_1] \leftarrow \dfrac{\eta^2}{\Lambda_0 \Lambda_1}$

---

Localization Using Time-Reversal Resonating Strength

There are two phases in the proposed IPS: a mapping phase and a localization phase. During the mapping phase, the CSIs are collected from L locations-of-interest using Wi-Fi devices with S antenna links and across F Wi-Fi channels, denoted by $\{\overline{h}\}_{l=1,2,\ldots,L}$. In the localization phase, $\overline{h}'$ is obtained at a testing location, which may either be one of the L locations-of-interest or an unmapped location in the mapping phase. Then, the pairwise TRRS $\mathcal{TR}(\overline{h}, \overline{h}')$ is calculated for all location-of-interest. Finally, the location is determined based on $\mathcal{TR}(\overline{h}, \overline{h}')$, i.e., $$\hat{l} = \begin{cases} \max_{l=1,2,\ldots,L} \mathcal{TR}(\overline{h}, \overline{h}'), & \max_{l=1,2,\ldots,L} \mathcal{TR}(\overline{h}, \overline{h}') \geq \Gamma \\ 0, & \text{otherwise} \end{cases} \qquad \text{Equ. (3)}$$

where $\Gamma$ is a threshold introduced to balance off the true positive rate and false positive rate in location determination. When $\mathcal{TR}(\overline{h}, \overline{h}')$ falls below $\Gamma$, the IPS cannot obtain a credible location estimation and returns 0 to imply an unmapped location.

EXPERIMENT RESULTS

Figure 31:
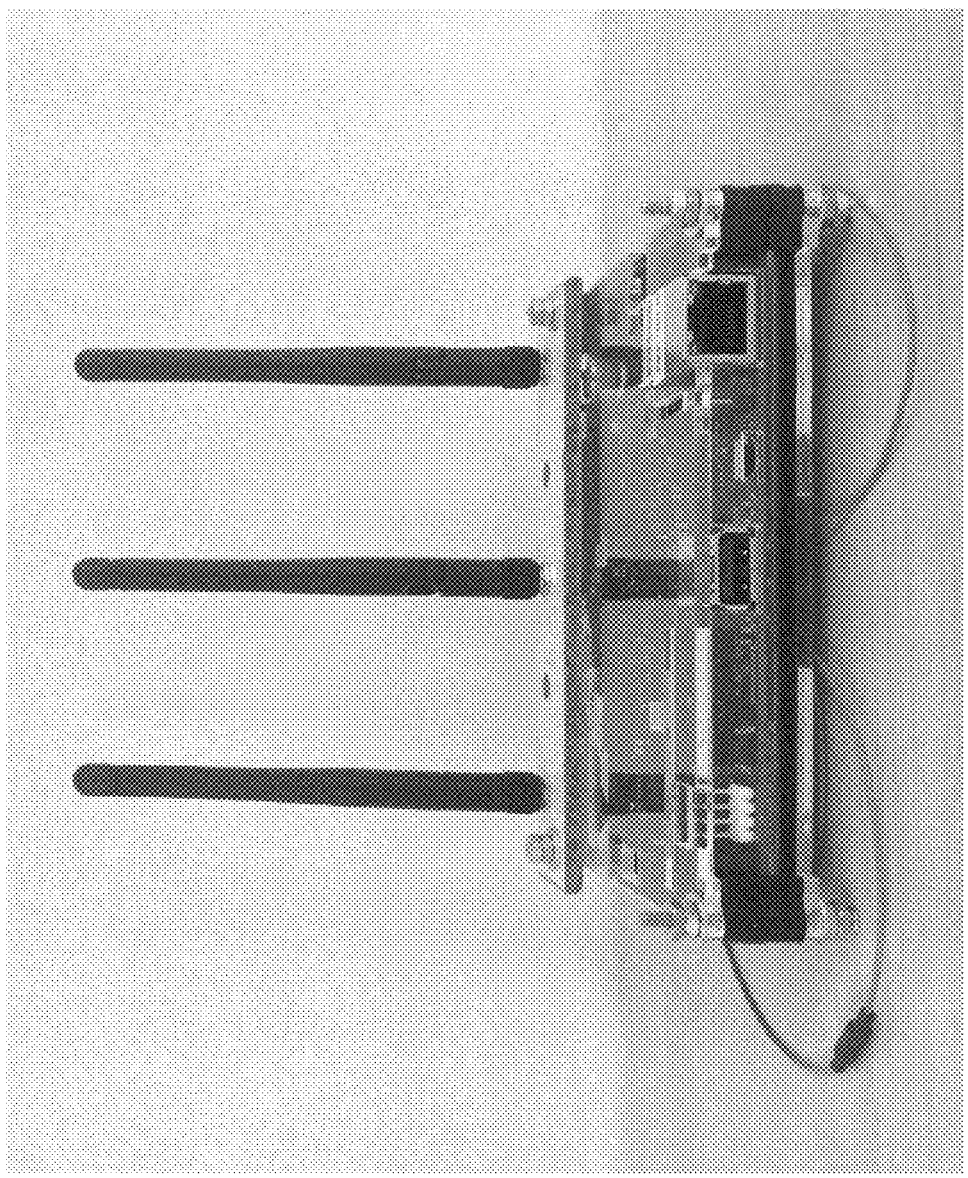
FIG. 31 illustrates a Wi-Fi device used in a proposed indoor positioning system (IPS), according to an embodiment of the present teaching.

Extensive experiments are conducted to validate the theoretical analysis and evaluate the performance of the proposed IPS. The proposed system contains two Wi-Fi devices, each equipped with three omni-directional antennas. One Wi-Fi device, called Origin, estimates CSI from the other Wi-Fi device, named as Bot. With the proposed algorithm herein, the Origin estimates the location of the Bot. FIG. 31 shows one Wi-Fi device used in the proposed IPS.

The experiments are conducted in a typical office of a multi-story building. The indoor space is filled with a large number of reflectors, e.g., chairs, desks, shelves, sofas, walls, and ceilings. The CSIs of 50 candidate locations are measured, with 20 measurements for each location.

To evaluate the performance, the CSIs at each location are partitioned into a training set and a testing set, with 10 CSIs for each. The TRRS matrix is calculated using the CSIs collected at the 50 candidate locations. Each element of the matrix represents the TRRS between the CSIs at the training location and the testing location. In other words, the diagonal elements of matrix indicate the similarity between CSIs at the same location, while the off-diagonal elements stand for the similarity between CSIs of different locations.

Figure 30:
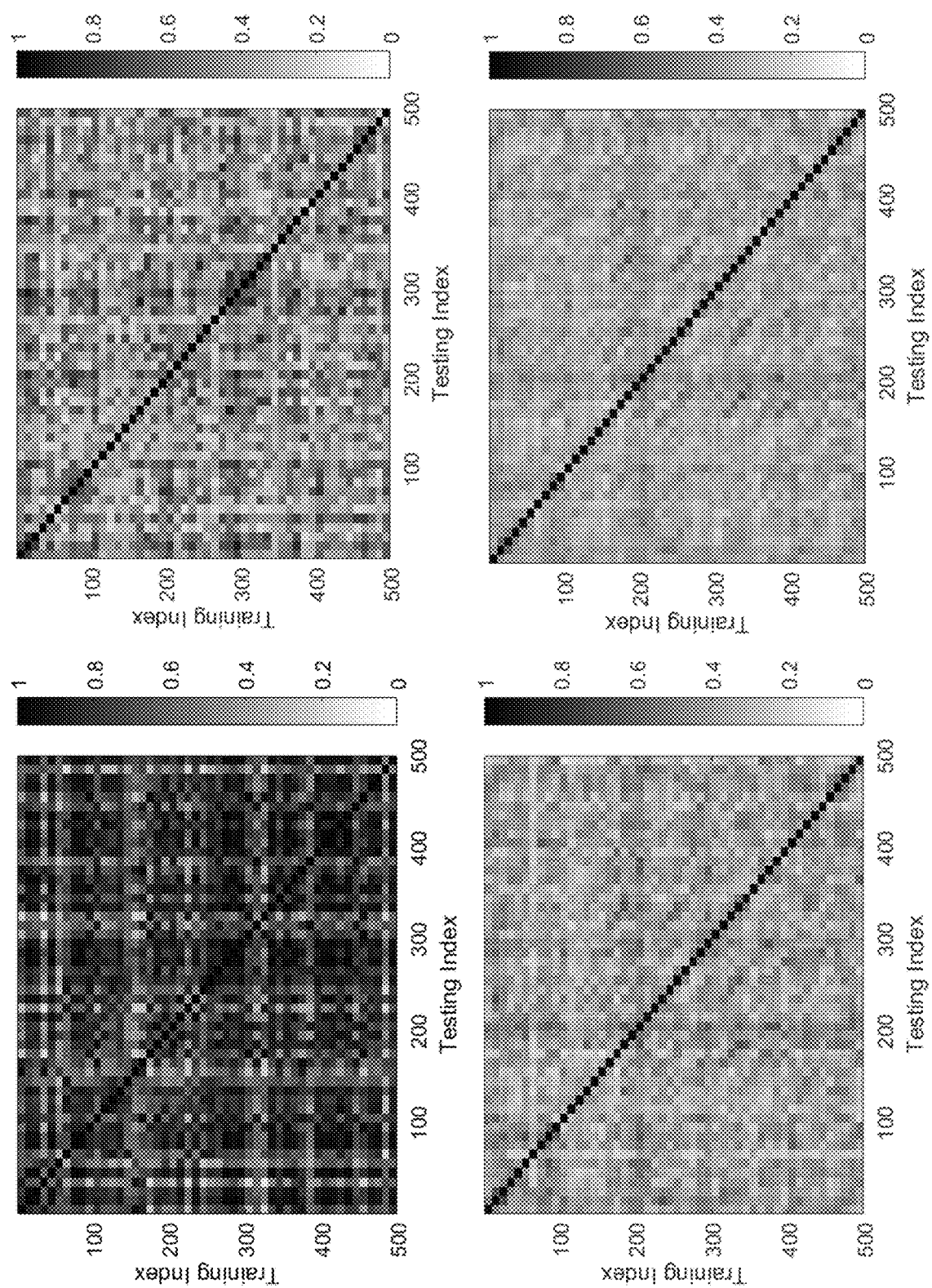
FIG. 30 illustrates time-reversal resonating strength matrices under various effective bandwidths, according to an embodiment of the present teaching.

FIG. 30 illustrates the TRRS matrices under effective bandwidths of 10, 40, 120, and 360 MHz. First of all, it is easily seen from FIG. 30 that the diagonal elements of the matrices are close to 1, signifying high similarities among CSIs of the same locations. Regarding the off-diagonal elements, they become smaller with an increasing effective bandwidth. When the effective bandwidth is small, e.g., 10 MHz, some off-diagonal elements are even larger than the diagonal elements, giving rise to localization errors. In other words, it is very likely to localize the Bot to incorrect positions when the effective bandwidth is small. When the effective bandwidth is increased, the gap between diagonal and off-diagonal elements enlarges, which provides a clear watershed between the correct and incorrect locations and leads to an enhanced system performance in return.

Figure 32:
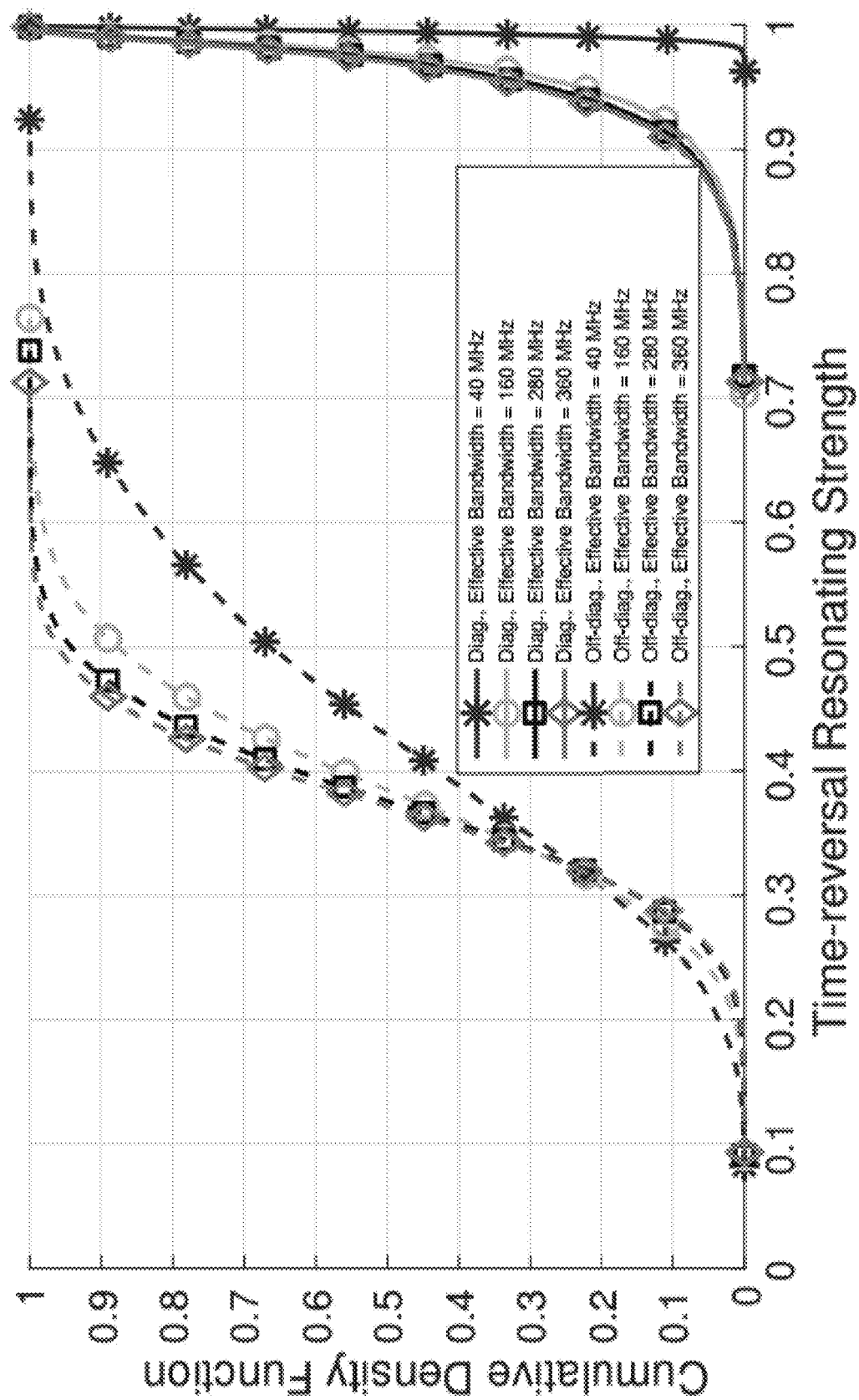
FIG. 32 shows cumulative density functions of the TRRS of the diagonal and off-diagonal elements, according to an embodiment of the present teaching.

To study the empirical distribution of the TRRS and provide a statistical point of view, FIG. 32 shows the cumulative density functions of the diagonal and off-diagonal elements in TRRS matrices under a variety of effective bandwidths. As we can see, the gap between the diagonal and off-diagonal elements increases with the effective bandwidth, indicating a better distinction between different locations. Whenever there is a gap between the diagonal and off-diagonal elements, a perfect localization can be achieved with an appropriate threshold, i.e., 100% true positive rate and 0% false positive rate. The true positive rate and the false positive rate can quantify the possibilities of detection and false alarm, respectively. The true positive rate defines the possibility that the device is localized at the correct location, while the false positive rate defines the possibility that the device is localized at an incorrect location. For instance, if one places a device at location A, and the localization system correctly identifies the location as A, then it is a detection that contributes to a true positive rate. On the other hand, if one places a device at location A, but the localization system localizes the device at location B, then it becomes a false alarm to location B, which contributes to a false positive rate. In practice, we perform extensive experiments to evaluate how many times the device is correctly localized as well as incorrectly localized to calculate the true positive rate and the false positive rate numerically.

The true positive rate and the false positive rate quantify the possibilities of detection and false alarm respectively. Their physical meaning in the localization system is: the true positive rate defines the possibility that the device is localized at the correct location, and the false positive rate defines the possibility that the device is localized to an incorrect location. For instance, if we place the device at location A, and the localization system correctly identifies the location as A, then it is a detection. On the other hand, if we place a device at location A, but the localization system localizes the device at location B, then it becomes a false alarm to location B. In practice, we perform extensive experiments to evaluate how many times the device is correctly localized as well as incorrectly localized to calculate the true positive rate and the false positive rate numerically.

In a practical indoor environment, there usually exists environment dynamics that might degrade the localization performance. To evaluate the proposed IPS in a dynamic indoor environment, the testing CSIs are re-collected in the presence of human activities and large object movement. In particular, to emulate dynamics from human activities, one participant was asked to walk continuously in the vicinity of the Bot. Then, the participant was asked to open and close a door which blocks the direct link between the Origin and Bot so as to emulate the dynamic from large object movement.

Figure 33:
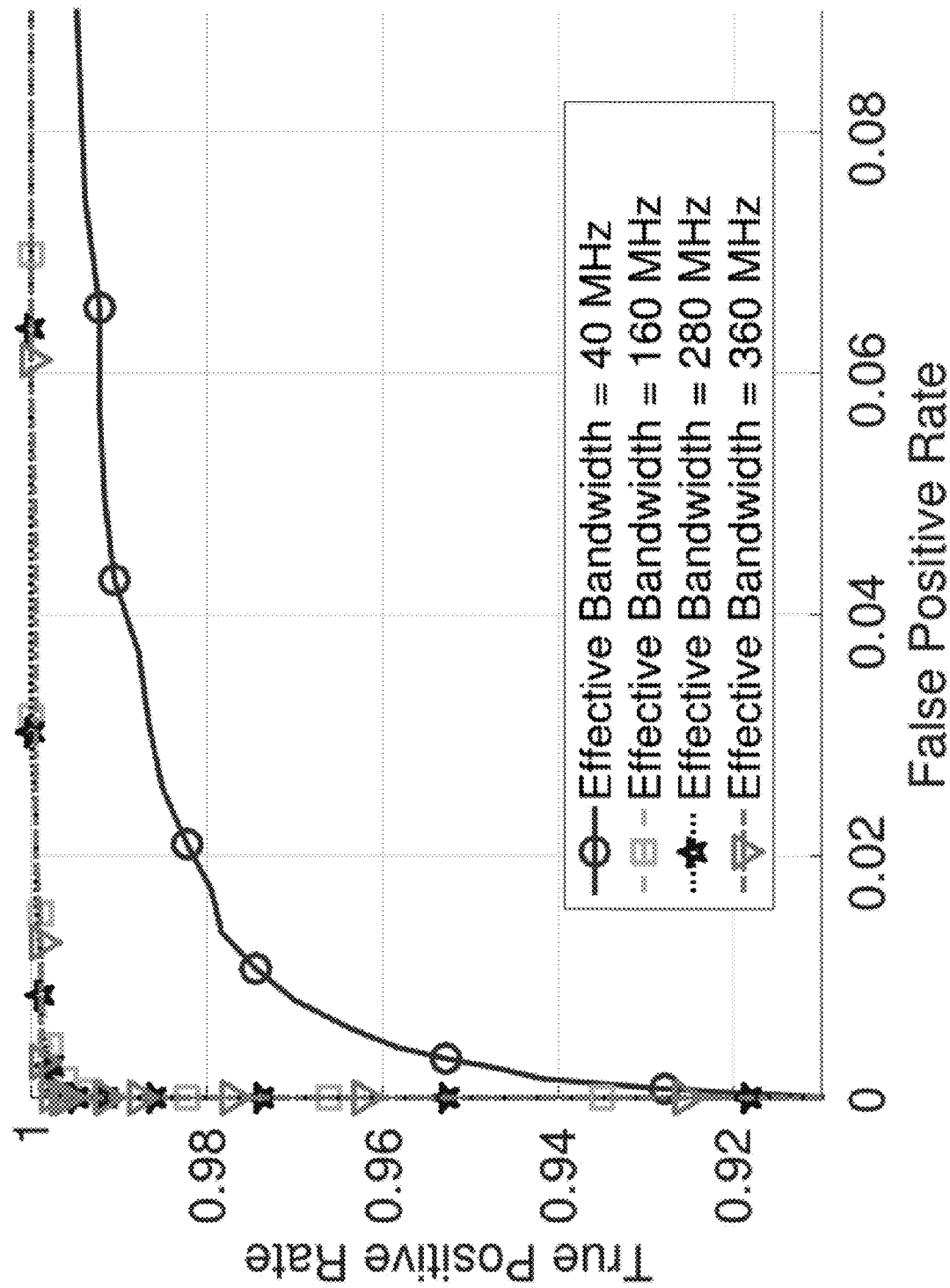
FIG. 33 demonstrates the receiver operating characteristic curve with human activities, according to an embodiment of the present teaching.
Figure 34:
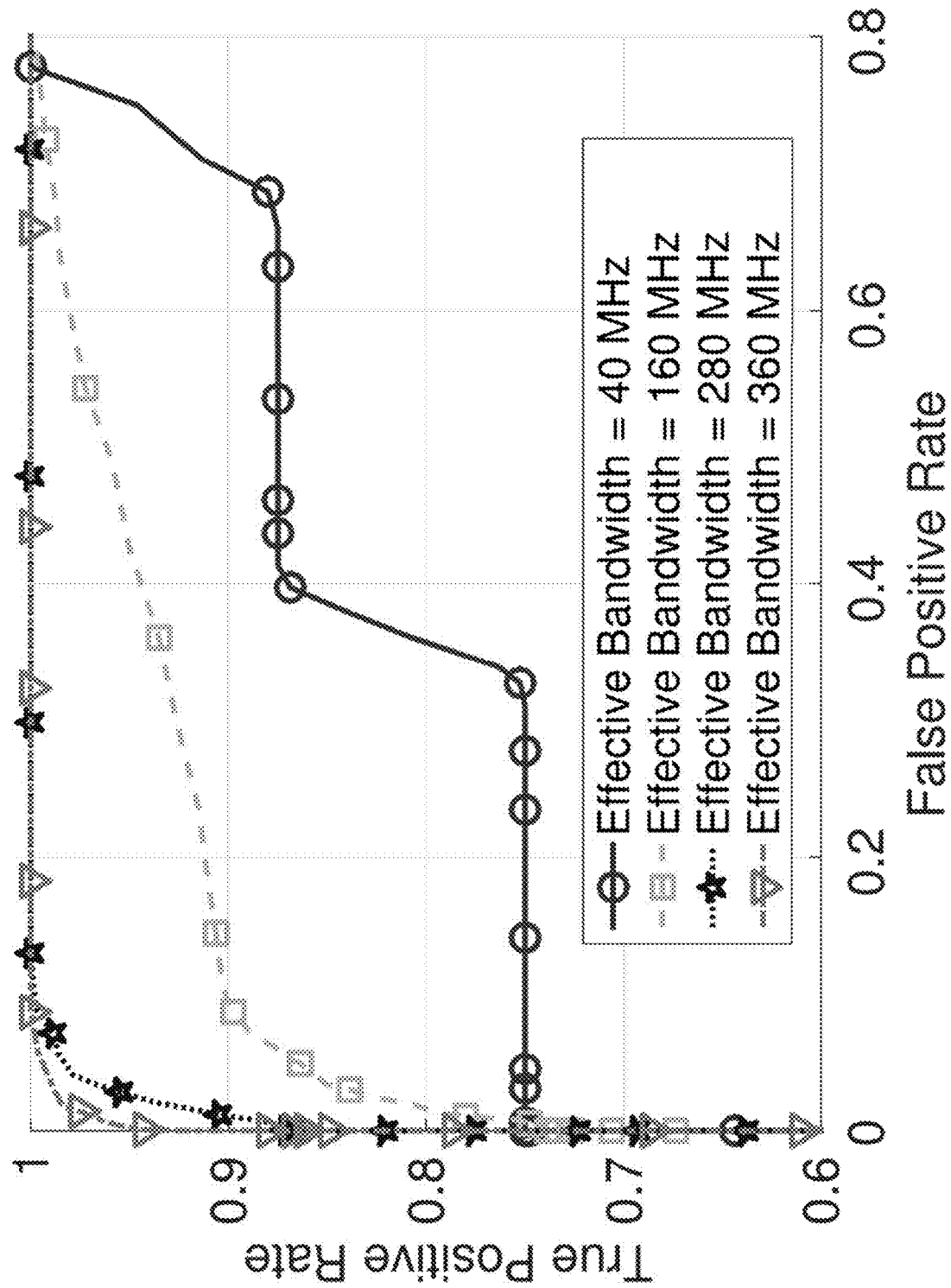
FIG. 34 depicts the receiver operating characteristic curve with large object movement, according to an embodiment of the present teaching.

FIG. 33 demonstrates the receiver operating characteristic curve with human activities. For a fixed false positive rate 0.15%, the true positive rate increases from 94.17% with 40 MHz effective bandwidth to 99.11% with 120 MHz effective bandwidth. Further enlarging the effective bandwidth to 240 MHz and 360 MHz boosts the true positive rate to 99.61% and 99.89%, respectively. On the other hand, FIG. 34 depicts the receiver operating characteristic curve with large object movement. For a fixed false positive rate 0.15%, the true positive rate increases from 75% with 40 MHz effective bandwidth to 76.38%, 87.12%, and 95% with 120, 240, and 360 MHz effective bandwidths, respectively. This can be justified by that with a large effective bandwidth the environment dynamics only affect very limited information in the fingerprint while leaving the majority intact. In other words, a large effective bandwidth enhances the robustness of the proposed IPS against environment dynamics.

During the experiments, we observe multiple Wi-Fi access points coexisting with the proposed IPS. Wi-Fi access points are the Wi-Fi devices that host a network and provide wireless connectivity to other Wi-Fi-compliant devices. An example of Wi-Fi access points is the wireless routers used in homes and offices.

It turns out that the impact of Wi-Fi access points on the proposed IPS is minimal, which means the proposed indoor localization system could co-exist with other Wi-Fi networks. As such, when deploying the localization system, we can ensure that the localization system would not affect the existing Wi-Fi networks, and on the other hand, other existing Wi-Fi networks would not introduce large interference into the localization system. Due to the carrier sense multiple access with collision avoidance (CSMA/CA) mechanism, these Wi-Fi access points would not transmit signals whenever they sense that the IPS is operating to obtain CSIs, which guarantees that the captured CSIs are free from interference. Therefore, the proposed localization system could avoid the interference from other Wi-Fi devices, and it would not introduce interference to other Wi-Fi devices.

The TRRS for a large effective bandwidth can be used in applications such as positioning, tracking, guard system, and breathing monitoring.

In one scenario, a manager of an animal zoo can put a Wi-Fi device, served as a Bot, on an animal in cage, e.g. a monkey, a tiger, or a bird, and utilize the disclosed system to determine a location of the animal in the cage and/or determine whether the animal is outside the cage. To be specific, the disclosed system can use another Wi-Fi device, served as Origin here, to obtain CSIs from the Bot for all possible locations the Bot can be in the cage and store these CSIs associated with corresponding locations in the cage. Then during the positioning process, the system can detect the CSI of the Bot at any time, determine a similarity, e.g. based on TRRS, between the detected CSI and each of the stored CSIs, and select the stored CSI that is closest to the detected CSI, e.g. when their TRRS is the largest among all TRRS calculated based on the detected CSI and the stored CSIs. In one case, when the largest TRRS exceeds a predetermined threshold, the system can estimate that the Bot as well as the animal is located at the location in the cage corresponding to the selected CSI at this time. In another case, when the largest TRRS does not exceed the predetermined threshold, the system can estimate that the Bot as well as the animal is outside the cage at this time. This may give an alert that the animal has escaped from the cage.

Similarly, the wireless positioning system can be utilized in a Safari park to determine a location of a wild animal in the park, or utilized in a Sea World to determine a location of a fish or a shark, and/or whether it has escaped from a restricted area.

As discussed above, spatial and frequency diversity can be exploited to improve accuracy of the positioning here. Because the animal can move to any unexpected area where LOS is weak or not available, the disclosed system can provide accurate positioning under this NLOS scenario by increasing effective bandwidth with exploited diversities.

In another scenario, the disclosed system in the present teaching may support wireless tracking in a crowded public place. For example, at the entrance to a state fair, a mother of a kid can obtain a pair of Origin and Bot, e.g. each of them is in form of a wristband. By wearing the Origin herself and putting the Bot on the kid, the mother can track the kid in the state fair area. This may be achieved when the disclosed system continuously monitoring the change of CSI from the Bot to the Origin, and determine whether there is a big change of the CSI, e.g. based on a similarity metric like TRRS between the current CSI and a latest CSI. When the change exceeds a threshold, the Origin may inform the mother, with light and/or sound, that maybe the kid is moving or being moved to an unexpected direction. In another embodiment, the TRRS can be utilized to determine a moving speed of the Bot relative to the Origin. In this case, the Origin can inform the mother, with light and/or sound, if the kid is moving or being moved in a higher than desired speed. This timely notice can help the mother to keep the kid within her control in a crowded area.

More examples of TR applications are shown in the section of "Examples of TR Applications" later.

While the above description of CSI is based on a Wi-Fi network, the disclosed system can also work when the CSI is extracted from devices of various other protocols, such as Bluetooth, LTE, etc.

The present teaching discloses a time-reversal method for indoor localization that achieves centimeter accuracy with a single-pair of off-the-shelf Wi-Fi devices that can be easily purchased in the market. The high accuracy for localization is maintained under strong NLOS scenarios. With the exploitation of the frequency and spatial diversities in Wi-Fi systems, it is capable of creating a large effective bandwidth to enable centimeter accuracy. Extensive experiment results in a typical office environment show that the centimeter accuracy as well as robustness against dynamics can be simultaneously achieved with a large effective bandwidth. The global GPS can achieve 3-15 meter of accuracy by mapping the world into latitude and longitude coordinates. The presented "indoor GPS" can achieve 1-2 cm accuracy when an indoor environment is fingerprinted and mapped.

Time Reversal Resonating Strength and Combination

In addition to the time reversal resonating strength combination disclosed in Algorithm 1, there can be other ways for combining the time reversal resonating strength. Written in a more compact way, the (normalized) resonating strength on the $d^{th}$ link between channel $h_{0,d}$ and $h_{1,d}$ is redefined as follows, $$\mathcal{TR}(h_{0,d}, h_{1,d}) = \frac{\max_n \left| \sum H_{0,d}^*[k] H_{1,d}[k] e^{-j2\pi \frac{kn}{N_{ser}}} \right|^2}{\Lambda_{0,d} \Lambda_{1,d}}, \quad \text{Equ. (4)}$$

where $\Lambda_{0,d}$ and $\Lambda_{1,d}$ are the energies of $h_{0,d}$ and $h_{1,d}$, respectively, calculated as $$\Lambda_{0,d} = \Sigma |H_{0,d}[k]|^2 \text{ and } \Lambda_{1,d} = \Sigma |H_{1,d}[k]|^2. \quad \text{Equ. (5)}$$

Consequently, for each link d, we have three characteristics:
1. The normalized resonating strength $\mathcal{TR}(h_{0,d}, h_{1,d})$,
2. The channel energy for channel $h_0$ on link d: $\Lambda_{0,d}$, and
3. The channel energy for channel $h_1$ on link d: $\Lambda_{1,d}$.

The next step for calculation is to combine the (normalized) resonating strength of each link to form a general feature. The following describes four methods for combining the time reversal resonating strength.

First, the BASIC COMBINATION of resonating strength between channel $h_0$ and $h_1$ is $$\mathcal{TR}(h_0, h_1) = \frac{1}{D}\sum_{d=1}^{D} \mathcal{TR}(h_{0,d}, h_{1,d}) \quad \text{Equ. (6)}$$

where D is the total number of antenna links.

In this method, we treat each link equally, regardless of its quality. We can expect that this combination algorithm will give us a benchmark performance in positioning and recognition.

Second, the ENERGY WEIGHTED COMBINATION of TRRS between channel $h_0$ and $h_1$ is $$\mathcal{TR}(h_0, h_1) = \frac{\sum_{d=1}^{D} \mathcal{TR}(h_{0,d}, h_{1,d}) \Lambda_{0,d} \Lambda_{1,d}}{\sum_{d=1}^{D} \Lambda_{0,d} \Lambda_{1,d}} \quad \text{Equ. (7)}$$

Unlike the previous method, the ENERGY WEIGHTED COMBINATION combines different links according to the product of channel gain $\Lambda_{0,d}\Lambda_{1,d}$. A link with a better quality (i.e., a higher channel gain) will be put on more weight than others. In general, the ENERGY WEIGHTED COMBINATION will produce a better performance than the BASIC COMBINATION.

Third, the ALL-LINK CONCATENATION COMBINATION of resonating strength between channel $h_0$ and $h_1$ is $$\mathcal{TR}(h_0, h_1) = \left( \frac{\sum_{d=1}^{D} \sqrt{\Lambda_{0,d}\Lambda_{1,d}} \sqrt{\mathcal{TR}(h_{0,d}, h_{1,d})}}{\sqrt{\sum_{d=1}^{D} \Lambda_{0,d}} \sqrt{\sum_{d=1}^{D} \Lambda_{1,d}}} \right)^2 \quad \text{Equ. (8)}$$

The idea behind this method is to concatenate all the CSIs on available links, after aligning each link channel independently, to effectively formulate a new CSI.

Fourth, the PARTIAL-LINK CONCATENATION COMBINATION of resonating strength between channel $h_0$ and $h_1$ is $$\mathcal{TR}(h_0, h_1) = \frac{1}{N_{RX}} \sum_{i=1}^{N_{RX}} \left( \frac{\sum_{d \in \mathcal{D}_i} \sqrt{\Lambda_{0,d}\Lambda_{1,d}} \sqrt{\mathcal{TR}(h_{0,d}, h_{1,d})}}{\sqrt{\sum_{d \in \mathcal{D}_i} \Lambda_{0,d}} \sqrt{\sum_{d \in \mathcal{D}_i} \Lambda_{1,d}}} \right)^2 \quad \text{Equ. (9)}$$

where $N_{RX}$ is the number of receiving antennas, and $\mathcal{D}_i$ stands for the set of antenna links involving receiving antenna i. For instance, in a 3×3 MIMO system, antenna link 1, 4, 7 represent the antenna links between transmitting antenna 1, transmitting antenna 2, and transmitting antenna 3 to the same receiving antenna 1, respectively. Thus, $\mathcal{D}_1 = \{1,4,7\}$. The idea behind this method is to first concatenate the CSIs on the same receiving antenna and calculate the TRRS, then take an average of the TRRS calculated on all receiving antennas.

CSI Phase Offset Compensation

The channel state information may be affected by (i) initial phase distortion caused by carrier frequency offset (CFO) $\alpha$ and common phase offset (CPE) $\beta$, and (ii) linear phase distortion caused by symbol timing offset (STO) $\sigma$ and sampling frequency offset (SFO) $\delta$.

The randomness distorts the phase quality of the channel state information fingerprints in the following way:

$$\tilde{H}[k] = H[k] \underbrace{\exp\left(j2\pi\frac{\sigma}{N}k\right)}_{STO} \underbrace{\exp(j\pi\phi_k)}_{CFO,SFO} \underbrace{\exp\left(j2\pi\frac{iN_s+N_g}{N}\phi_k\right)}_{CFO,SFO} \underbrace{\exp(j\beta)}_{CPE} \quad \text{Equ. (10)}$$

where $\phi_k = \alpha + \delta k$.

Therefore, the calculation of the time reversal resonating strength defined in $$\mathcal{TR}(h_0, h_1) = \frac{\eta^2}{\Lambda_0 \Lambda_1} \text{ with}$$

$$\eta = \max_\phi \left| \sum H_0^*[k] H_1[k] e^{-jk\phi} \right|^2,$$

$$\Lambda_0 = \sum |H_0[k]|^2,$$

$$\Lambda_1 = \sum |H_1[k]|^2$$

involves the "max" operation for compensating the phase distortion and has high complexity.

To reduce the complexity while compensating the phase distortion, one can use channel state information fingerprint such as channel state information fingerprint type I.

Figure 35:
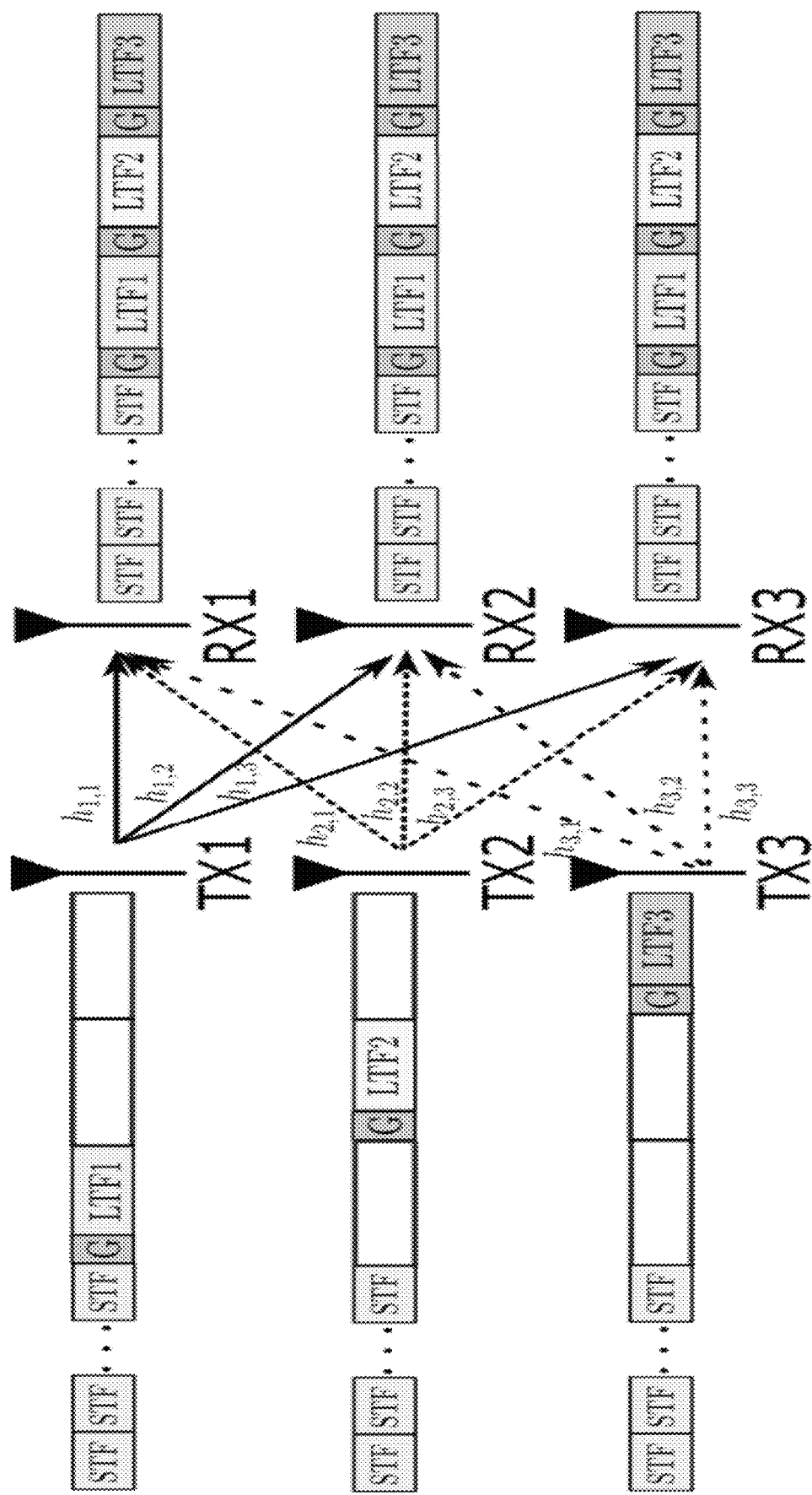
FIG. 35 illustrates an exemplary MIMO system based on which new CSI fingerprints can be formulated, according to an embodiment of the present teaching.

For instance, referring to FIG. 35, we can write $$\tilde{H}_{1,1}[k] = H_{1,1}[k] \exp\left(j2\pi \frac{\sigma}{N} k\right) \exp(j\pi\phi_k) \exp\left(j2\pi \frac{N_g}{N} \phi_k\right) \exp(j\beta) \quad \text{Equ. (11)}$$

$$\tilde{H}_{2,1}[k] = \quad \text{Equ. (12)}$$
$$H_{2,1}[k] \exp\left(j2\pi \frac{\sigma}{N} k\right) \exp(j\pi\phi_k) \exp\left(j2\pi \frac{N_s + N_g}{N} \phi_k\right) \exp(j\beta)$$

where $H_{1,1}$ [k] represents the channel state information fingerprint received at receiving antenna 1 from transmitting antenna 1, and $H_{2,1}$ [k] represents the channel state information fingerprint received at receiving antenna 1 from transmitting antenna 2, respectively.

We can formulate the cross-antenna fingerprint $G_{1,2}$ [k] for each subcarrier k as $$G_{1,2}[k] = \tilde{H}_{1,1}[k]\tilde{H}_{2,1}^*[k] = H_{1,1}[k]H_{2,1}^*[k]\exp\left(-j2\pi \frac{N_s}{N} \phi_k\right) = \quad \text{Equ. (13)}$$
$$H_{1,1}[k]H_{2,1}^*[k]\exp(-j2\pi\phi_k)\exp\left(-j2\pi \frac{N_g}{N} \phi_k\right)$$

The above shows that the effect of symbol timing offset σ and common phase offset β are canceled. Since α and δ are the residual carrier frequency offset and sampling frequency offset, under most cases they can be ignored.

For each radio-frequency chain in a 3×3 multiple-input, multiple-output system, we can formulate 3 new channel state information fingerprints. Therefore, in total, we can formulate $G_{1,2}, \ldots, _9$. More generally, for a $N_T \times N_R$ system, we can formulate a total of $C_{N_T}^2 \times N_R$ new channel state information fingerprints.

The above calculation ignores the noise. which would affect the fingerprint quality. However, we could take average of multiple realizations to mitigate the impact of noise:

$$\overline{G}_{1,2}[k] = \frac{1}{W} \sum_{i=1}^W G_{1,2}^i[k] \quad \text{Equ. (14)}$$

where $G_{1,2}^i[k]$ stands for the fingerprint at subcarrier k for realization i.

If we consider noise, we can write $G_{1,2}$ [k] as $$G_{1,2}[k] = H_{1,1}[k]H_{2,1}^*[k]\exp(-j2\pi\phi_k)\exp\left(-j2\pi \frac{N_g}{N} \phi_k\right) + \quad \text{Equ. (15)}$$
$$H_{1,1}[k]N_{2,1}^*[k] + H_{2,1}^*[k]N_{1,1}[k] + N_{1,1}[k]N_{2,1}^*[k]$$

The noise is amplified by $H_{1,1}$ [k] and $H_{2,1}$ [k]. Assume that the noise has zero mean, the average over several realizations of $G_{1,2}$ [k] can mitigate the noise which is $$\overline{G}_{1,2}[k] = \quad \text{Equ. (16)}$$
$$\frac{1}{W}\sum_{i=1}^W H_{1,1}[k]H_{2,1}^*[k]\exp(-j2\pi\phi_{k,i})\exp\left(-j2\pi \frac{N_g}{N} \phi_{k,i}\right) +$$
$$\underbrace{\frac{1}{W}\sum_{i=1}^W N_{1,1}[k,i]N_{2,1}^*[k,i] + \frac{1}{W}\sum_{i=1}^W \text{Cross Terms}}_{\approx 0}$$

Assuming that the residual CFO and SFO are sufficiently small that can be ignored, the effective SNR in the fingerprint $\overline{G}_{1,2}$ [k] can be written as $$SNR(G_{1,2}[k]) = SNR(H_{1,1}[k]) \times SNR(H_{2,1}[k]) \quad \text{Equ. (17)}$$

If $SNR(H_{1,1}$ [k]$)\geq 1$, $SNR(H_{2,1}[k])\geq 1$, we have $$SNR(G_{1,2}[k]) \geq \max\{SNR(H_{1,1}[k]), SNR(H_{2,1}[k])\} \quad \text{Equ. (18)}$$

which shows that the effective SNR is improved.

The formulation of $\overline{G}_{1,2}$ [k] takes the average of different realizations, which might not be robust against dynamics that might change the CSIs. One way to overcome this issue is to use clustering algorithms and learn several (≥1) representative fingerprints for each location, for example, k-means clustering.

Then, the simple inner product is applied to obtain the resonating strength. For instance, the resonating strength (per link) between two CSIs after calibration is calculated as:

$$\mathcal{TR}(\hat{h}_{0,i,j}, \tilde{h}_{1,i,j}) = \frac{|\sum G_{0,i,j}^*[k]G_{1,i,j}[k]|^2}{\Lambda_{0,i,j}\Lambda_{1,i,j}} \quad \text{Equ. (19)}$$

where $\hat{h}_{0,i,j}$ and $\tilde{h}_{1,i,j}$ represent two CSIs between receiving antenna j and transmitting antenna i, $G_{0,i,j}[k]$ and $G_{1,i,j}[k]$ are the two formulated fingerprint using $h_{0,i,j}$ and $k_{1,i,j}$ on subcarrier k, respectively, and $\Lambda_{0,i,j}$ and $\Lambda_{1,i,j}$ are the fingerprint energies calculated by $\Lambda_{0,i,j} = \Sigma|G_{0,i,j}[k]|^2$ and $\Lambda_{1,i,j} = \Sigma|G_{1,i,j}[k]|^2$, respectively.

Since the linear phase offset is removed, one can also use model-based appproaches, such as modeling the CSI fingerprint as jointly Gaussian distributed random complex vectors and calculate the distance in the probability space instead of calculating the resonating strength.

In an alternative embodiment, one can use the following fingerprint (channel state information fingerprint II). For TX antenna i and RX antenna j, write $$G_{i,j}[k] = \tilde{H}_{i,j}[k]\tilde{H}_{i,j}[-k] \quad \text{Equ. (20)}$$

Then, we have $$G_{i,j}[k] = H_{i,j}[k]H_{i,j}[-k]\exp(j2\beta) \quad \text{Equ. (21)}$$

which totally eliminates the linear phase shift.

Figure 36:
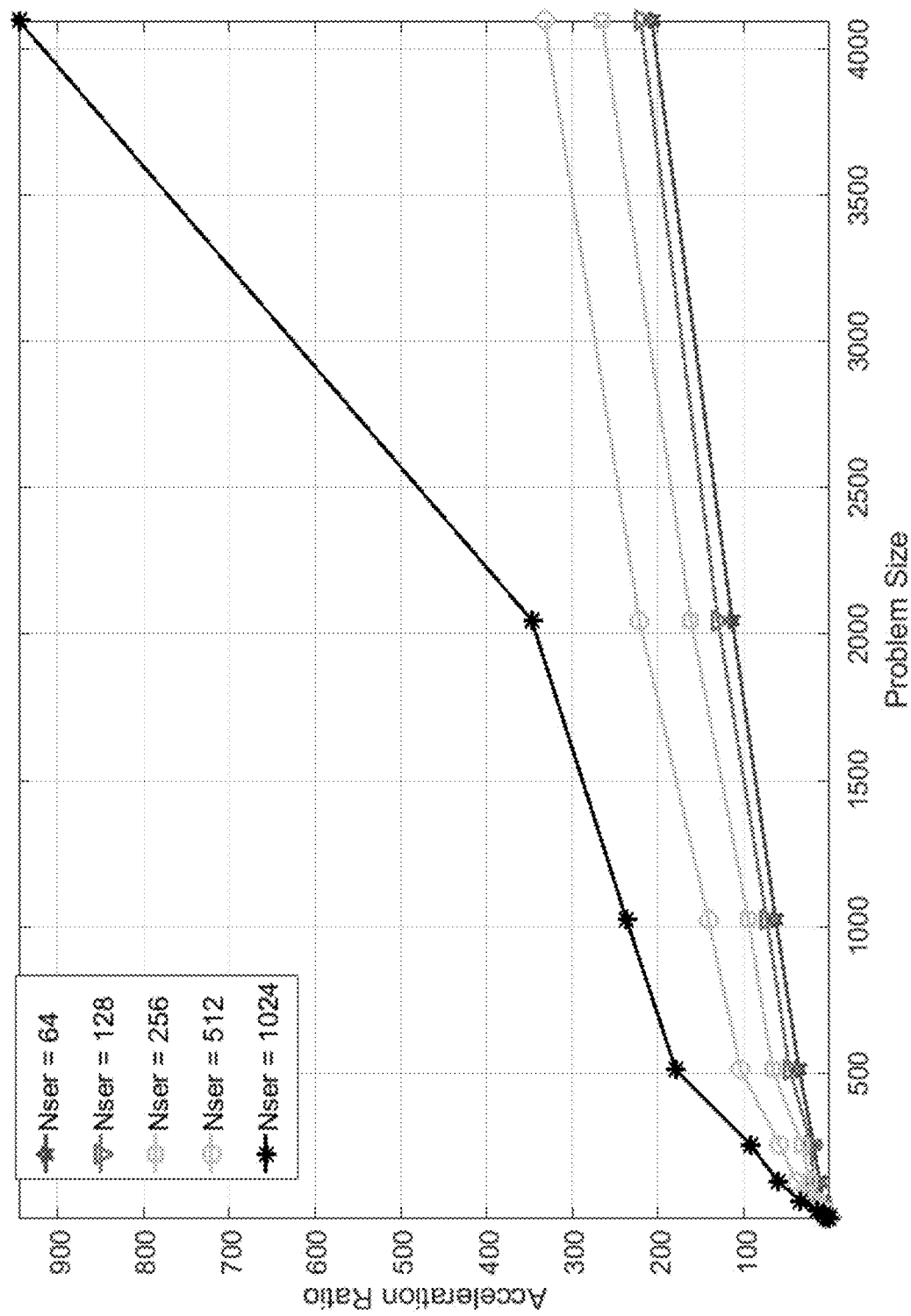
FIG. 36 illustrates complexity comparison of a CSI fingerprint method based on acceleration ratio, according to an embodiment of the present teaching.

FIG. 36 illustrates the ratio of time in calculating a TRRS matrix between using the "max" search based approach and a CSI fingerprint method (type I), where the x-axis denotes the number of CSIs involved in the TRRS matrix calculation, and Nser denotes the number of searches in the "max" operation based approach. It is seen that time complexity is greatly reduced by using the CSI fingerprint method, and the improvement increases with the problem size.

One benefit of using CSI fingerprint is that, we can use the $l_2$ norm as the distance measure between two fingerprints $g_0$ and $g_1$, given by:

$$dist(g_0, g_1) = \max_{\phi \in [0, 2\pi)} \|g_0 - e^{j\phi} g_1\|_2^2 = \|g_0\|_2^2 + \|g_1\|_2^2 - 2\|g_0^\dagger g_1\|_2, \quad \text{Equ. (22)}$$

where $g_0^\dagger$ stands for the transpose-conjugate of $g_0$.

CSI Phase Sanitization/Calibration:

Suppose the ground truth channel state information for subcarrier k is $h[k] = |h[k]|e^{-j\phi_k}$. However, due to the impact of phase corruption and noise, the estimated channel state information $\tilde{h}[k]$ becomes $$\tilde{h}[k] = h[k]e^{-j(\alpha+k\beta)} + n_k = |h[k]|e^{-j\phi_k}e^{-j(\alpha+k\beta)} + n_k, k = -K, \ldots, K \quad \text{Equ. (23)}$$

where $\alpha$ represents the initial phase offset, $\beta$ represents the linear phase offset and $n_k$ is the estimation noise on subcarrier k.

Linear phase offset cleaning: First, let us take a look at the linear phase offset $\alpha$. In some examples, one way to eliminate $\alpha$ is to have a linear fitting over the phase components along all subcarriers and then extract the slope as the estimated linear phase offset. Even though it is correct during analysis, the linear fitting method may not in actual implementation due to the noisy unwrapping.

Linear phase calibration with unwrapping: The raw channel state information phases are concentrated $[-\pi, \pi]$, which are referred to as wrapped phase $\phi_w$. In order to linear fit the channel state information phase along all the subcarriers, we need first to unwrap the phase on each subcarrier as $$\phi[k] = \phi[k-1] + W\{\phi_w[k] - \phi_w[k-1]\}, \quad \text{Equ. (24)}$$

where $\phi[k]$ denotes the unwrapped phase on subcarrier k, and $\phi[k]$ is the wrapped phase. The operation W is the unwrapping function:

$$W\{a\} = \begin{cases} a, & \text{if } |a| \leq \pi \\ a - \text{sign}[a]2\pi, & \text{otherwise} \end{cases}. \quad \text{Equ. (25)}$$

Due to the noise which adds extra phase $\phi_n[k]$ to the wrapped phase $\phi_w[k]$, $\tilde{\phi_w}[k] = \phi_w[k] + \phi_n[k]$, the unwrapping method may be degraded as $W\{\phi_w[k] + \phi_n[k] - \phi_w[k-1]\}$. The error may be introduced with an amplitude at least $|2\pi - \phi_n[k]|$ because of the false-trigger or miss-trigger of the unwrapping procedure in Equ. (25).

Figure 37:
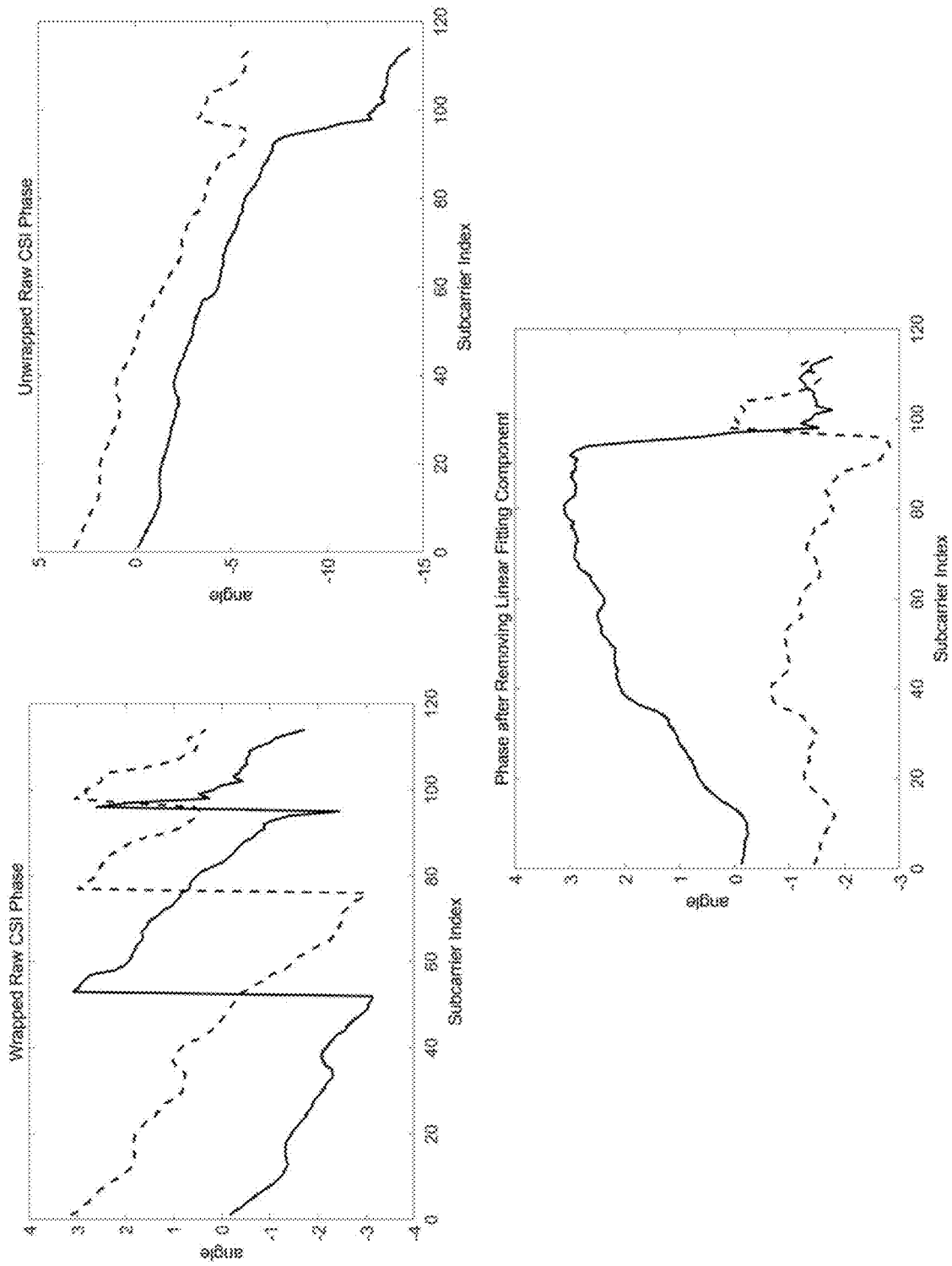
FIG. 37 illustrates linear phase calibration based on a linear fitting method, according to an embodiment of the present teaching.

Hence, due to the corrupted unwrapping operation, the linear phase offset obtained by linear fitting may be incorrect. An example of linear fitting method on CSIs from the same location (state) is shown in FIG. 37. In FIG. 37, the figure shows the phase of the wrapped raw CSI on each subcarrier, where the two curves represent CSI collected in two realizations of channel probing. After removing the phase wrapping, there phase becomes more contnous as is observed in the middle figure. Since the two curves show CISs collected from the same channel probing, they should be roughly on top of each other. However, due to the phase distortion, they are not. The right figure shows the phase after a linear fitting based phase offset method and it is seen that the unwrapping operation introduces errors.

From experiments, we also observe that when $|H_k| \approx |n_k|$ in power, i.e., the signal-to-noise ratio (SNR) is small, it is more likely to have the corrupted phase unwrapping.

Linear phase calibration without unwrapping: To have the linear phase offset calibrated without unwrapping the phase and any special hardware implementation, we adopt the following method.

The signature vector $G^{(\Delta)}$ is obtained directly from the channel state information vector $\tilde{h}$, in which $\tilde{h} = [\tilde{h[-K]}, \tilde{h[-K+1]}, \ldots, \tilde{h[K]}]$. Here, his the collected $(2K+1) \times 1$ channel state information vector.

$$G^{(\Delta)}[k] = \tilde{h}[k]^* \times \tilde{h[k + \Delta]}$$

$$= |h[k]||h[k+\Delta]|e^{-j\Delta\beta}e^{-j(\phi_{k+\Delta} - \phi_k + \phi_{noise})} \quad \text{Equ. (26)}$$

$$= |G^{(\Delta)}[k]|e^{-j\Delta\beta}e^{-j\psi_k^{(\Delta)}}, k = -K, \ldots, K - \Delta. \quad \text{Equ. (27)}$$

In Equ. (26), the superscript * denotes the conjugate operation, $\Delta$ is an integer representing the distance of shifting on $\tilde{h}$, and the initial phase or common phase offset is naturally canceled out in $G^{(\Delta)}[k]$. $G^{(\Delta)}[k] = h[k]h[k+\Delta]$ and $\psi_k^{(\Delta)} = \phi_{k+\Delta} - \phi_k + \phi_{noise}$.

$$\hat{\beta} = -\frac{1}{\Delta} \angle \left\{ \sum_{k=-K}^{K-\Delta} G^{(\Delta)}[k] \right\} = -\frac{1}{\Delta} \angle \left\{ e^{-j\Delta\beta} \sum_{k=-K}^{5K-\Delta} |G^{(\Delta)}[k]| e^{-j\psi_k^{(\Delta)}} \right\} = \quad \text{Equ. (28)}$$

$$\beta - \frac{1}{\Delta} \angle \left\{ \sum_{k=-K}^{K-\Delta} |G^{(\Delta)}[k]| e^{-j\psi_k^{(\Delta)}} \right\} = \beta + \beta_{res},$$

As shown in Equ. (28), besides the true linear phase offset $\beta$, we have a residual term $\beta_{res}$ and is approximately fixed for each location as $$\beta_{res} = -\frac{1}{\Delta} \angle \left\{ \sum_{k=-K}^{K-\Delta} h[k]^* h[k+n] \right\}, \quad \text{Equ. (29)}$$

where $h[k]$ $H_k$ is the ground-truth channel state information. According to the assumption that the phase on each subcarrier is independent and uncorrelated, $\beta_{res}$ is quite small and can be neglected.

Figure 38:
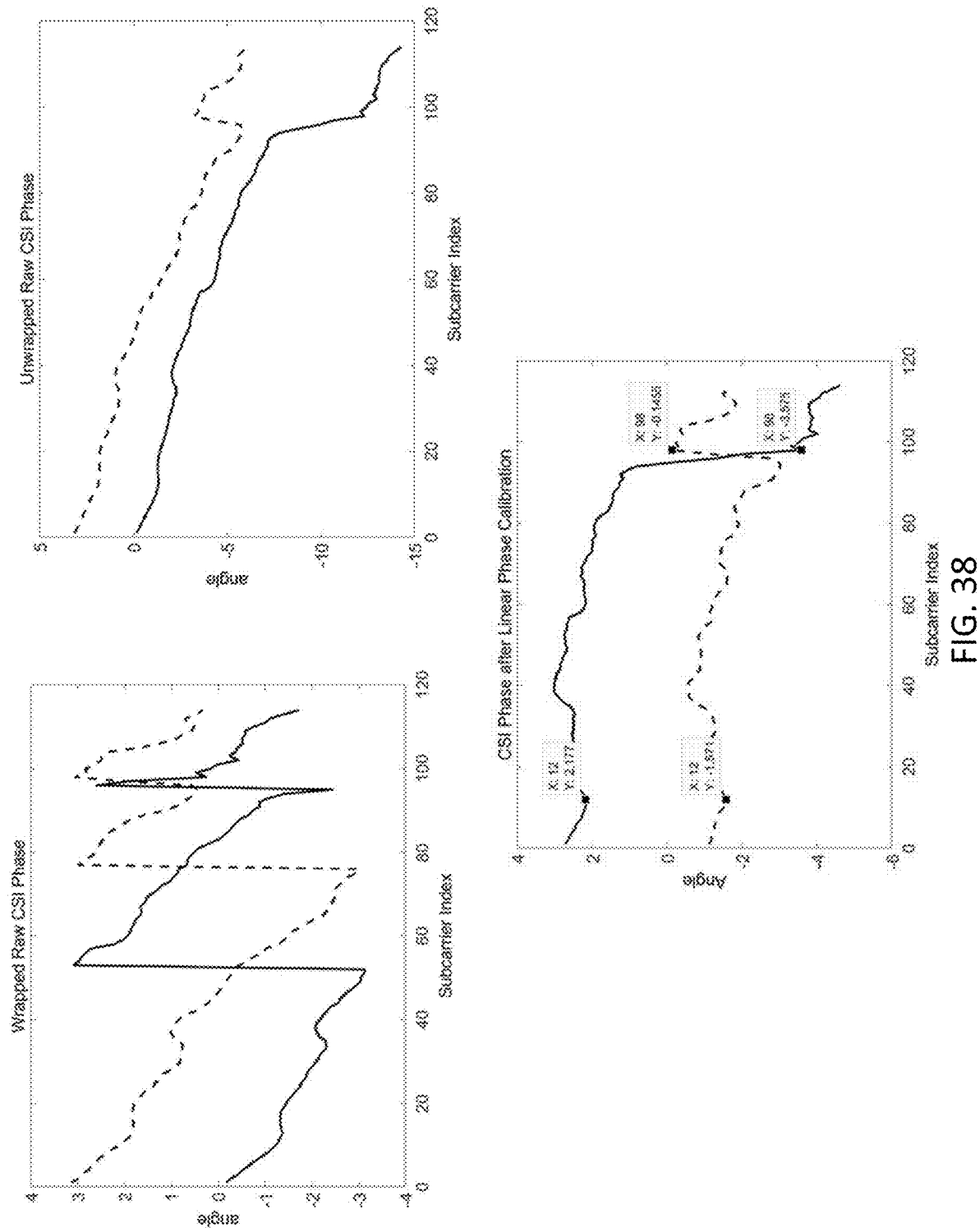
FIG. 38 illustrates linear phase calibration based on a proposed method, according to an embodiment of the present teaching.

The example of the linear phase calibration method is shown in FIG. 38. From the right figure in FIG. 38, it is seen that the two curves have similar shapes, indicating the linear phase offset is compensated.

Initial phase offset cleaning: Once the linear phase offset $\beta$ is removed for a channel state information vector, the next step is to remove the initial phase offset $\alpha$.

Let $\tilde{h}[k]$ denote the channel state information on subcarrier k after linear phase offset sanitization, i.e., $\tilde{h}[k] = h[k]e^{-j\alpha} + \tilde{n}_k$.

Adopting the similar method in Linear Phase Offset Cleaning, the a parameter is estimated as $$\hat{\alpha} = -\angle\left\{\sum_{k=-K}^{K} \tilde{h}[k]\right\} = \alpha - \angle\left\{\sum_{k=-K}^{K} h[k] + \tilde{n}_k\right\} = \alpha + \alpha_{res} \qquad \text{Equ. (30)}$$

Similar to $\beta_{res}$, the initial phase residual $\alpha_{res}$ is approximately estimated as the common phase across all subcarriers, $$\alpha_{res} = -\angle\{\Sigma_{k=-K}^{K} h[k]\}, \qquad \text{Equ. (31)}$$

where the independency of noise is considered. Suppose the phase on each subcarrier is independent, $\alpha_{res}$ should be small.

As discussed above, the linear phase calibration and the initial phase calibration can be implemented in parallel, and both of them are array-operation which is fast and efficient. The phase calibration method described above calibrates and compensates the phase for each channel state information without the requirement of a reference channel state information, which is needed for previous prior art channel state information alignment algorithms. From experimental results, the CSIs after calibration are all consistent and aligned well when they come from the same location/state.

Once the phase is calibrated and sanitized according to the algorithm described above, the remaining channel state information can be viewed as the ground-truth channel state information which has no phase distortion. As a consequence, there no longer needs the FFT-based method to calculate the resonating strength. After going through the phase calibration, the obtained CSIs keep the ground-truth phase information that may be used to estimate AoAs or ToFs. Moreover, the simple inner product method is used to calculate the resonating strength of the calibrated CSIs. Now the resonating strength preserves its physical meaning as that it is the electromagnetic wave response to the indoor environment through which it propagates during transmission.

Figure 39:
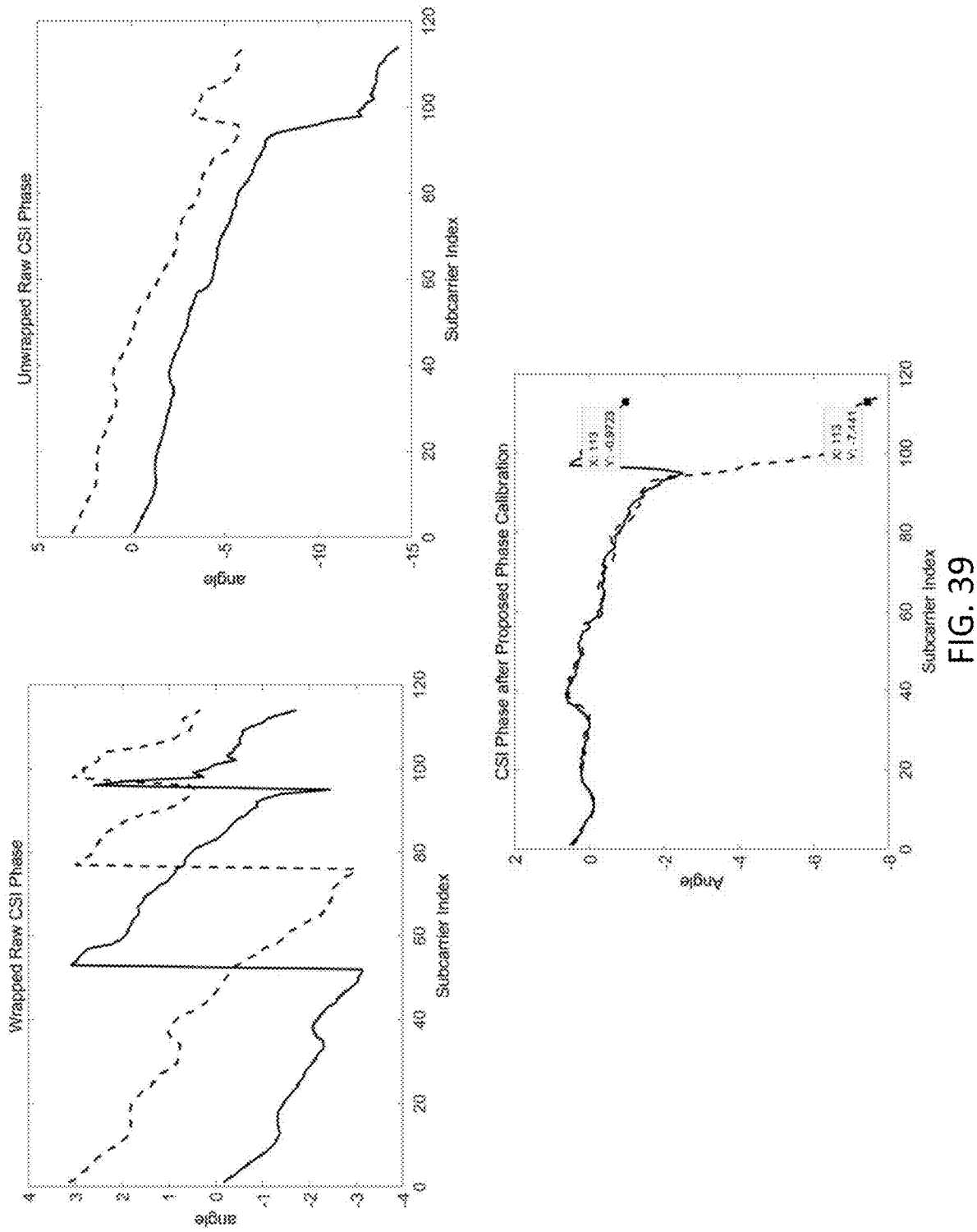
FIG. 39 illustrates linear phase and initial phase calibration based on a proposed method, according to an embodiment of the present teaching.

The example of the proposed phase offset sanitization method, including linear phase offset and initial phase offset is shown in FIG. 39. The right figure in FIG. 39 shows that the two curves on almost on top of each other, indicating the linear phase offset and initial phase offset are both compensated. The divergence in the last figure is due to the unwrapping and will not affect the resonating strength calculation.

The linear phase calibration and the initial phase calibration can be implemented in parallel, and both of them are array-operation which is fast and efficient.

The proposed phase calibration method calibrates and compensates the phase for each CSI without the requirement of a reference CSI, which is needed for previous all CSI alignment algorithms. From experimental results, the CSIs after the proposed calibration are all consistent and aligned well when they come from the same location/state.

Once the phase is calibrated and sanitized according to the proposed algorithm, the remaining CSI $\overline{H}_k$ can be viewed as the ground-truth CSI which has no phase distortion. As a consequence, there NO longer needs the FFT-based method to calculate the resonating strength. After going through the proposed phase calibration, the obtained CSIs keep the ground-truth phase information that might be used to estimate AoAs or ToFs. Moreover, simple inner product method is used to calculate the resonating strength of the calibrated CSIs. Now the resonating strength preserves its physical meaning as that it is the EM wave responds to the indoor environment through which it propagates during transmission.

Statistics of Time-Reversal Resonating Strength

If there is no phase offset in the estimated channel frequency responses after phase distortion correction, the time reversal resonating strength in Equ. (1) for each link in a multiple-input, multiple-output (MIMO) system, can be calculated as:

$$\mathcal{TR}(h_0, h_1) = \frac{\left|\sum_{k=1}^{L} h_0^*[k] h_1[k]\right|^2}{\|h_0\|^2 \|h_1\|^2}, \qquad \text{Equ. (32)}$$

where k is the index of subcarriers, L is the total number of subcarriers. According to the assumption on channel stationarity, if the channel frequency response (CFR) $h_0$ and $h_1$ come from the same location or the same state, we can model $h_1$ as $$h_1 = h_0 + n. \qquad \text{Equ. (33)}$$

Here, n is the vector of Gaussian noise, and $$n \sim \mathcal{CN}\left(0, \frac{\sigma^2}{L} 1\right)$$

is a complex normal distribution, which enables $E[\|n\|^2] = \sigma^2$. L is the length of the channel frequency response.

Without loss of generality, we assume $\|h_0\|^2 = 1$, and then Equ. (32) becomes $$\mathcal{TR}(h_0, h_1) = \frac{\left|\sum_k H_0^*[k](H_0[k] + n[k])\right|^2}{\|h_0 + n\|^2} = \frac{|1 + h^H n|^2}{\|h_0 + n\|^2}. \qquad \text{Equ. (34)}$$

Define a new metric $\gamma$ as $$\gamma = 1 - \mathcal{TR}(h_0, h_1) = 1 - \frac{|1 + h^H n|^2}{\|h_0 + n\|^2} = \frac{\|n\|^2 - |h^H n|^2}{\|h_0 + n\|^2}. \qquad \text{Equ. (35)}$$

According to the Cauchy-Schwarz inequality, $|h^H n|^2 \leq \|h\|^2 \|n\|^2 = \|n\|^2$ with equality holds if and only if n is a multiplier of h, which is rare to happen. We can assume, with probability almost 1, $\gamma > 0$. By taking the logarithm on both sides of Equ. (35), we have $$\ln(\gamma) = \ln(\|n\|^2 - |h^H n|^2) - \ln(\|h_0 + n\|^2). \qquad \text{Equ. (36)}$$

Moreover, let us denote $$X = \frac{2L}{\sigma^2} \|n\|^2, \quad Y = \frac{2L}{\sigma^2} |h^H n|^2 \text{ and } Z = \frac{2L}{\sigma^2} \|h_0 + n\|^2.$$

Then, it is possible to prove that $X \sim \chi^2(2L)$, $Y \sim \chi^2(2)$ and $$Z \sim \chi_{2L}'^2\left(\frac{2L}{\sigma^2}\right).$$

Here, $\chi^2(k)$ denotes a chi-squared distribution with k degrees of freedom, and $\chi_k'^2(\mu)$ denotes a noncentral chi-squared distribution with k degrees of freedom and noncentrality parameter μ. By utilizing the statistics of X, Y, and Z, we can have $$E[\|n\|^2] = \sigma^2, \text{Var}[\|n\|^2] = \frac{\sigma^4}{L}, \quad \text{Equ. (37)}$$

$$E[|h^H n|^2] = \frac{\sigma^2}{L}, \text{Var}[|h^H n|^2] = \frac{\sigma^4}{L^2}, \quad \text{Equ. (38)}$$

$$E[\|h+n\|^2] = 1 + \sigma^2, \text{Var}[\|h+n\|^2] = \frac{\sigma^4 + 2\sigma^2}{L}. \quad \text{Equ. (39)}$$

Similar for X, Y and Z, we have $$E[X] = 2L, \text{Var}[X] = 4L, \quad \text{Equ. (40)}$$

$$E[Y] = 2, \text{Var}[Y] = 4, \quad \text{Equ. (41)}$$

$$E[Z] = 2L + \frac{2L}{\sigma^2}, \text{Var}[Z] = 4L + \frac{8L}{\sigma^2}. \quad \text{Equ. (42)}$$

According to the statistics of $|h^H n|^2$ in Equ. (37), it is reasonable to have the following approximation as $$\|n\|^2 - |h^H n|^2 \simeq \|n\|^2 - \frac{\sigma^2}{L},$$

because the mean square error of approximation is equal to the variance $$\text{Var}[|h^H n|^2] = \frac{\sigma^4}{L^2} \to 0.$$

Then Equ. (36) becomes $$\ln(\gamma) \simeq \ln\left(\|n\|^2 - \frac{\sigma^2}{L}\right) - \ln(\|h_0 + n\|^2) \quad \text{Equ. (43)}$$

$$= \ln\left(\frac{\sigma^2}{2L}X - \frac{\sigma^2}{L}\right) - \ln\left(\frac{\sigma^2}{2L}Z\right)$$

$$= \ln(\sigma^2) + \ln\left(\frac{1}{2L}X - \frac{1}{L}\right) - \ln\left(\frac{\sigma^2}{2L}Z\right).$$

Since $X \sim \chi^2(2L)$, and $$Z \sim \chi'^2_{2L}\left(\frac{2L}{\sigma^2}\right),$$

both $$\frac{1}{2L}X - \frac{1}{L} \text{ and } \frac{\sigma^2}{2L}Z$$

are concentrated around 1 with small variances and high probabilities. By utilizing the linear approximation of logarithm, i.e., $\ln(x+1) \simeq x$ when x is small, we can approximate Equ. (43) as $$\ln(\gamma) \simeq \ln(\sigma^2) + \ln\left(\frac{1}{2L}X - \frac{1}{L}\right) - \ln\left(\frac{\sigma^2}{2L}Z\right) \quad \text{Equ. (44)}$$

$$\simeq \ln(\sigma^2) + \left(\frac{1}{2L}X - \frac{1}{L} - 1\right) - \left(\frac{\sigma^2}{2L}Z - 1\right)$$

$$= \ln(\sigma^2) - \frac{1}{L} + \frac{1}{2L}(X - \sigma^2 Z).$$

Referring to the definition of X and Z, the summation term in Equ. (44) can be decomposed as $$X - \sigma^2 Z = \frac{2L}{\sigma^2}\|n\|^2 + 2L\|h_0 + n\|^2 = \sum_{i=1}^{2L} W_i. \quad \text{Equ. (45)}$$

Here $W_i$ is defined as $$W_i = \begin{cases} w_i^2 - \left(\sqrt{2L}\,\text{Re}\{H_0[i/2]\} + \sigma w_i\right)^2, & \text{if } \text{mod}(i, 2) == 0 \\ w_i^2 - \left(\sqrt{2L}\,\text{Im}\{H_0[i/2]\} + \sigma w_i\right)^2, & \text{otherwise,} \end{cases} \quad \text{Equ. (46)}$$

where $w_i \sim \mathcal{N}(0,1)$, which is independent and identically distributed among all i. $W_i$, as a function of independent random variables, is independent of each other. The mean and variance behavior of $W_W$ are shown in Equs. (47) and (48), respectively.

$$E[W_i] = \begin{cases} 1 - 2L\text{Re}\{H_0[i/2]\}^2 - \sigma^2, & \text{if } \text{mod}(i, 2) == 0 \\ 1 - 2L\text{Im}\{H_0[i/2]\}^2 - \sigma^2, & \text{otherwise.} \end{cases} \quad \text{Equ. (47)}$$

$$\text{Var}[W_i] = \quad \text{Equ. (48)}$$
$$\begin{cases} 2(1 + \sigma^4 + (2L\text{Re}\{H_0[i/2]\}^2 - 1)\sigma^2), & \text{if } \text{mod}(i, 2) == 0 \\ 2(1 + \sigma^4 + (2L\text{Im}\{H_0[i/2]\}^2 - 1)\sigma^2), & \text{otherwise.} \end{cases}$$

According to the Central Limit Theorem, suppose $\{X_1, X_2, \ldots\}$ is a sequence of independent random variables, each with finite expected value $\mu_i$ and variance $\sigma_i^2$, $\forall i$. Then $$\frac{\sum_i^N (X_i - \mu_i)}{\sqrt{\sum_i^N \sigma_i^2}} \sim \mathcal{N}(0, 1), \text{ as } N \to \infty. \quad \text{Equ. (49)}$$

In some examples, L has an order of magnitude 2, we assume that it is large enough for $\Sigma_i^{2L} W_i$ to have the asymptotical statistical behavior. Then by substituting Equs. (47) and (48) into Equation (49) and considering $\|h_0\|^2 = 1$, we have $$S_{2L} = \frac{\sum_i^{2L} W_i + 2L\sigma^2}{\sqrt{4L(1 + \sigma^4)}} \sim \mathcal{N}(0, 1) \quad \text{Equ. (50)}$$

After substituting Equ. (50) into Equ. (44), we obtain $$\ln(\gamma) \simeq \ln(\sigma^2) - \frac{1}{L} + \frac{1}{2L}\sum_{i=1}^{2L} W_i \qquad \text{Equ. (51)}$$

$$= \ln(\sigma^2) - \frac{1}{L} + \frac{\sqrt{4L(1+\sigma^4)}}{2L}\left(\frac{\sum_{i=1}^{2L} W_i + 2L\sigma^2}{\sqrt{4L(1+\sigma^4)}}\right) - \sigma^2$$

$$= \ln(\sigma^2) - \frac{1}{L} - \sigma^2 + \frac{\sqrt{4L(1+\sigma^4)}}{2L} S2L$$

$$\sim \mathcal{N}\left(\ln(\sigma^2) - \frac{1}{L} - \sigma^2, \frac{1+\sigma^4}{L}\right) \qquad \text{Equ. (52)}$$

Hence, the $\gamma$ parameter, defined as $1 - \mathcal{TR}(h_0, h_1)$ when $h_0$ and $h_1$ belong to the same multipath profile, is a random variable under the log-normal distribution with the location parameter $$\mu_{logn} = \ln(\sigma^2) - \frac{1}{L} - \sigma^2$$

and the scale parameter $$\sigma_{logn} = \sqrt{\frac{1+\sigma^4}{L}}.$$

Examples of TR Applications

A TR machine (TRM) as disclosed in the present teaching may be utilized in various applications, which may include healthcare applications, virtual reality (VR) applications, gaming services, indoor and outdoor security services, military applications, smart home applications, smart city applications, etc.

The TRM may be coupled with devices including: wearable devices (e.g. shoe, wallet, hat, belt, vest, backpack, carrying case/holder (e.g. for phone/gaming device/media player/glasses/objects), children-clothing, senior-citizen-things, wearable in clothing, etc.); furniture (e.g. table, chair, refrigerator, shelves, racks, magazine rack, shoe rack, book shelves, railing); household electronics (e.g. TV, DVD/Blu-Ray, gaming device, tablet, notebook, smart phone, baby monitor, security camera, clock, fan, ceiling fan, air-conditioner, heater, vent, Wi-Fi router, computer, printer, mouse, mouse pad, computer monitor, Hi-Fi system, speaker, etc.); household items, (e.g. vase, light fixtures, light bulb, switches, wall sockets, books, stationaries, household decoration, slipper, floor mat, etc.); building material (e.g. tiles, dry wall, door, window, wall paper, garage door, door handle, wall power socket, hand rail). For example, one can combine a bot or origin with one of these devices.

TR can be used with any standardized or non-standardized wireless communication system. First, TR can be used with Wi-Fi (IEEE 802.11 family of standards). In addition, TR may be used with any standardized or non-standardized wireless communication system that uses RF EM waves to propagate information from a sender to a receiver. Examples include: GSM, WCDMA, IS-95, CDMA2000, LTE, LTE-A on the cellular side, and Bluetooth and ZigBee on the short-range/unlicensed side. TR may also be used with any wireless systems and standards to be developed in the future, e.g. MulteFire, 5G systems. All of these systems do (or may) have channel estimation capabilities, so that they can be combined with any TR-based system or service, e.g. surveillance or monitoring.

There may be TR systems without using RF-based EM wave forms. One can create TR systems which are not based on RF EM waves to send information from source to destination. The principles of TR can be applied to any systems that emit and receive any other type of analog wave forms as well, e.g. acoustic waves, ultrasound, infrared. For example, one could build TR devices (bots and origin(s)) that are deployed in a home or office environment and send acoustic (or ultrasound or infrared) waves to each other instead of EM waves. These devices could be placed into the walls, or into the floors of a building and use ultrasound (or ultrasound or infrared) waves for communication. The devices would emit and receive acoustic waves (or ultrasound or infrared), and estimate the acoustic (or ultrasound or infrared) channel. Using the estimated acoustic channel, one can apply the principles of TR signal processing to implement any of the TR-based system and service that can be implemented using RF EM waves, e.g. monitoring and surveillance. In addition to using the acoustic (or ultrasound or infrared) waves to probe and monitor the environment, one can also use EM waves to communicate information (e.g. control information) to each other, or can use both acoustic waves (or ultrasound or infrared) and RF EM waves to probe and monitor the environment even more effectively. The system may be self-adaptive and self-learning.

The antenna, power supply and/or system of the TRM may be fire-proof, heat-resistant, water-resistant, shock-resistant or housed in a fire-proof, heat-resistant, water-resistant, shock-resistant enclosure. The fire-proof, heat-resistant, water-resistant, shock-resistant may be used to house other devices to provide emergency service (e.g. emergency lighting, emergency communication system, emergency beacon, emergency medical kit). There may be antenna with high efficiency for TR-based wireless power transfer. The TRM may perform TR-based data communication (e.g. uplink, downlink, or both) while transferring power wirelessly.

There may be chips designed to perform/control TR-based operations (e.g. communication, intrusion detection, positioning, tracking, wireless charging, wireless power transfer, health monitoring, breathing monitoring, fall-down monitoring, etc.)

More detailed application examples are discussed below.

Healthcare Related Applications

A TRM may be combined with a surveillance camera in a healthcare application. In one embodiment, the system for healthcare application may include the TRM, a camera, a microphone, and/or a video recorder.

A camera, together with processor and memory and/or display, may be used in healthcare application to perform line-of-sight (LOS) video-based surveillance, infra-red surveillance, heat imaging, live streaming, intrusion detection, estimate 3D shape, features, color and dimension of room/objects/human, estimate weather/lighting/terrain/street/household natural/artificial structures of environment, objection detection/identification, video recording, motion analysis (e.g. gait analysis, gesture analysis, emotion analysis, skin tone analysis, age analysis, facial expression analysis, health analysis, human activity detection, using computer vision), crowd analysis, tracking, patient analysis, iris analysis, tele-medicine, remote operation, sleeping monitoring/analysis, advertisement targeting, fire detection, conversation detection/monitoring. The camera, with patterned light emitter placed next to the camera, may be used to do a 3D map of the room.

A microphone, together with processor and memory and/or speaker, may be used in healthcare application to perform NLOS audio surveillance, baby/old folk monitoring, television viewing habit monitoring, advertisement targeting, sleeping monitoring/analysis, conversation monitoring, keyword spotting/detection, speech detection/recognition, and NLOS sound event detection. The microphone, with audible/non-audible sound source (speaker) placed intentionally placed next to microphone, may be used to perform echo location. The echo pattern may be compared or matched with the CIR of TRM. Time of flight analysis may be performed. Matched features in CIR and echo pattern may be analyzed to identify features of the environments.

In accordance with other embodiments, TRM, together with the processor and memory, may be used in healthcare application to perform NLOS TR-based surveillance, live streaming, intrusion detection, object detection/identification, TR-based recording, motion analysis (e.g. periodic motion detection, breathing detection, fall down detection, etc.), crowd analysis (e.g. estimate the number of living people present), sleeping monitoring/analysis, tracking, provide wireless power transfer to the surveillance camera in the healthcare application, provide wireless power to charger for rechargeable batteries. TRM, with bot intentionally placed next to origin, may be used to perform echo location (like what bats, dolphins, whales do).

The video information from the camera may be used to help TRM to map (calibrate) the room, help/calibrate/confirm periodic motion detection/estimation, event detection, gesture/gait, intrusion detection, breathing detection, count number of people, fall down detection, sleeping monitoring, tracking.

The sound information may be used to perform NLOS surveillance, intrusion detection, object estimation/identification, help/calibrate/confirm periodic motion detection/estimation, event detection, breathing detection, fall down detection, count people, sleeping monitoring, and tracking.

The TRM can be combined with children-clothing for healthcare applications of children. The TRM sensor attached to the children-clothing sends RF signals to the Wi-Fi router at home to facilitate health monitoring for the children or infants at home, including but not limited to breathing monitoring and heartbeat monitoring and stress monitoring. The Wi-Fi router sends the received signal to a remote server such as the cloud for analysis. The TRM sensor(s) may be used for idling detection. Two TRM sensors in proximity of each other may detect the presence of each other and report to the origin. The TRM can be combined with clothes for lie detector. The TRM sensor is attached to the clothes and the person under investigation is required to wear the clothes. The sensor emits RF signals to the Wi-Fi router to perform real-time monitoring on the health status of the person to detect abrupt changes in the patterns of breathing, heartbeat, or other health status. The breathing information from the TRM sensor can be used to study sleeping patterns, work patterns, attention patterns, stress patterns, emotional patterns, etc. In some other embodiments, the breathing information may be used to perform lie detection and emotion detection, as breathing rate tends to be elevated when a person lies and/or undergo emotional swing.

The TRM devices (bots and/or origins) in clothing worn by children, old folks and/or pets may be used for tracking children, old folks, and/or pets. TRM can be combined with clothes for health monitoring of seniors. The TRM sensor is attached to the clothes/headphone/accessories worn by the seniors. The sensor emits RF signals to the Wi-Fi router at home. The Wi-Fi router sends back the received signal to a remote server or a cloud for further analysis.

In addition, the TRM can be combined with children-clothing for vital sign detection of kids in a car to prevent incidents where kids are forgot in the car. The TRM sensor is attached to the children-clothing/accessories/toys (or pet clothing/accessories), a car/vehicle/vessel/facility, a museum, a cinema, a mall, a store, a shop, etc. When the car/vehicle/vessel/facility is parked and kept stationary for some time, the sensor starts transmitting RF signals to nearby access points which could forward the information to a remote server or cloud for analysis or process locally for vital sign detection. Whenever the vital sign is detected, the remote server or cloud could notify parents (or car owner, owner of facility, or police) on the presence of children left in their car. The vital signs may belong to children left in car/vehicle/vessel/facility, old folks aging at home, intruders/thieves, etc. The vital signs may belong to people sleeping in a room (e.g. in a motel/hotel). The amount of people in the room can be estimated. The emotional/stress/sleeping state may be estimated from the vital sign.

The TRM can be combined with clothes for crowd estimation. Here, all people are needed to wear the specialized clothes for vital sign detection. It can detect the number of people worn the clothes in a specific area. A more useful case is passive people counting. The TRM device, some camera and some microphone may be combined to estimate the amount of people in the crowd. The crowd emotional state may be estimated based on the average rate of breathing. The sensor is attached to the clothes worn by multiple people-of-interest. The sensor can emit RF signals which are collected by one or several access points for analysis. The access points could forward the information to a remote server or a cloud system for analysis or processing locally. The number of vital signs can be detected from the collected RF signals. Based on the received signal strength on the multiple access points, one can determine the number of people in the coverage area of each access point. Some bots may be randomly scattered, or placed at strategic locations (e.g. baggage can, signage, lamp post, traffic lights, road side, curb, other crowd control devices, other items, etc.) Other bots may be attached to clothing of under-cover law-enforcement officers in the crowd.

Security Related Applications

In various security related applications, a TRM may be combined with a security camera for continuous standalone monitoring. The security camera with network access and/or power supply and/or speaker can be used in environment LOS security monitoring, suspicious people reporting, perimeter security, theft prevention, and theft deterring.

The TRM, together with the camera, network access and/or power supply, can be used in environment security monitoring in both LOS and NLOS conditions, blind spot monitoring, providing second opinion on security, reducing false alarm. The TRM can also be used in the NLOS security applications such as perimeter security, privacy preserving security applications.

In one example, the TRM can be combined with baby's toy/accessory/bed/crib/walker for breath detection. The TRM can also be used for breathing detection such as baby breathing night monitoring, incubator monitoring, obstructive sleep apnea. The breathing detection from the TRM may be recorded (e.g. stored in the cloud) and analyzed medically by doctors/personnel, or by medical analysis software to analyze the health, well-being, some symptoms (e.g. stuffy nose), emotion (e.g. crying, laugh, happy, sad, stress) of the baby. The software may be used by some machine learning algorithm and expert system. The breathing detection may be combined with interactive baby gaming/educational system to provide feedback to the game as to the response (e.g. surprise, happy, sad, boring, or excited) of the baby to the game.

In another example, the TRM can be combined with automatic floor sweeping machine for complete mapping of the floor. The TRM, together with the automatic floor sweeping machine and/or memory and/or processor can be used for precise mapping of the floor, for efficiently use the traverse the whole floor. The TRM may be used to help the automatic floor sweeping machine to avoid obstacles, or forbidden area.

Building material (e.g. tiles, dry wall, door, window, wall paper, garage door, door handle, wall power socket, hand rail) e.g. tiles, together with metals, may be used in indoor monitoring applications to create specific reflection and propagation patterns for wireless signals so that it helps the TRM with the processor and memory, to focus on and capture indoor target events. For example, doors like garage doors, and windows, together with the TRM, the processor and the memory, may be used in indoor monitoring applications to perform building management, entrance management, smart home, auto-lock system. Walls and garage doors, together with the TRM and the processor, may be used in auto-parking applications to perform distance estimation and angle estimation for vehicles parking inside and/or outside garages, and to detect if any cars park at any specific or not allowed areas. Door handles, together with the TRM, the memory and the processor, may be used in home security applications to perform human identification, gesture control, indoor surveillance monitoring, and entry control. Wall power socket, together with the TRM and the processor, may be used in home security system to perform indoor monitoring, to monitor live (especially pets such as dogs and cats) conditions and to track the energy usage at home. A bot and/or an origin can be placed in/around the power socket.

The TRM, together with the memory and the processor, may be used in applications to detect existence of human being in a building and/or in a typical area, e.g., to detect the availability of the restrooms or fitting rooms. For example, the TRM may be used in home surveillance applications to perform entry monitoring of doors or windows, to monitor the status of doors and windows, e.g., to secure a vacation house, and to work as wireless punch-card machines that records that who, at what time, opens a door enters the office.

The TRM, together with the camera, microphone and the processor, may be used in human identification applications to identify individuals using wireless signals, to confirm individual identities with the assistance of cameras and microphones. For example, the TRM can be used in living monitoring applications to perform pet monitoring where one can track if pets open a door or get out from the area where they supposed to be, to perform infant monitoring to make sure if they get out from the cradles or baby beds or check if they fall asleep or wake up. The TRM may also be used in activity monitoring applications to perform monitoring over patient walking practice and recovery in physical therapy centers, to perform senior citizen monitoring to track their breathing rate and monitor if they fall down, to perform safe monitoring in gyms that it can check and report if anyone falls from treadmills. The CSI can be used to identify the meeting room/the house/the office/the space, and/or the user in the space.

The TRM, together with wearables such as children's shoe, hat, belt, backpack, children-clothing, and senior-citizen-things, can be used in tracking/monitoring children/senior citizen. They can also work with each other in ad-hoc security systems to provide intrusion/danger detection in an ad-hoc way (e.g. at night during camping, during outdoor activities, during excursion/picnic/vacation/outward bound). In one embodiment, the TRM may be powered by rechargeable battery connected to solar panel to be charged. When the wearable sensors are used as a TR device, one can use an indoor tracking system for real-time health/security monitoring.

Gaming Services and VR Related Applications

A TRM can be used in a gaming device for 3 dimensional tracking. A gaming device including the TRM with processor and memory and/or display may be used in 3 dimensional tracking in games to perform LOS video based tracking information, movement detection, posture recognition, movement identification, virtual reality interaction, speed estimation.

The TRM, together with the game console controller and the processor and memory and/or display, may be used in 3 dimensional tracking in games to perform real time tracking, interaction with avatar in games, posture scoring, poster detection, movement detection, movement identification. The TRM, together with the game console controller, the infrared camera, can be used in 3 dimensional tracking in games to perform precise positioning with depth information for games to remove occlusion, to render user with augmented reality, to separate users at different depth, to track user motion, to track user hand/leg/head/body motion. The TRM can also be used to determine the speed and location of the user in 3 dimension space in the gaming applications for determining the user's augmented location information into avatar interaction.

A TRM can be combined with a VR device (e.g. a VR helmet) to provide a more realistic experience with moving. The TRM, together with the VR helmet, sensors, camera, processor, and/or wireless communication protocol, may enhance the VR experience of a user by providing indoor tracking, by providing customized gaming environment that matched the real/actual space of the household, by giving children training to avoid dangerous space such as kitchen, by realizing the AR without projecting light into eyes, for haunted house experience.

The TRM, together with cameras and microphones, may be used in motion sensing games to perform wireless gait and gesture recognitions and to interact with computers or other players in VR games.

Military Related Applications

A TRM, together with inertial measurement units, processors, memory and display, may be used in military training to perform as tracking devices, especially in indoor and/or scatter-rich environment. Multiple TR devices can be tracked simultaneously and the location information of allies can be shared among them in complex indoor environment in which scenario GPS would fail. It also can be used to monitor the breathing of the soldier and/or other nearly people (even enemies) or animals (e.g. dogs).

In a combat situation, multiple bots may be dropped by aerial vehicles (e.g. drones) or shot from gun to an area beyond the area to be monitored. A soldier operating an origin (serving as a mobile base station) can monitor people breathing and perform intrusion detection. Sensitivity may be adjustable so that minor disturbance from small animals (e.g. mouse) or from wind may be filtered out. Multiple bots may be operating at the same time. Some bots may function as origins with respect to other bots so that a bigger area can be monitored. The bots can be retrieved/re-used later when being safe. Wireless power transfer may be used to provide remote power to the bots so that the bots may function indefinitely. The bots may be packaged in camouflage packaging. The bots may also function as an ad-hoc network so that a TR-based battle-field communication system can be set up quickly.

The bots may interact with multiple origins so that collaborative processing/data fusion can be performed for improved performance. In addition, triangulation may be performed so that the location of the bots can be identified. The location of the bots may be with respect to some map.

The TRM can be combined with bulletproof vest for military applications. The TRM sensor attached on the bulletproof vest/headset/helmet emits RF signals to the base station at the command center on the battlefield (or crime scene or disaster sites) to facilitate remote health monitoring for the soldiers (or law enforcement officers or fire/rescue worker) on the battlefield (or crime scene or disaster sites), including but not limited to, breathing monitoring and heartbeat monitoring. Multiple TRM sensors can be attached to the chest and back of the soldier (or law enforcement officer or fire/rescue worker) simultaneously to mitigate the effect of other objects nearby to enhance the remote health monitoring. Some sensors can work as transmitters and the others as receivers, or all of them work as transmitters and send RF signals to the command center. The TRM devices may form fast-deploying, ad-hoc network for on-site communication.

Smart Home Related Applications

A TRM may be combined with household electronics (air-conditioner, heater, vent, Wi-Fi router, computer, printer, mouse, mouse pad, computer monitor, Hi-Fi system, speaker, etc.), e.g. an air-conditioner (heater, vent), together with processor and sensor, RF module and/or memory, may be used in smart home application to perform automatic temperature control, remote temperature control, learning personal preference, live monitoring, conserve energy when you are away, lights up the information on display when you walking nearby. The TRM, together with processors, memory and household devices, can be used in smart home application to perform automatic control, remote control, energy saving when users you are away, lights up the information on display when users request, learning personal preference. With TR technology, all household electronics (air-conditioner, heater, vent, Wi-Fi routers, computers, printers, mouse, monitors, Hi-Fi systems, speakers, washing machines, refrigerators, microwave ovens, TVs, phones, fireplace) can be connected simultaneously and wirelessly within the smart control of the TRM, which may be based on an advanced algorithm like machining learning to provide better experience for customers.

Furniture, such as table, chair, sofa, tiles, window, door, fireplace, wardrobe, handle, locks, wall decoration, suitcase, drywall, wall material, ceiling material, floor material, wall paper, vinyl siding, hardwood floor, stucco, shingles, bricks, clock, concrete molding, plastic molding, sink, photo/photo frame, window blind, power socket, cable, fabric, leather, refrigerator, shelves, racks, book shelves, accessories, home appliance (e.g. fan, microwave oven, toaster, TV, light fixture, light bulbs, pans, cookers, air purifier, heater, container, etc.), and other indoor/outdoor fixtures, etc., may be used in wireless power transfer to act as scatterers when painted with materials having a large electromagnetic reflection coefficient, or the surfaces patterned (e.g. with microscopic-level structure, or other small structures) to produce multi-path. The TRM, together with the furniture with electromagnetic wave reflection coating and/or surface structure, may be used to increase the efficiency and distance for wireless power transfer, since TR is able to collect the energy of the transmitted signal from each multipath component existing in the environment and the furniture with special treatment can increase the energy from each path.

Wi-Fi routers, together with processor, memory, and RF module, can be connected either through wires or wirelessly to the backbone network in order to handle multiple devices streaming, downloading, uploading and sharing at the same time. With the processor and RF module, one/several Wi-Fi routers can cooperate together to provide the entire coverage for a large house, e.g., of the 3000-4500 square feet. Within the processors or an application run on a mobile device (e.g., smart phone, tablet, computer), smart programs can assist the Wi-Fi routers to avoid Wi-Fi congestion, smart handover between multiple Wi-Fi routers, and Wi-Fi router location optimization. Wi-Fi routers can be remotely controlled through an app on a smartphone. The TRMs, together with processor and memory, can achieve more advanced service besides the current capability of Wi-Fi routers. The TRMs may further reduce the interference between each other with the beamforming, provide another physical-layer security, and more secured access/authorization control. With the TRMs, users can specify which device to support with a customer-defined QoS.

A digital pen, together with digital plate/screen/paper, software application, and developer tools, can record the drawing/writing with the digital pen on the digital plate/screen/paper and display at another tablet/computer/smartphone/monitor screen in either real-time or offline manners. The TRM, together with the digital pen, software application and developer tools, can display the drawing/writing anywhere (regular paper, table, hand, even air) with the digital pen on one computer/tablet/smartphone/monitor screen directly in real-time and/or offline manners. The digital plate/screen/paper is not eliminated in the TR-based digital pen system, i.e., the digital pen can record/display the writing/drawing anywhere.

TR devices may be integrated into electric devices such as light bulbs, electric sockets, and power distributors. As the TR devices become smaller and smaller, they would eventually become IoT devices, such that one could combine the TR devices (bots and/or origins) with any electric appliance, device or home/office power distribution system or light source (e.g. microwave ovens, toasters, light bulbs, electric sockets, power distributors, etc.). The TR devices would be powered by the electric power the appliance or electric device receives. The TR functionality (monitoring, tracking etc.) would be implemented as an embedded mini-device in the appliance or electric device. For example, a TR device could be integrated into a light bulb: a light bulb may contain a TR device, receive power from the electric power the light bulb receives, and could function and a bot or origin, sending and receiving TR-related RF signals through its air interface/antenna and could be a part of a home security monitoring system. The TRM device may keep track of the time when the light is on and when it is off to monitor the habits of the user (at home/outside home). After the light is off for a period of time, the sensitivity of TRM may be increased. When the light is turned on or off (by a thief) and when the system is armed, the TRM may trigger alarm sound. The TRM may control the light to signal the security status to the house owner (e.g. flash the light when the system is armed). The TRM may modulate the light (at a frequency invisible to human eye) to transmit data to another light-sensitive device.

One could manufacture furniture or flooring specifically designed to improve the performance of TR-based RF monitoring or security systems. For example, a book shelf or a floor tile could contain special thin wires or metal/aluminum foil such that after installation, the item would reflect EM waves better, thus creating richer multi-path components in the effective channel impulse responses. This could improve the performance of TR-based surveillance/monitoring systems, resulting in better user experience. One could also embed conductive material in other building materials such as dry wall, door, window, wall paper, garage door, wall power socket, hand rail to create more RF propagation paths. The surface of the home/office furniture and/or flooring and/or any surface may be engineered/designed to have special shapes (e.g. with special micro structures designed with respect to the wavelength of carrier frequency) that would create many multi-path reflections, refraction, diffraction and other changes in EM propagation directions. The TRM, together with the floor plan of a building, may be used in indoor emergency rescue operation by providing non-line-of-sight TR-based indoor navigation, especially in harsh environment conditions, such as dense smoke in a fire, limited space due to collapses in an earthquake, when line-of-sight-based tracking method is suitable.

The TRM can be combined with devices like iRobot for more precise programming of route etc. The TRM can be combined with iRobot (self-guided cleaning device) to provide efficient automatic cleaning of the house. The TRM, together with sensors and/or processors and/or memory and/or wireless communication protocol, may enhance the user experience by providing precise location and better programming of route, by reducing the total time for cleaning, by improving the positioning for the routing algorithm and eliminating the location ambiguity using the channel information. When someone (e.g. a baby) is sleeping in a room or do not want to be disturbed, the iRobot may avoid the room. With indoor position, the iRobot may be used to transport things (e.g. drink, food, snack, stationary, printed matter, mobile phone, iPad, etc.) within a home. The iRobot may also be used to transport one or more people (e.g. a baby, a child, a patient) and/or object (e.g. a medical device, a computer, utensils, toy, clothing, tools, etc.).

Smart City Related Applications

A TRM may be used to help municipal services or in smart city related applications. For example, the TRM may be capable of forming an ad-hoc network in emergency situations (e.g. earthquake); establish communication through the ad-hoc network to the internet and/or emergency service such as police, ambulance, etc.; and be used for navigation inside water pipes, oil pipes, air ducts, maintenance pathways, man-holes, sewage systems, rain-water systems, coal mine, oil rigs, mining facilities, forests, caves, maze, maze-like facility, maze-like environment, etc.

The TRM can be combined with a drone to improve the smart city service. The TRM, together with small size autonomous/manned aircraft and/or communication protocol and/or delivery logistic system, may enhance the user experience in both indoor and outdoor delivery by enhancing the precision of the delivery, by better routing the delivery route via better precision positioning, and by better safety and property loss via better positioning. The TRM can be combined with a drone to help the drone to fly/navigate indoor or around town accurately. While cars running on roads with traffic light, traffic rules and so on, drones can fly around a town at different 3D roads (e.g. a road at a height of 100 ft, another road above it at 200 ft, etc.). The TRM can guide the drone precisely along the road without hitting each other. The road at 100 ft may have two lanes, one going in one direction and the other lane in the other, with traffic direction similar to the car traffic below. The road at 100 ft may have 8 lanes, with 4 lanes in one direction and 4 lanes in the opposite direction. Some lanes may be for fast moving drones. There may be speed limits for the drones, perhaps for each lane. Drones may need to stop at traffic lights and may have right-turn lanes. Drones may be able to turn right on red. There may be parking space at 100 ft, or slightly above or below 100 ft. Passing may be allowed by flying temporarily at height slight above or below 100 ft. There may be drones to carry people (like a bus). The drone may be flown by machine, by robot, or by human. There may be emergency drones (like to emergency vehicles such as police cars, fire engines, ambulance, etc.) Air space indoor may be partitioned such that special "lane" or "lanes" may be defined/reserved for drones to fly. The "lane" may be at floor level, close to ceiling, or at any height. The height may be different at different locations. There may be multiple lanes in spacious indoor environment such as airport lobbies, hotels, malls, sport stadiums, arenas, gyms, museums, concert halls, etc. The flying lane for drones may be defined in underground tunnels, underground facilities, sewage systems, and mines (coal mine, gold mine, etc.). Small flying lanes may be defined for small drones to fly in small cavities (e.g. air passage way in human body, animal body, etc.). Flying lanes may be defined in forests/woods while avoiding the trees therein. The TRM, together with other sensors for direction estimation, can be used in guiding a camera, perhaps mounted on a drone/vehicle/vessel, to follow a predetermined path for shooting a video, guiding a robot to move along a predetermined path for inventory management in a warehouse, manufacturing in a factory/plant, guiding a driver to park in a garage.

The TRM can be combined with other sensors to provide better hospital rehabilitation. The TRM, combined with sensors and/or camera and/or processor and/or memory, may be used in hospitals, rehabilitation center, fitness center, physical therapy clinics for movement tracking, movement identification, posture training, exercise training, posture monitoring, rehabilitation assistance, and movement range expansion.

The TRM can be combined with navigation monitor for maintenance/navigation and underground tracking. The TRM, combined with sensors and/or map and/or image processing algorithm, may enhance the safety for maintenance works by providing better location estimation in the dark or in near darkness (e.g. caves, underground structure, sewage system, air conditioning system, lighting system, water pipes, oil pipes, fuel lines, coal mines, indoor space out of electricity/light, space craft), by providing navigation routes on the map, by providing easy navigation infrastructure setup, by providing location estimation without GPS. The TRM, together with backpack, luggage, etc., maybe with some other sensors such as gyroscope for direction estimation, can be used in tracking/guiding travelers inside a metro station, railway station, subway station, parking lot, airport, and other public transportation, or guiding students/visitors/people inside a college/university/park/city/housing estate/museum/amusement park/concert hall/arena/gym/stadium/shopping mall/warehouse/logistic hub/parking lot. The TRM, together with brochure, pin, glasses, pen, bag, backpack, purse, speaker, bracelet, shoe, socks, and maybe with some other sensors for direction estimation, can be used in guiding visitor in exhibitions, museums, entertainment center, and hospitals.

The TRM, together with processor and memory, can be used for detecting suspicious objects/person in law enforcement operations, in military operations, in crowd control, in security check in airport, railway station, exhibition, museum and other facilities. The TRM, together with processor and memory, can be mounted in an object such as train, bus, ship, stadium, shopping mall, convention center to count the number of people inside the object, to detect suspicious objects/persons, to detect people movement, to monitor people on board.

In addition, the TRM may be used for counterfeit money detection. Counterfeit technology may include embedding some material (e.g. thin metal) which may affect the EM wave propagation patterns. The TRM may be used with Point-of-Sale devices to detect/verify merchandise being purchased. The TRMs may be embedded in ornaments to provide TR-based processing/service while providing ornamental value. The TRMs may be used to provide communication, detect human/animals, detect and estimate depth/measure distance of hollow holes, caves, tubes, pipes. There may be downloadable software for installation onto smart devices (e.g. smart phone, tablet, and notebook) for providing TR-based processing/service. The TRM may be used in cars to monitor tire pressure, do intrusion detection, detect baby/pet left in car, etc. The TRM may also be used in trucks/containers/freight vehicle to monitor the cargo area/bay. The TRM may be used in containers to detect how full it is in a device, e.g. fuel tank container, ink cartridge, printer ink cartridge, liquid container, milk/juice carton, etc. The TRMs may be used as thickness gauge (e.g. to measure thickness of metal sheets, metal walls).

Other Exemplary Applications

Some exemplary applications of TRMs may include: video-conferencing/communication, navigation, industry manufacturing, vehicle/asset/person/pet monitoring/controlling, agriculture automation, energy consumption, building management, embedded mobile, M2M & wireless sensor network, everyday things, telemedicine, etc.

In one example, the TRM, together with a table (or a flat surface, or any surface, or an imaginary surface) and the measurement of the channel impulse responses (CIR) on the table's surface and a monitor, may be used as a white board. The location of a TR device can be estimated when it is put on the table since the CIRs for the same location is similar in a static environment. The trace of the device can be determined when the device is moving on the table which can be shown on a monitor. The trace may be projected onto another surface (e.g. a flat surface, a curved surface, a 3D model of an object, etc.). Gesture recognition, handwriting recognition, character/alphabet/letter recognition, cartoon figure/sketch/shape recognition, and object recognition may be applied to the trace. The trace may be combined with other inputs (e.g. clicking, roller, roller ball, haptic) to provide shading, coloring, and/or labeling.

In another example, a cloud server can be used to collect the signals from TR devices for analysis, including but not limited to vital sign detection and monitoring. Cloud computing can be used to analyze the collected signals on the cloud server to significantly boost the efficiency of vital sign detection and monitoring.

The TRM can also be combined with motor and molding elements for 3D printing. The TRM, with motor and/or molding machine and/or pliable material ejector and/or processer and/or memory, may be used to provide precise movement of the structure (e.g. print head).

The TRM, together with a notebook or a smart phone (an app in smart phone), can be used to monitor activities in a home, small business, plant, garage, etc. The TRMs in notebook/smart phone/smart device may form an ad-hoc network of TR-based communication network, security system, and/or health monitoring system.

The TRM may also be utilized in any device built with a specific purpose, e.g. a disco ball with many reflective surface, a spherical or aspherical surface to reflect EM waves, a spherical/aspherical/elliptical surface to focus EM waves, a hollow chamber to trap incoming EM waves and to channel/redirect/repurpose/amplify them to emit in some selected directions or all directions, etc.

CSI Storage and Transmission

Channel state information (CSI) is the physical layer channel information which may have significant size and need compression. It may be sampled at high sampling frequency (e.g. thousands, or millions, or billions CSI per second) to capture fast changing channel information (e.g. rotating engine, fans, transient behaviors, etc). The precision (bit depth) of each component of a CSI may be high (e.g. 8 bit/sample, 12 bit/sample, 16 bit/sample, 24 bit/sample). As the proposed TR systems/devices may have multiple antennas on both transmitter and receiver sides (e.g. 3×6 with 3 antennas for transmitter and 6 antennas for receivers, or 2×12, or 4×6, or 2×2, etc.), many pair-wise CSI may need to be captured and stored. In multipath-rich environments, many components of the CSI may have significant entropy (i.e. rich in information). Thus, the size of the CSI data may be prohibitive and compression of CSI is important for the storage and transmission of the CSI data efficiently.

The proposed time reversal system may compress the CSI in two kinds of compression methods: lossless and lossy compression. Lossy compression may include some irreversible steps (such as quantization of some quantities (e.g. components of CSI) and/or some many-to-one mappings, etc.), while lossless compression may use reversible steps (e.g. prediction, differential pulse coded modulation (DPCM), entropy coding, lookup table, etc.) to reduce/remove some kind of redundancy of the CSI and/or other features (e.g. temporal redundancy). Lossy compression may have higher compression efficiency leading to smaller size.

To reduce the dynamic range of each component of a CSI, linear/nonlinear mapping (e.g. companding, A-law mapping, µ-law mapping, logarithmic mapping, compressive mapping, etc.) may be applied. Inverse mapping may be applied to restore the original value (or a close approximation of it). The nonlinear mapping may be lossless and/or near-lossless. The mappings may be different for different components. The mappings used may be encoded and communicated in a CSI-storage format and/or a CSI-transmission format or represented as a parameter and/or a metadata item. The mappings may be negotiable (e.g. between a source and a destination, perhaps based on available resources and/or what are being supported). One kind of nonlinear mapping may be changed to another kind of nonlinear mapping using one or more transcoding steps.

The time sequence of CSIs (or the linear/nonlinear mapped version of the CSIs) may have a lot of redundancy in time domain. For example, the CSI at consecutive time instances may have high correlation in a relatively static environment. Even for a dynamic environment, some components (e.g. multipath components in time domain, channel response components in some subcarriers in frequency domain, etc.) of temporally adjacent CSIs may be at least moderately correlated, especially when the changes are due to some changes of the environment (e.g. a fan rotating, a door opening, a person moving around, etc) instead of the wireless transmitter/receiver. A time sequence of CSI may be cyclo-stationary such that correlation may be high periodically.

Similarly, spatially adjacent CSIs may have high spatial correlation when the sampling grid is dense (e.g. high correlation within a focusing ball of 1.5 cm diameter). Therefore, exploiting various redundancy and irrelevancy of the CSIs as well as various prediction techniques, the CSIs can be compressed (e.g. by using various off-the-shelf compression tools rooted from image processing.

Suppose a channel state information (CSI) is denoted as a vector $h=[h[1], h[2], \ldots, h[L]]^T$, in which L is the number of taps of the channel state information. The components of CSI may contain temporal, frequency, and/or other information. For example, h[1], h[2], h[L], etc., may be 8-bit (or 12-bit, 16-bit, 20 bit, or 24-bit, etc) digital samples of the received probing signal. The sampling rate may be 125 MHz (or 20 MHz, 40 MHz, 60 MHz, 80 MHz, 100 MHz, 150 MHz, 200 MHz, 300 MHz, 500 MHz, 1 GHz, etc.). Each entry in the CSI vector $h=[h[1], h[2], \ldots, h[L]]^T$ is in general complex valued, and thus can be represented by separating the real and imaginary part, e.g., $$h'=[Re(h[1],h[2],h[L]),Im(h[1],h[2], \ldots, h[L])]^T, \quad \text{Equ. (53)}$$

where Re(x) represents the real part of x and Im(x) represents the imaginary part of x. Or, alternatively, it may be represented as magnitude-plus-phase, or other representation.

Consider a possible time sequence of CSIs, $H=[h_1, h_2, \ldots, h_T]$ covering time index $t=1,2, \ldots, T$ (e.g. the CSI may be sampled uniformly and/or non-uniformly in time), with each column $h_i$ having a form as shown in (52) and is a 2L*1 vector. The matrix of H can be viewed as a "pseudo image of CSIs", and has a size of 2L*T. Each column $h_i$ is the CSI of one time instant and each row represents the time series of a particular component of the CSIs. The proposed time reversal system may exploit the time redundancy along each row and compress the "pseudo image of CSIs" using an image compression method (e.g., using Tiny PNG, JPEG lossless, zip, JBIG and other lossless tools), video compression method (e.g. ISO/IEC MPEG-1/2/4/7/21, ITU-T H.261/2/3/4/5, etc), audio compression method (e.g. DPCM, MP3, AAC, etc.), speech compression method (e.g. PCM, DPCM, DM, ADPCM, LPC, CELP, AMR, VMR-WB, G.722, G.722.1, G.723.1, G.726, G.728, G.729, SMV, FNBDT, model-based coding, etc) and text compression method (e.g. ZIP, LZ, DEFLATE, LZW, PKZIP, GZIP, PNG, 7Z, LZMA, Huffman coding, Arithmetic coding, dictionary coding, etc.). When applying 1-dimensional compression methods such as some audio, speech and text methods, the pseudo image of CSIs may be traversed in horizontal zigzag, vertical zigzag, diagonal zigzag, antidiagonal zigzag, or other scanning patterns to convert it into a 1-dimensional structure. In DPCM, the ith row (row i) of H can be predicted unidirectionally using past rows (row i−1, row i−2, etc) or future rows (row i+1, row i+2, etc), or bi-directionally using both past rows and future rows. The prediction may be first order or higher order prediction. The prediction may be linear or nonlinear. Different prediction (past, future, bidirectional) may be used for different rows. Component-wise prediction may be used. Each component hij may be predicted by one or more nearby components (e.g. $h_{ij}$ may be predicted by $h_{i,j-1}$, $h_{i,j-2}$, $h_{i,j-3}$, or $h_{i-1,j-1}$, etc).

Note that the pseudo image of CSIs may also be constructed using the CSI representation in frequency domain. For example, in $h=[h[1], h[2], \ldots, h[L]]^T$, L may represents the number of available subcarriers in a channel frequency response, and the method described above may also apply.

For multiple antenna systems, a pseudo image can be created for each link, e.g., 9 pseudo images of CSIs can be constructed for a 3 by 3 antennas system. Each pseudo image may be compressed independently as described above, or may be combined in some order to form a pseudo video. Interframe correlation in the pseudo video may be exploited using video coding methods. In some cases, each component of a CSI may have more than 8 bits (i.e. more bits than the number of bits in a pixel of an image, e.g. if a CSI component value is large and the range of the CSI value is large, higher bit precision may be used). In such cases, multiple images may be constructed. For example, each CSI component may have 16 bit precision such that the highest 8 bits may go to a first image and the lowest 8 bits may go to a second image. As such, the multiple images may have different amount of redundancy (e.g. the highest-8-bit image may have higher correlation than the lowest-8-bit image). Another possibility is to find the first image as an approximation of the highest-8-bits image to increase/maximize correlation (for easy compression). Then the second image is the difference between the original image and the first image. If the CSI dynamic range is small, we may use lower bit depths. In general, each CSI may be decomposed into multiple signals (e.g. multiple frequency subbands whose bandwidths may be equal and/or unequal, smooth subsignal+edge sub-signal+texture sub-signal, binary tree/quad-tree decomposition, wavelet decomposition, etc) which when combined may yield the CSI. Each decomposed signal may be compressed independently and/or jointly.

Note that phase distortions may corrupt the CSIs (e.g. CFO, STO, etc). Therefore, before constructing the CSI pseudo image, the CSI maybe pre-processed to compensate for the phase distortion, noise and other artifacts/problems. For instance, the taps in CSI time domain representation may be aligned such that correlation can be increased to improve compression efficiency, using symbol timing methods described in U.S. patent application Ser. No. 15/284,496, titled "TIME REVERSAL COMMUNICATION SYSTEMS," filed on Oct. 3, 2016. The phase distortion in CSI frequency domain representation may be compensated using the methods described in PCT application PCT/US2016/066015, titled "METHOD, APPARATUS, AND SYSTEMS FOR WIRELESS EVENT DETECTION AND MONITORING," filed on Dec. 9, 2016.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the computation, storage, application, and processing of channel state information based on time reversal techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A client device, comprising:
   at least one of: a wireless transmitter and a wireless receiver,
   a processor;
   a memory communicatively coupled with the processor;
   a set of instructions to be executed by the processor in a sandbox using the memory to:
   communicatively couple with a server through a network,
   obtain a set of channel information (CI),
   wherein the set of CI is captured when at least one probing signal is sent from the wireless transmitter to the wireless receiver through a wireless multipath channel associated with a space,
   compute at least one of: a set of parameters based on at least one of: the set of CI or another set of CI, or a set of analytics based on at least one of: the set of CI or the set of parameters,
   cause at least one of: the set of CI, an identification data associated with the client device, a status information associated with the client device, the set of parameters, or the set of analytics, to be sent to the server through the network, and
   cause a task to be performed based on the set of parameters.

2. The client device of claim 1, wherein at least one of:
   (a) the network is at least one of: internet, an internet-protocol network and another multiple access network; and
   (b) the wireless transmitter and the wireless receiver are associated with the physical layer of at least one of: a wireless PAN, IEEE 802.15.1 (Bluetooth), a wireless LAN, IEEE 802.11 (Wi-Fi), a wireless MAN, IEEE 802.16 (WiMax), WiBro, HiperMAN, mobile WAN, GSM, GPRS, EDGE, HSCSD, iDEN, D-AMPS, IS-95, PDC, CSD, PHS, WiDEN, CDMA2000, UMTS, 3GSM, CDMA, TDMA, FDMA, W-CDMA, HSDPA, W-CDMA, FOMA, 1xEV-DO, IS-856, TD-SCDMA, GAN, UMA, HSUPA, LTE, 2.5G, 3G, 3.5G, 3.9G, 4G, 5G, 6G, 7G and beyond, another wireless system and another mobile system.

3. The client device of claim 1, wherein an identification data is sent from the client device to the server which associates the client device with a user based on the identification data.

4. The client device of claim 1, wherein the probing signal to comprise at least one of: an impulse signal, a pseudo-random sequence, and another probing signal.

5. The client device of claim 1, wherein at least one of:
   (a) the set of CI to comprise at least one of a channel impulse response, a channel frequency response, another channel state data, and a physical layer channel information of the wireless multipath channel between the wireless transmitter and the wireless receiver; and
   (b) each of the wireless transmitter and the wireless receiver has at least one antenna, and each of the set of CI is captured when one of the at least one probing signal is sent through the wireless multipath channel from one of at least one antenna of the wireless transmitter to one of at least one antenna of the wireless receiver.

6. The client device of claim 1, wherein at least one of:
   (a) the client device is associated with a user; and
   (b) the client device is associated with at least one of: a user and a user client, by an identification server through the server using the identification data of the client device.

7. The client device of claim 1, wherein at least one of:
   (a) the set of CI is stored in a CI-storage format in a CI storage module through the server;
   (b) the set of CI is provided in a CI-transmission format to at least one of: a parameter generation module and an authorized application module; and
   (c) the set of CI is at least one of: preprocessed, processed and analyzed.

8. The client device of claim 1, wherein at least one of:
   (a) the space is to be guarded based on the set of CI associated with the wireless transmitter and the wireless receiver; and
   (b) at least one analytics associated with the space is computed based on the set of CI associated with the wireless transmitter and the wireless receiver.

9. The client device of claim 1, wherein at least one of:
   (a) at least one event associated with the space is classified based on the set of CI associated with the wireless transmitter and the wireless receiver, and
   (b) at least one security event associated with the space to be secured is classified based on the set of CI associated with the wireless transmitter and the wireless receiver.

10. The client device of claim 1, wherein at least one of:
    (a) at least one periodic activity associated with the space is identified based on the set of CI associated with the wireless transmitter and the wireless receiver; and
    (b) at least one breathing analytics associated with a living object in the space is computed based on the set of CI associated with the wireless transmitter and the wireless receiver.

11. The client device of claim 1, wherein a digital data is communicated between the wireless transmitter and the wireless receiver using the set of CI.

12. The client device of claim 1, wherein power is wirelessly transferred between the wireless transmitter and the wireless receiver using the set of CI.

13. The client device of claim 1, wherein wireless charging is performed by transferring power wirelessly between the wireless transmitter and the wireless receiver using the set of CI.

14. The client device of claim 1, wherein at least one waveform is chosen using the set of CI for at least one of: wireless power transfer, wireless communication, wireless event detection, and wireless channel analysis, associated with the wireless transmitter and the wireless receiver.

15. The client device of claim 1, wherein multiple intermediate parameters computed based on at least one of: the set of CI and the another set of CI are combined to provide a final parameter.

16. The client device of claim 1,
    wherein the parameter comprises at least one of: a time reversal resonance strength (TRRS), a cross-correlation, an inner product of two vectors, a similarity score and a distance score, of two particular CI from at least one of: the set of test CI and the another set of CI.

17. The client device of claim 1, wherein a task is requested by a user device through the server.

18. The client device of claim 1, wherein a user device to request the server to perform a task based on a parameter which is based on at least one of: the set of CI and another set of CI;

wherein the user device to send a user identification data to the server;

wherein the user device is associated with at least one of: the client device, the wireless transmitter, the wireless receiver, the wireless multipath channel, the space and the set of CI, by an identification server associated with the server through the user identification data from the user device and an identification data from the client device.

19. A method of a client device, comprising:

communicatively coupling the client device with a server through a network using a processor and a memory of the client device through a set of instructions executed by the processor using the memory, wherein execution of the set of instructions by the processor using the memory is sandboxed;

wherein the client device comprises at least one of: a wireless transmitter and a wireless receiver;

obtaining a set of channel state information (CI), wherein the set of CI is captured when at least one probing signal is sent from the wireless transmitter to the wireless receiver through a wireless multipath channel associated with a space;

computing at least one of: a set of parameters based on at least one of: the set of CI or another set of CI, or a set of analytics based on at least one of: the set of CI or the set of parameters;

causing at least one of: the set of CI, an identification data associated with the client device, a status information associated with the client device, the set of parameters, or the set of analytics, to be sent to the server through the network, and causing a task to be performed based on the set of parameters.

20. A server, comprising:

a processor;

a memory communicatively coupled with the processor;

a set of instructions to be executed by the processor using the memory to:

communicatively couple with a client device through a network, wherein the client device comprises at least one of a wireless transmitter and a wireless receiver, wherein the client device obtains a set of channel state information (CI), computes at least one of: a set of parameters based on at least one of: the set of CI or another set of CI, or a set of analytics based on at least one of: the set of CI or the set of parameters, and combines multiple intermediate parameters computed based on at least one of: the set of CI or the another set of CI to provide a final parameter, wherein the set of CI is captured when at least one probing signal is sent from the wireless transmitter to the wireless receiver through a wireless multipath channel associated with a space, and receive at least one of: the set of CI, an identification data associated with the client device, a status information associated with the client device, the set of parameters, the set of analytics, or the final parameter, from the client device through the network.

* * * * *